United States Patent [19]
Mukai et al.

[11] Patent Number: 6,052,234
[45] Date of Patent: Apr. 18, 2000

[54] VIEWFINDER OPTICAL SYSTEM

[75] Inventors: Hiromu Mukai; Shigeto Ohmori, both of Kawachinagano; Yuichiro Ori, Moriyama, all of Japan

[73] Assignee: Minolta Co., Ltd., Osaka, Japan

[21] Appl. No.: 08/835,825

[22] Filed: Apr. 16, 1997

[30] Foreign Application Priority Data

| Apr. 16, 1996 | [JP] | Japan | ................. | H8-094129 |
| Sep. 9, 1996 | [JP] | Japan | ................. | H8-237561 |
| Nov. 21, 1996 | [JP] | Japan | ................. | H8-310279 |
| Nov. 21, 1996 | [JP] | Japan | ................. | H8-310285 |
| Dec. 5, 1996 | [JP] | Japan | ................. | H8-325028 |

[51] Int. Cl.[7] .............. G02B 25/00; G02B 5/18; G02B 13/02
[52] U.S. Cl. .................. 359/643; 359/656; 359/646; 359/660; 359/795; 359/558; 396/373
[58] Field of Search .................. 359/795, 643, 359/644, 645, 656, 660, 661, 558; 396/373

[56] References Cited

U.S. PATENT DOCUMENTS

| 5,013,133 | 5/1991 | Buralli et al. | ................. | 350/162.11 |
| 5,044,706 | 9/1991 | Chen | ................. | 359/357 |
| 5,148,314 | 9/1992 | Chen | ................. | 359/642 |
| 5,225,927 | 7/1993 | Nozaki et al. | ................. | 359/355 |
| 5,257,133 | 10/1993 | Chen | ................. | 359/565 |
| 5,446,588 | 8/1995 | Missig et al. | ................. | 359/565 |
| 5,710,667 | 1/1998 | Goto | ................. | 359/569 |
| 5,715,090 | 2/1998 | Meyers | ................. | 359/565 |

FOREIGN PATENT DOCUMENTS 5-157963  6/1993  Japan .

OTHER PUBLICATIONS

G.J. Swanson and W.B. Veldkamp, "Infrared Applications of Diffractive Optical Elements", SPIE Proceedings, vol. 885, paper 22 (1988).

*Primary Examiner*—Scott J. Sugarman
*Attorney, Agent, or Firm*—Sidley & Austin

[57] ABSTRACT

A viewfinder optical system has a relay lens system. The relay lens system focuses a primary image to form a secondary image. The relay lens is provided at an optical conjugate point with respect to a pupil. A surface of the relay lens system has an optical power of diffraction. The surface is positioned between the primary image and the optical conjugate point. The surface also has optical power of refraction.

34 Claims, 48 Drawing Sheets

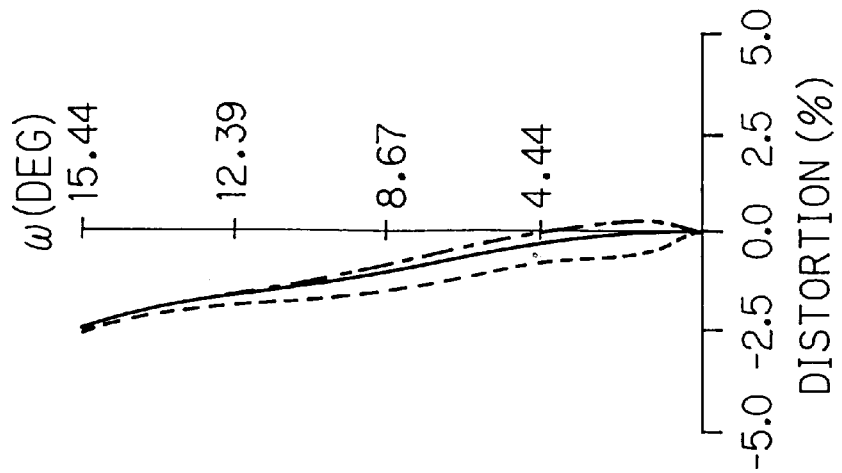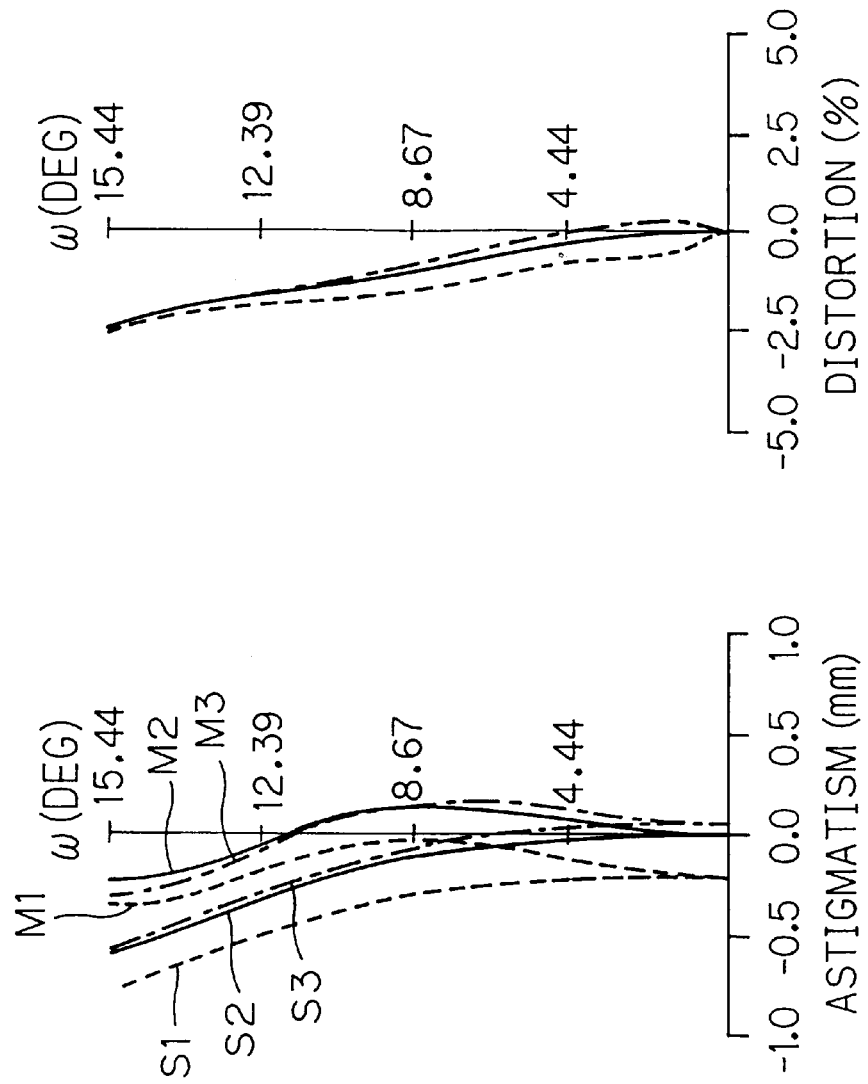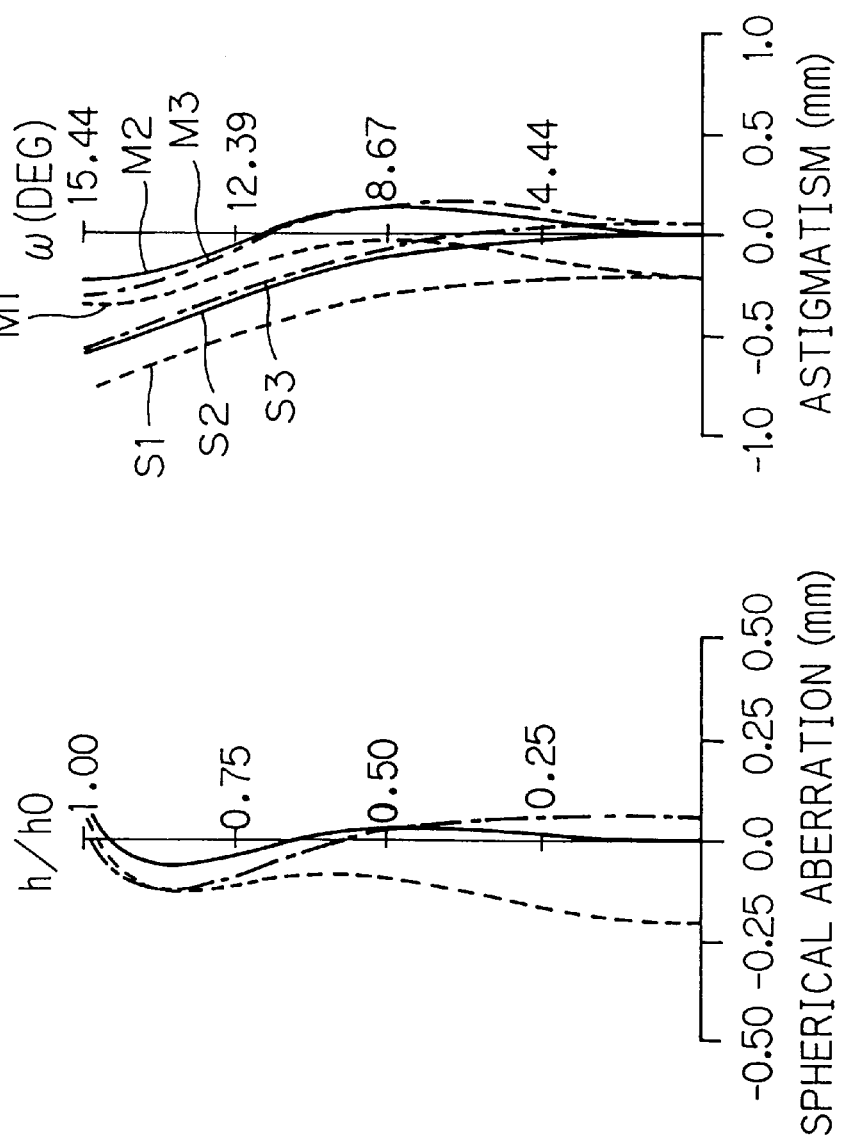

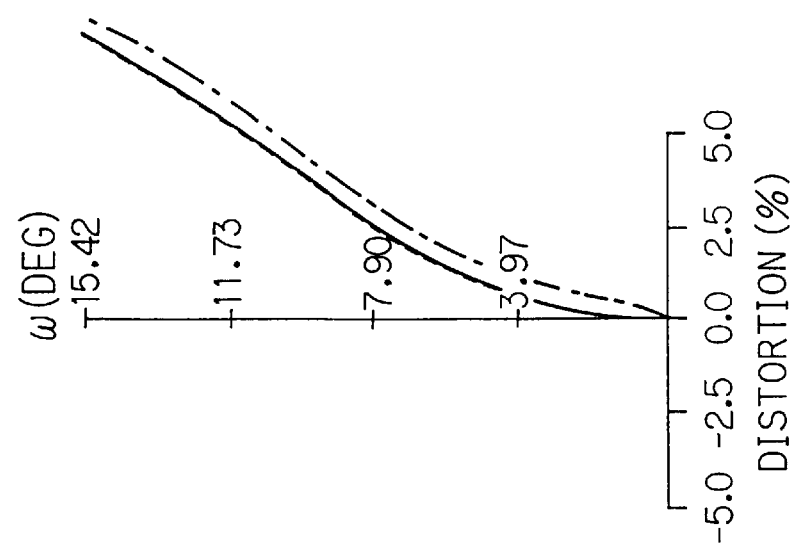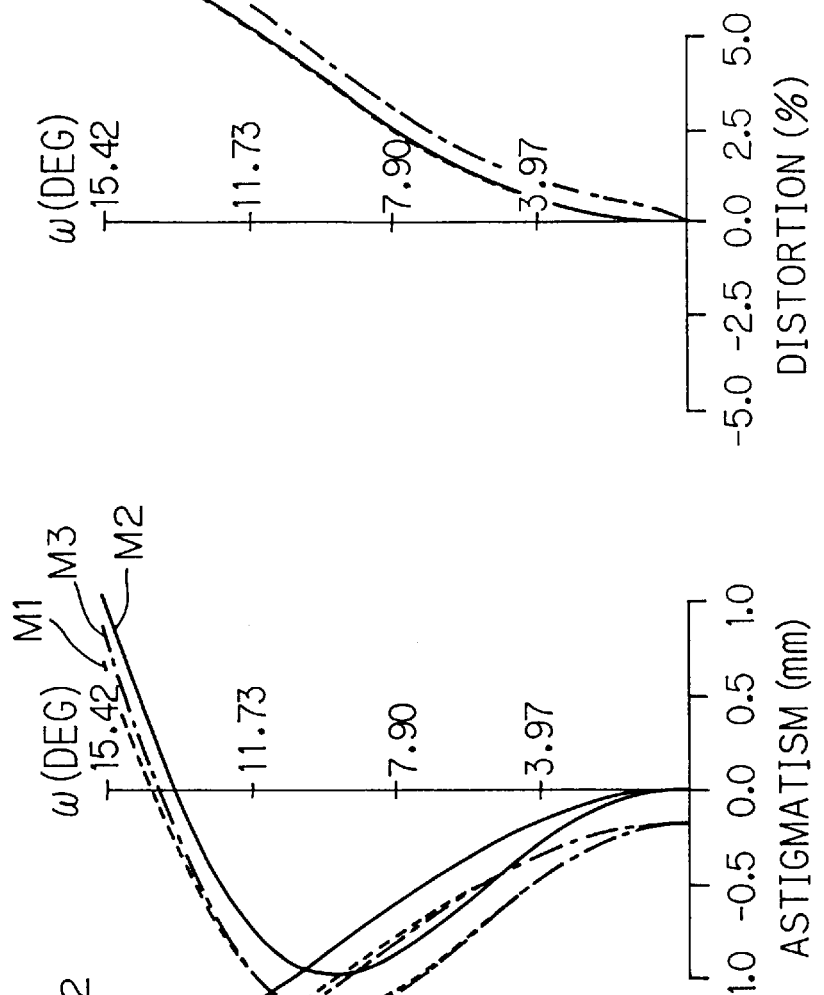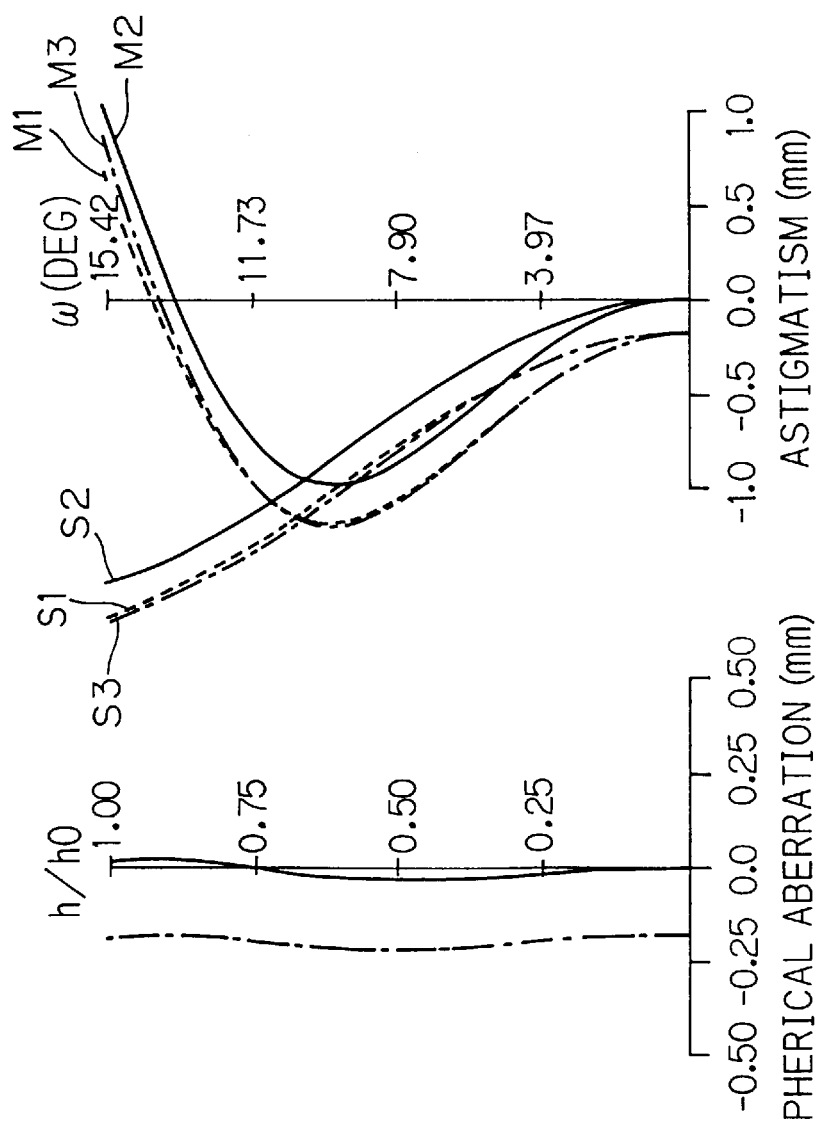

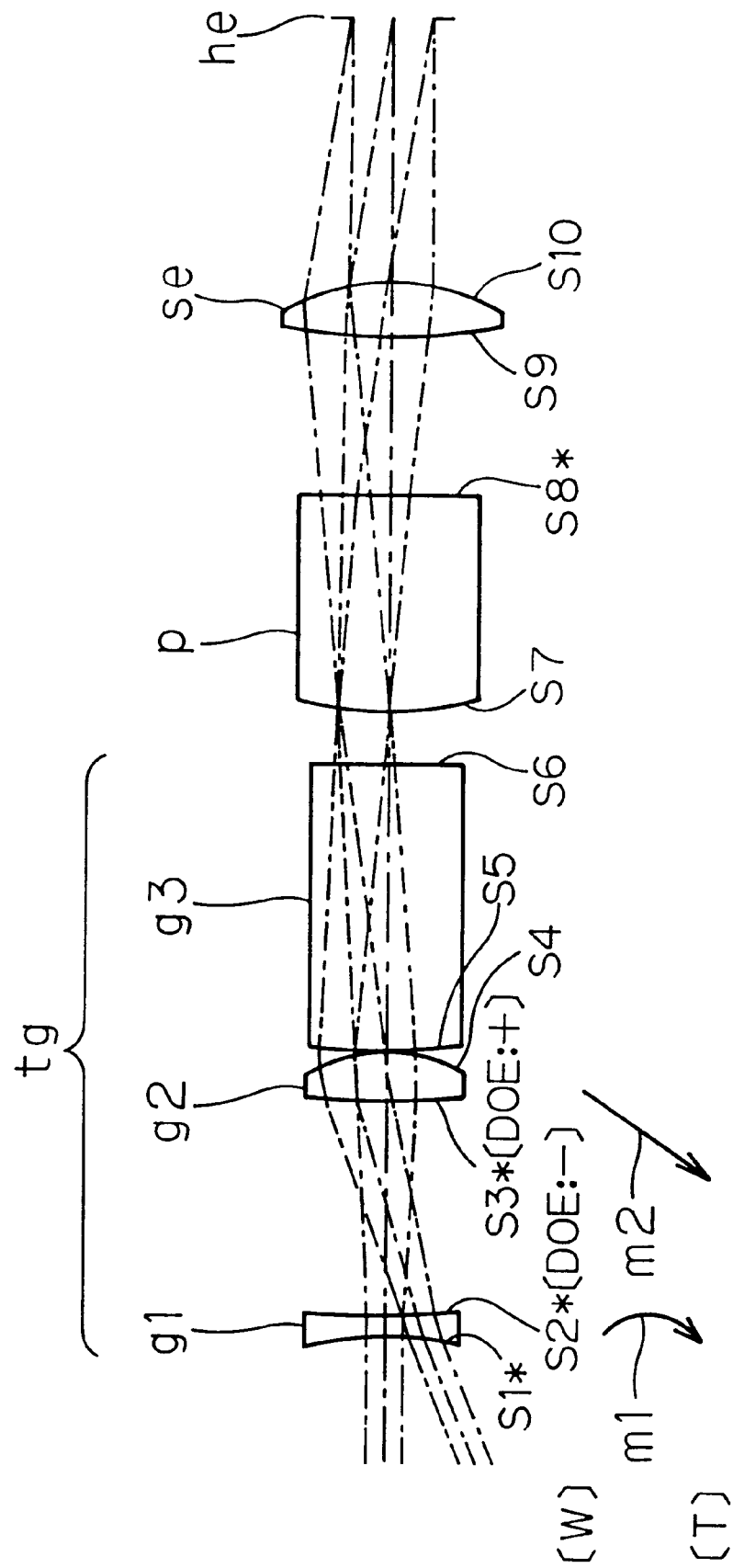

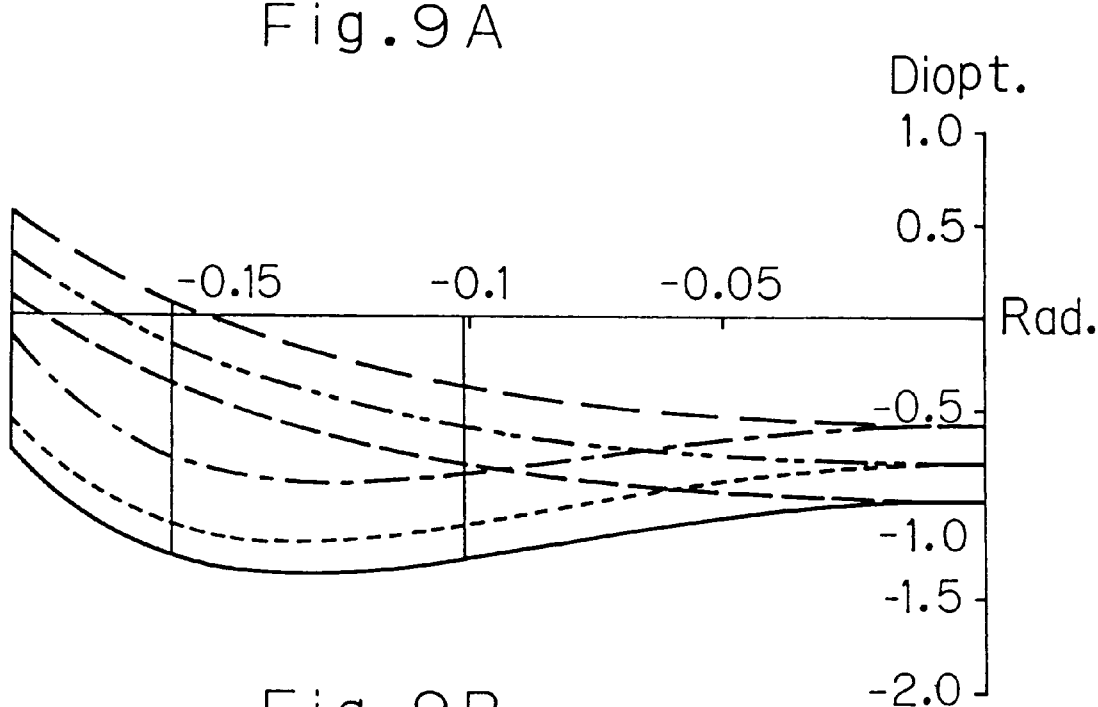
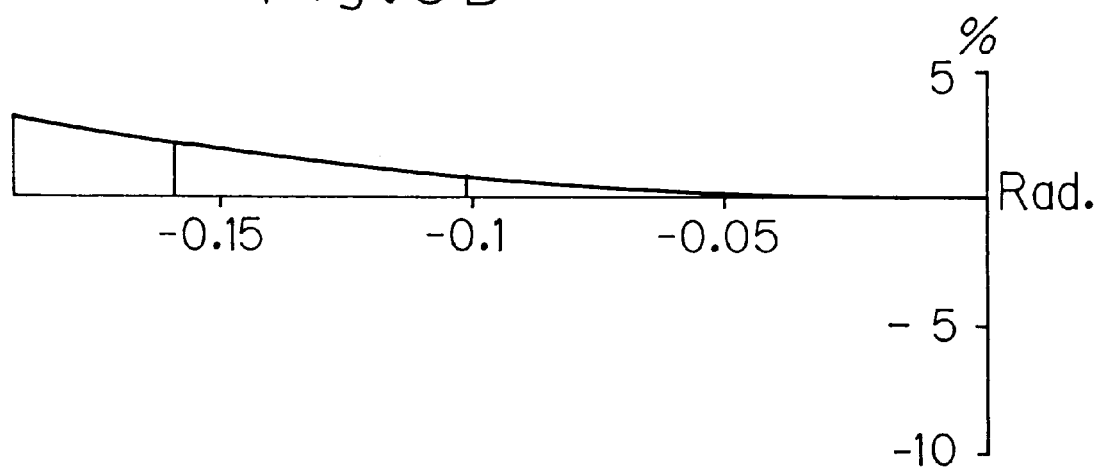
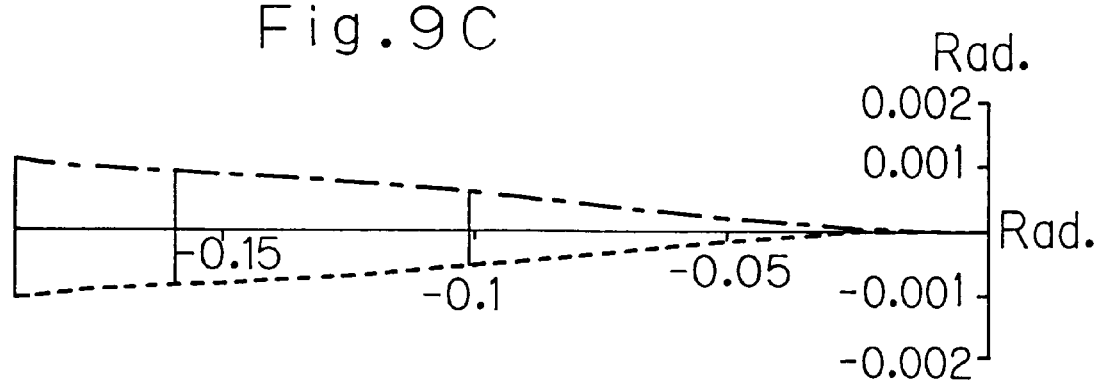

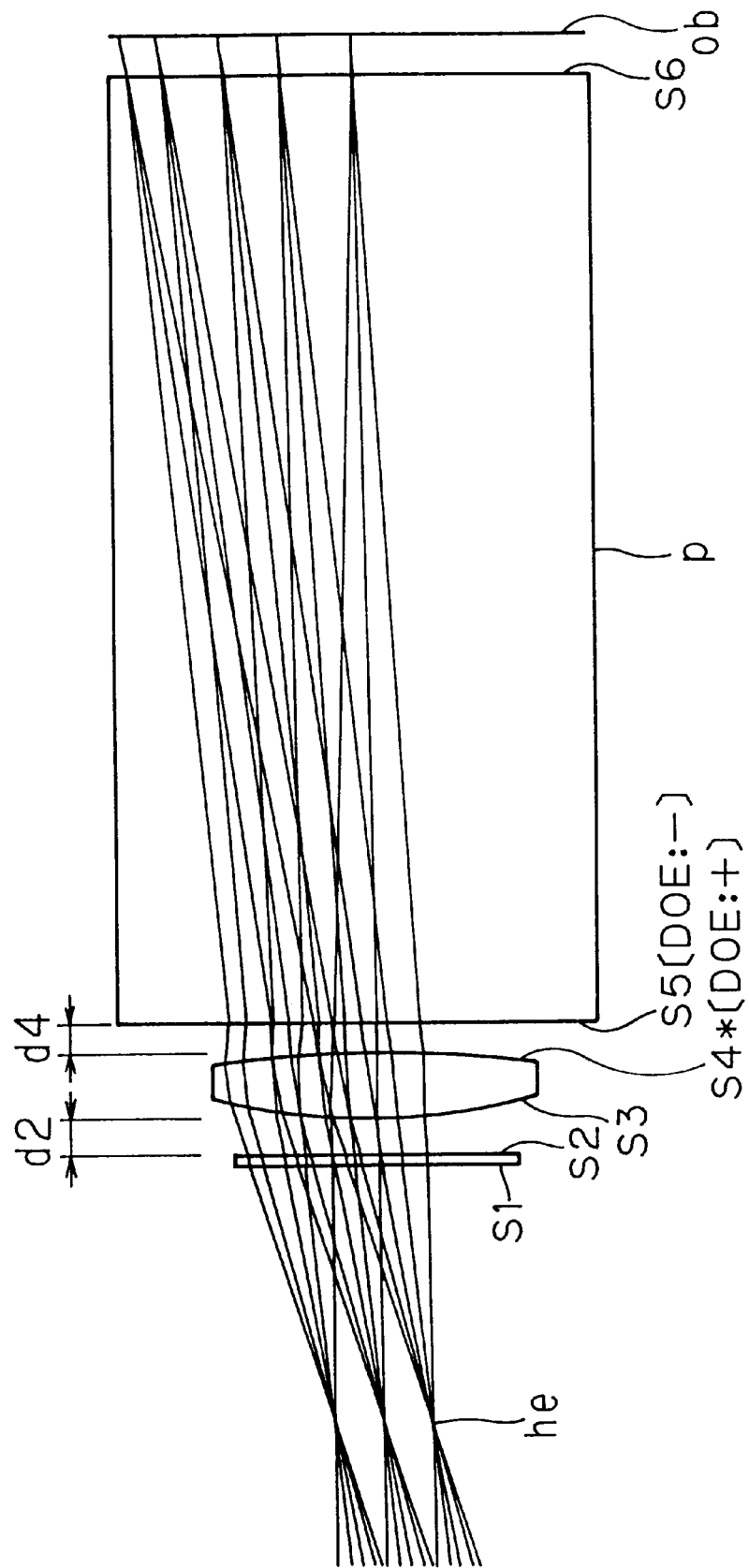

(−3.1 diopter)

(−1.0 diopter)

[+1.1 diopter]

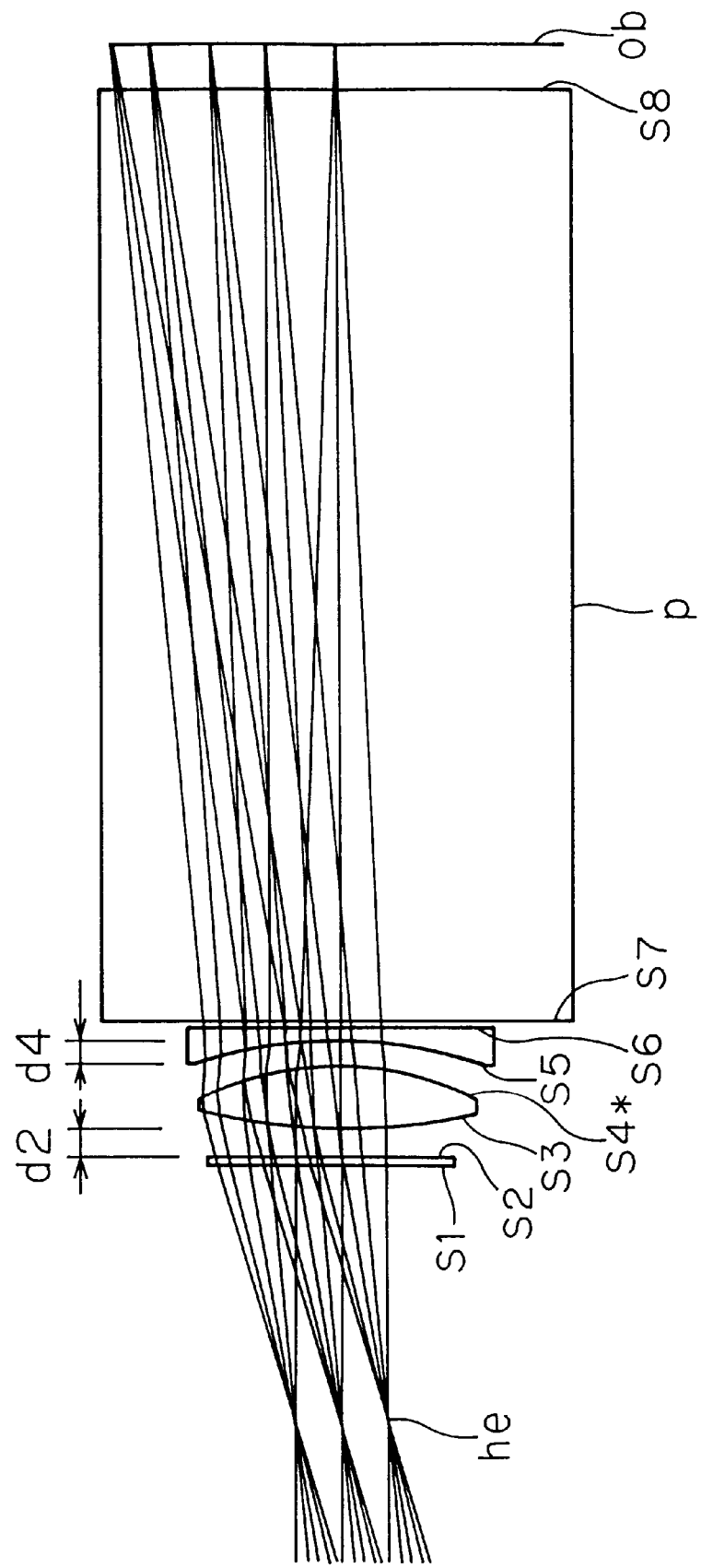

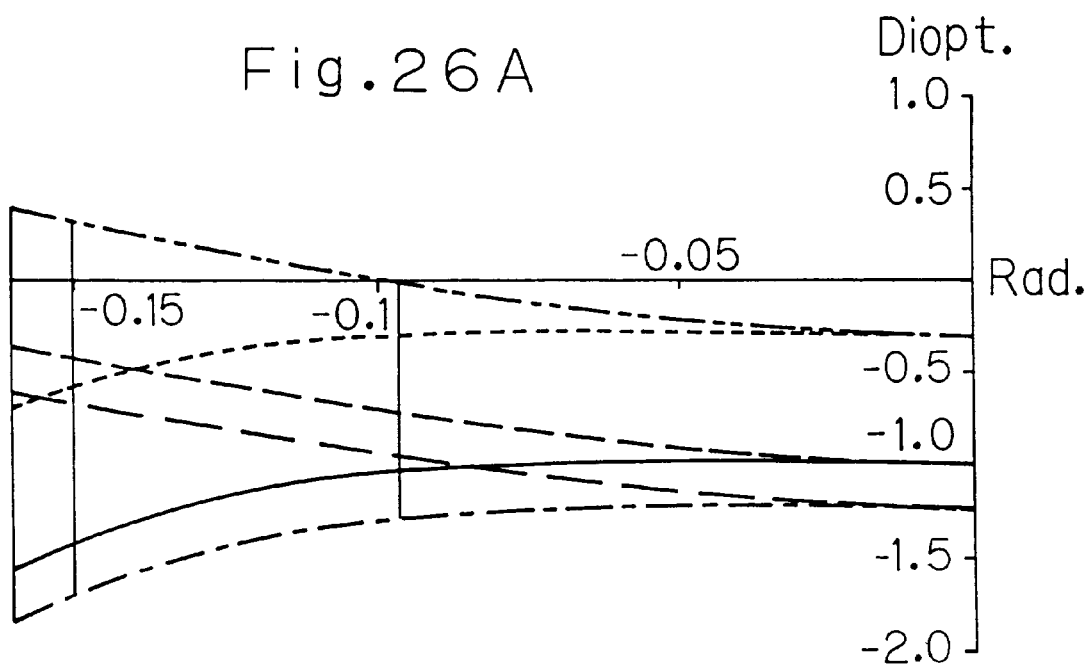
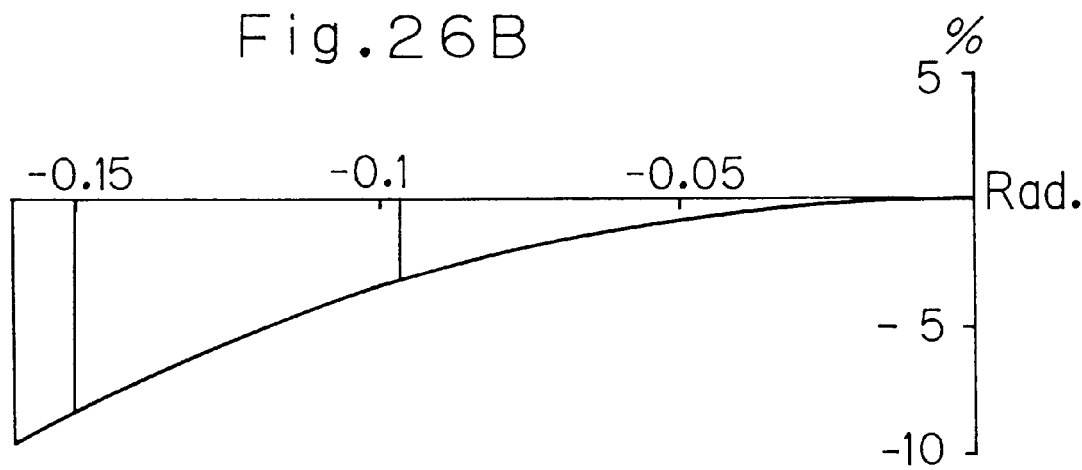
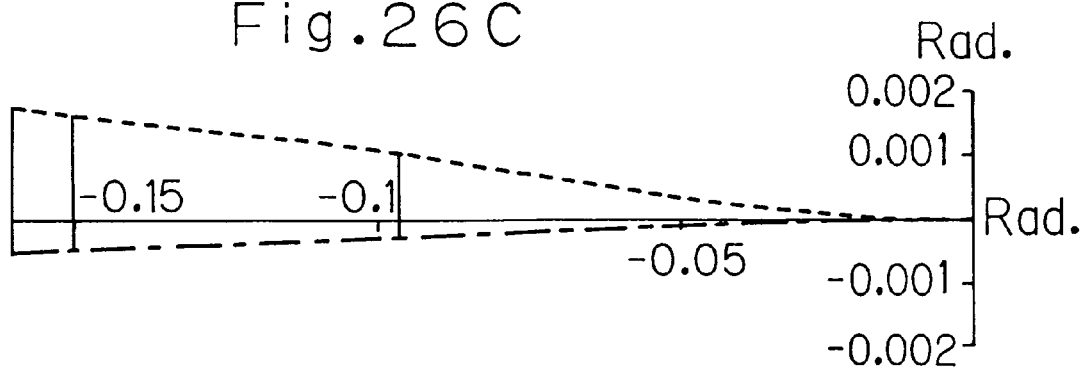

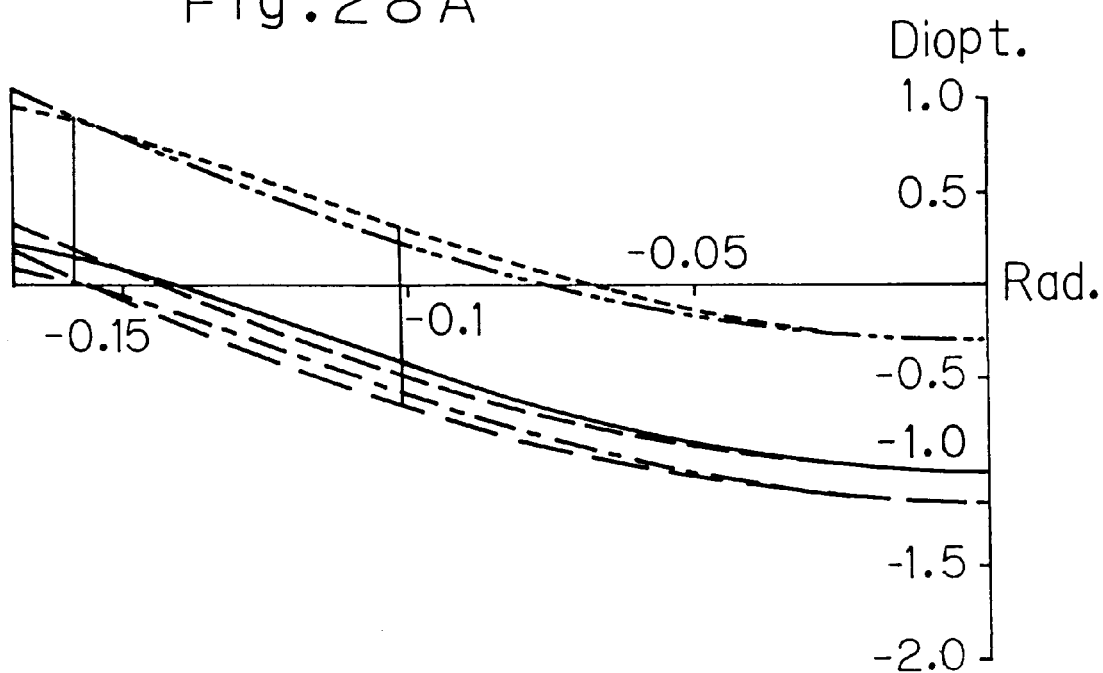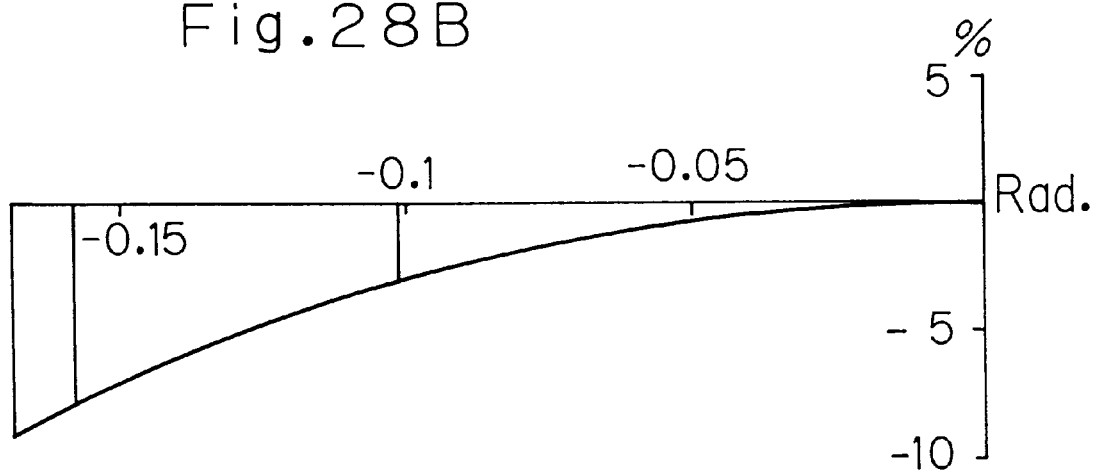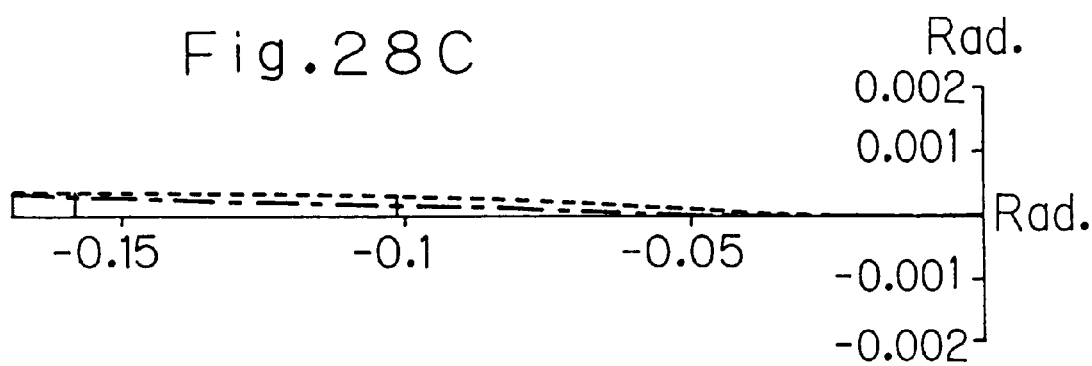

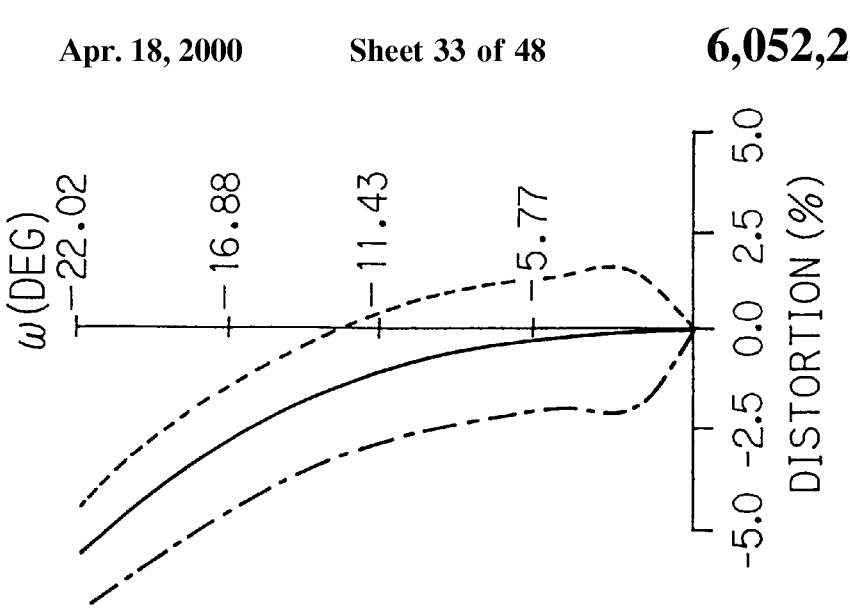
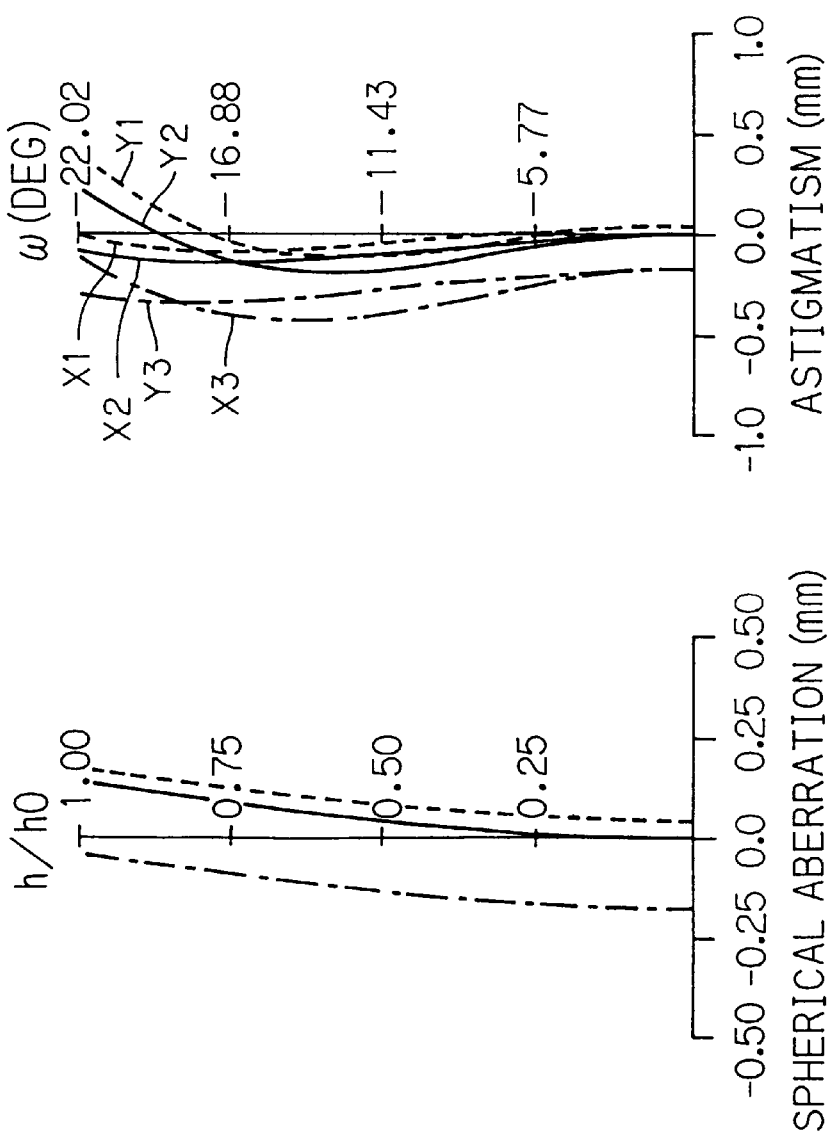

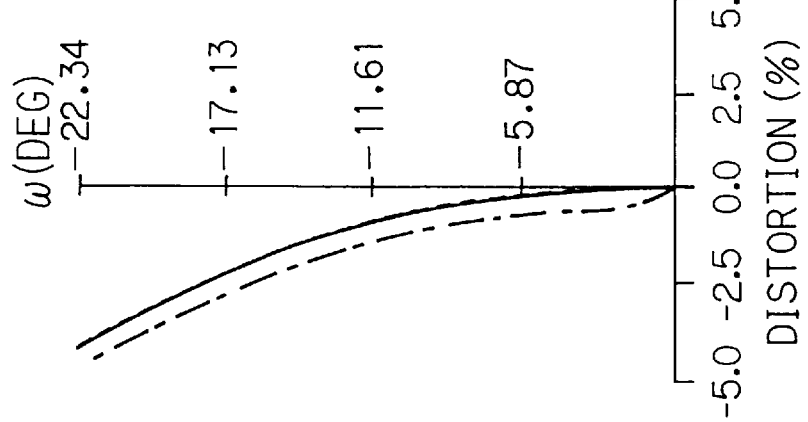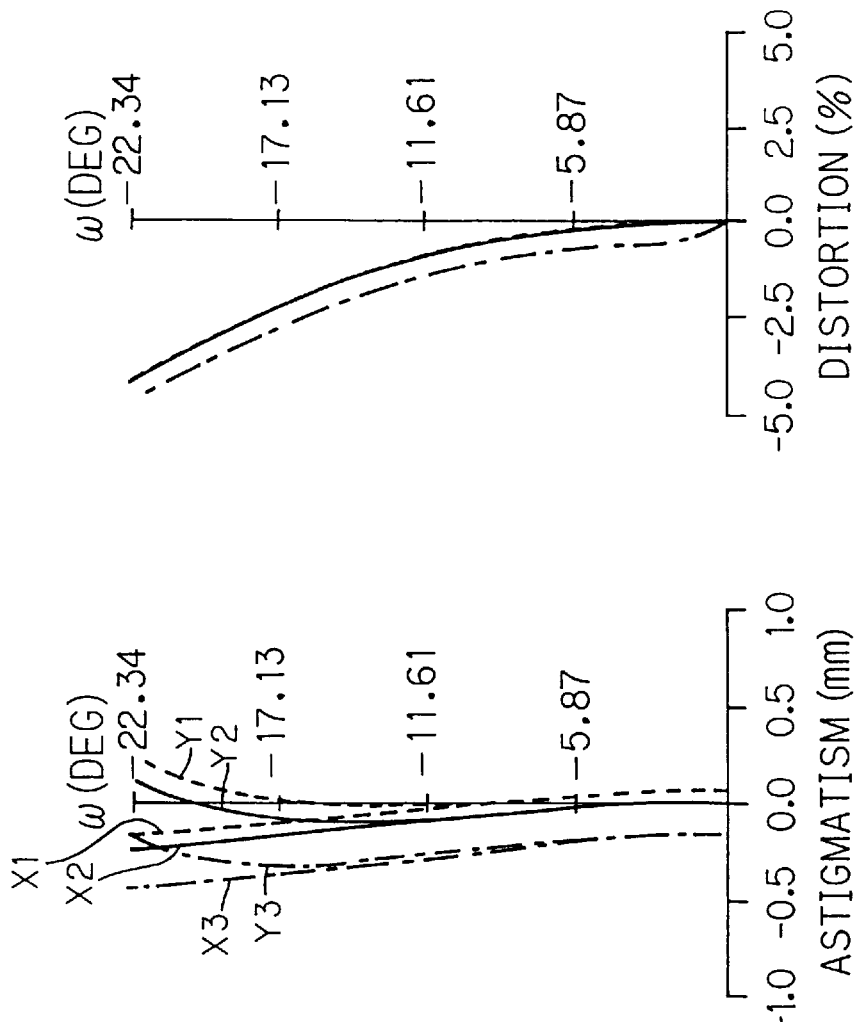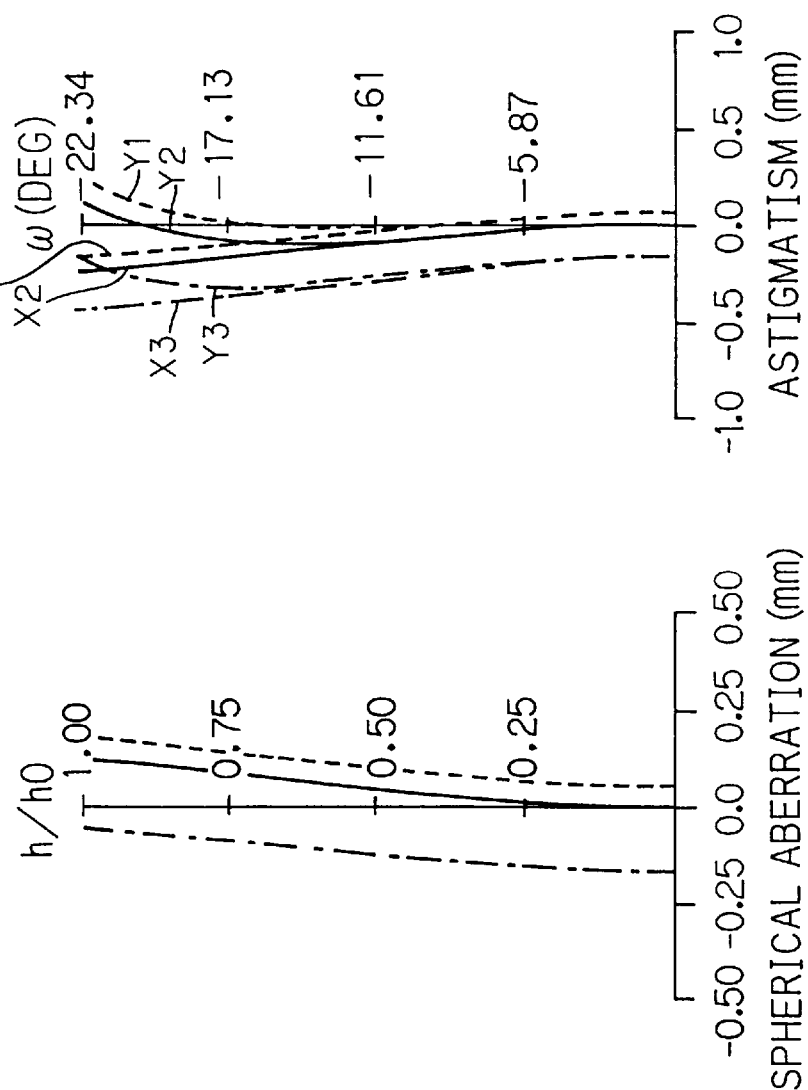

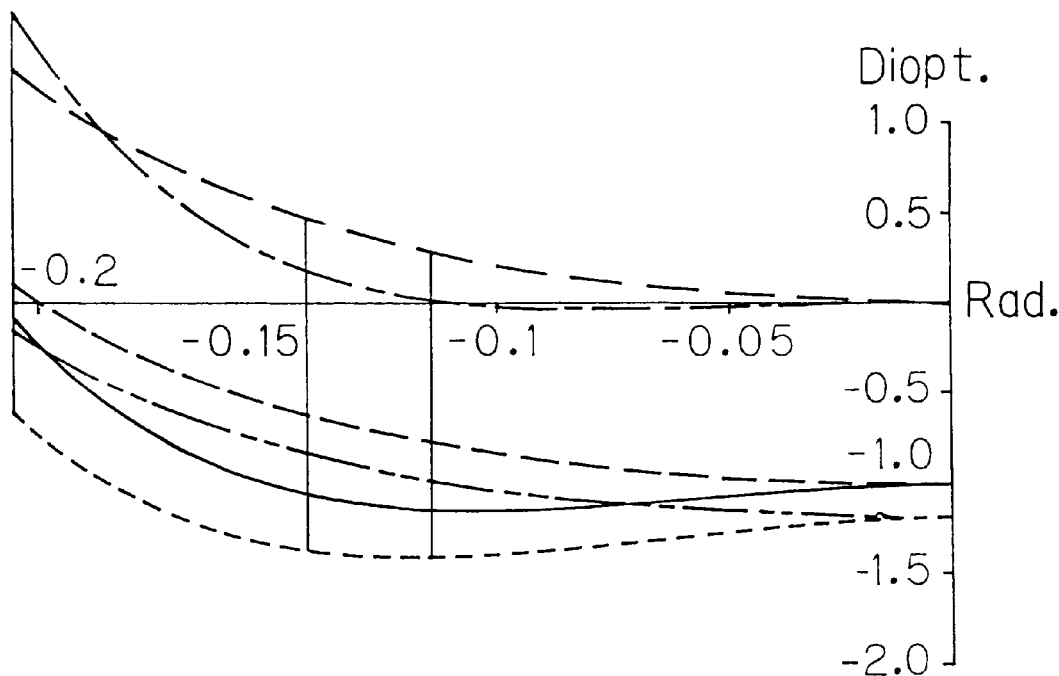
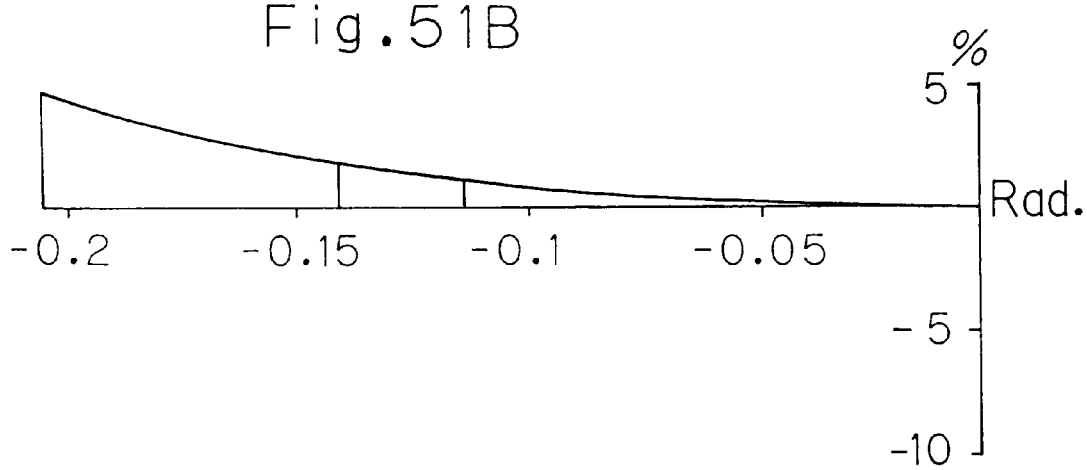
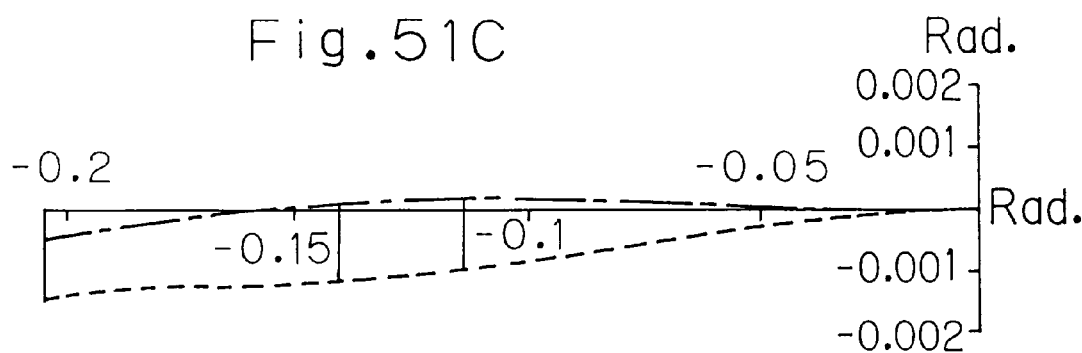

VIEWFINDER OPTICAL SYSTEM

BACKGROUND OF THE INVENTION

1. Field of the Invention

The present invention relates to a relay viewfinder optical system, and more particularly to a Kepler-type real-image viewfinder optical system.

2. Description of the Prior Art

Conventional relay viewfinder optical systems used in single-lens-reflex cameras generally include a number of lens elements, and are therefore inconveniently large, heavy, and expensive. These shortcomings can be overcome by reducing the number of lens elements, but doing so makes it difficult to correct aberration properly. In particular, chromatic aberration is difficult to correct with a reduced number of lens elements, since its correction requires a combination of lens elements made of materials having different dispersion.

On the other hand, for optical systems other than relay viewfinder optical systems, various proposals have been made to correct chromatic aberration by the use of diffracting optical surfaces (for example, U.S. Pat. No. 5,257,133, U.S. Pat. No. 5,148,314, Japanese Laid-open Patent Application H5-157963, U.S. Pat. No. 5,044,706, and U.S. Pat. No. 5,013,133.

However, in relay viewfinder optical systems, correction of chromatic aberration cannot be achieved without using a number of diffracting optical surfaces. The use of a number of diffracting optical surfaces not only leads to deterioration of diffraction efficiency and thus to aggravation of flare, but also makes relay viewfinder optical systems more expensive.

There are some other optical systems that have conventionally been known as having a diffracting optical surface. For example, an optical system composed of single lenses having a diffracting optical surface is proposed in a thesis by G. J. Swanson and W. B. Veldkamp, titled "Infrared Applications of Diffractive Optical Elements", SPIE proceedings, vol. 885, paper 22 (1988). Moreover, U.S. Pat. No. 5,446,588 proposes viewfinder optical systems in which a diffracting surface is used to correct chromatic aberrations.

The above thesis by Swanson et al. teaches that, in an achromatic lens composed of two, i.e. positive and negative, lens elements, chromatic aberration can be corrected by providing a diffracting optical surface only on the positive lens element. Moreover, U.S. Pat. No. 5,446,588 teaches that the number of lens elements constituting a viewfinder optical system can be reduced if a diffracting optical surface is used to correct chromatic aberration. However, no proposal has been made to date as to effective arrangement of a diffracting optical surface in an optical system whose optical function is determined by the arrangement of an optical element having positive power and an optical element having negative power relative to each other (for example, a zoom lens system provided with a lens unit having positive power and a lens unit having negative power).

As one type of Kepler-type real-image viewfinder optical system having a zoom function, U.S. Pat. No. 5,225,927 proposes a zoom-type viewfinder optical system suitable for use with high zoom ratios.

In the viewfinder optical system proposed in U.S. Pat. No. 5,225,927, the objective lens is of a zoom type constituted of positive, negative, and positive lens units, and includes a number of doublet lenses each composed of a positive lens having a large Abbe number and a negative lens having a small Abbe number so that chromatic aberration is corrected properly over the entire zoom range. However, the use of doublet lenses composed of two types of lenses inevitably makes the lens system larger and heavier.

On the other hand, in the viewfinder optical system proposed in U.S. Pat. No. 5,446,588, a diffracting optical surface is provided only in the eyepiece lens, and the optical performance of the optical system is evaluated by evaluating only the optical performance of the eyepiece lens. Accordingly, even if the objective lens of this optical system is provided with a zoom function, it is not possible to eliminate the chromatic aberration occurring in the objective lens, and thus it is not possible to correct chromatic aberration properly over the entire zoom range. Moreover, since the diffracting optical surface is provided in the eyepiece lens, the pattern of the diffraction grating becomes conspicuous when the observer looks at the eyepiece lens with his eye positioned away from the viewfinder. This is visually undesirable.

SUMMARY OF THE INVENTION

It is a first object of the present invention to provide a relay viewfinder optical system that is capable of correcting chromatic aberration properly with a minimal number of diffracting optical surfaces.

It is a second object of the present invention to provide an optical system having a diffracting optical surface and a Kepler-type real-image viewfinder optical system in which correction of chromatic aberration and reduction of the number of lens elements are effectively achieved by the arrangement of a diffracting optical surface.

It is a third object of the present invention to provide a Kepler-type real-image viewfinder optical system having a zoom function and capable of correcting chromatic aberration properly over the entire zoom range.

It is a fourth object of the present invention to provide a Kepler-type real-image viewfinder optical system which has a zoom function, which is capable of correcting chromatic aberration properly over the entire zoom range, and of which the pattern of the diffraction grating is not seen from the eyepiece lens side.

To achieve the above objects, according to one aspect of the present invention, a viewfinder optical system is provided with a relay lens system for focusing the primary image as a secondary image, said relay lens being approximately provided at an optical conjugate point with respect to a pupil; and a surface included in said relay lens system and having optical power of diffraction, said surface being provided between the primary image and the optical conjugate point.

According to another aspect of the present invention, an optical system is provided with a first lens element having positive optical power and including at least one surface having positive optical power of diffraction; and a second lens element having negative optical power and including at least one surface having negative optical power of diffraction.

According to another aspect of the present invention, a Kepler-type viewfinder optical system is provided with an objective lens system for focusing rays from an object as an intermediate image, said objective lens system including a first lens element having positive optical power and including at least one surface having positive optical power of diffraction and a second lens element having negative optical power and including at least one surface having negative optical power of diffraction; and an eyepiece optical system for magnifying the intermediate image.

According to another aspect of the present invention, a Kepler-type viewfinder optical system is provided with an objective lens system for focusing rays from an object as an intermediate image; and an eyepiece optical system for magnifying the intermediate image, said eyepiece optical system including a first lens element having positive optical power and including at least one surface having positive optical power of diffraction and a second lens element having negative optical power and including at least one surface having negative optical power of diffraction.

According to another aspect of the present invention, a Kepler-type viewfinder optical system is provided with an objective lens system for focusing rays from an object as an intermediate image and having a plurality of lens units, said objective lens system being zoom lens system in which the zooming is performed by moving any of the lens units along an optical axis; a surface included in the objective lens system and having optical power of diffraction; and an eyepiece optical system for magnifying the intermediate image.

According to another aspect of the present invention, a Kepler-type viewfinder optical system is provided with an objective lens system for focusing rays from an object as an intermediate image, said objective lens system comprising, from the object side, a first lens unit having positive optical power, a second lens unit having negative optical power and including at least one surface having optical power of diffraction, a third lens unit having negative optical power, and a fourth lens unit having positive optical power; and an eyepiece optical system for magnifying the intermediate image.

According to another aspect of the present invention, a Kepler-type viewfinder optical system is provided with an objective lens system for focusing rays from an object as an intermediate image, said objective lens system comprising, from the object side, a first lens unit having positive optical power, a second lens unit having negative optical power, a third lens unit having negative optical power and including at least one surface having optical power of diffraction, and a fourth lens unit having positive optical power; and an eyepiece optical system for magnifying the intermediate image.

According to another aspect of the present invention, a Kepler-type viewfinder optical system is provided with an objective lens system for focusing rays from an object as an intermediate image, said objective lens system comprising, from the object side, a first lens unit having positive optical power, a second lens unit having negative optical power, and a third lens unit having positive optical power and including at least one surface having optical power of diffraction; and an eyepiece optical system for magnifying the intermediate image.

According to still another aspect of the present invention, in a Kepler-type viewfinder optical system as noted above, the eyepiece optical system consists of surfaces having optical power of refraction.

BRIEF DESCRIPTION OF THE DRAWINGS

This and other objects and features of this invention will become clear from the following description, taken in conjunction with the preferred embodiments with reference to the accompanied drawings in which:

FIGS. 4A to 4C are aberration diagrams showing the aberrations observed in the first embodiment;

FIGS. 6A to 6C are aberration diagrams showing the aberrations observed in the second embodiment;

FIG. 7 is a diagram showing the lens construction and optical paths of a third embodiment of the present invention;

FIGS. 9A to 9C are aberration diagrams showing the aberration observed at the telephoto end of the third embodiment;

FIG. 10 is a diagram showing the lens construction and optical paths of a fourth embodiment of the present invention;

FIG. 14 is a diagram showing the lens construction and optical paths of an optical system presented as an example for comparison;

FIGS. 26A to 26C are aberration diagrams showing the aberration observed at the wide-angle end of the seventh embodiment;

FIGS. 28A to 28C are aberration diagrams showing the aberration observed at the wide-angle end of the eighth embodiment;

FIGS. 35A to 35C are aberration diagrams showing the aberration observed at the wide-angle end of the tenth embodiment;

FIGS. 37A to 37C are aberration diagrams showing the aberration observed at the wide-angle end of the eleventh embodiment;

FIGS. 51A to 51C are aberration diagrams showing the aberration observed at the telephoto end of the fifteenth embodiment.

DESCRIPTION OF THE PREFERRED EMBODIMENTS

Hereinafter, embodiments of the optical systems according to the present invention will be described with reference to the drawings.

Figure 3:
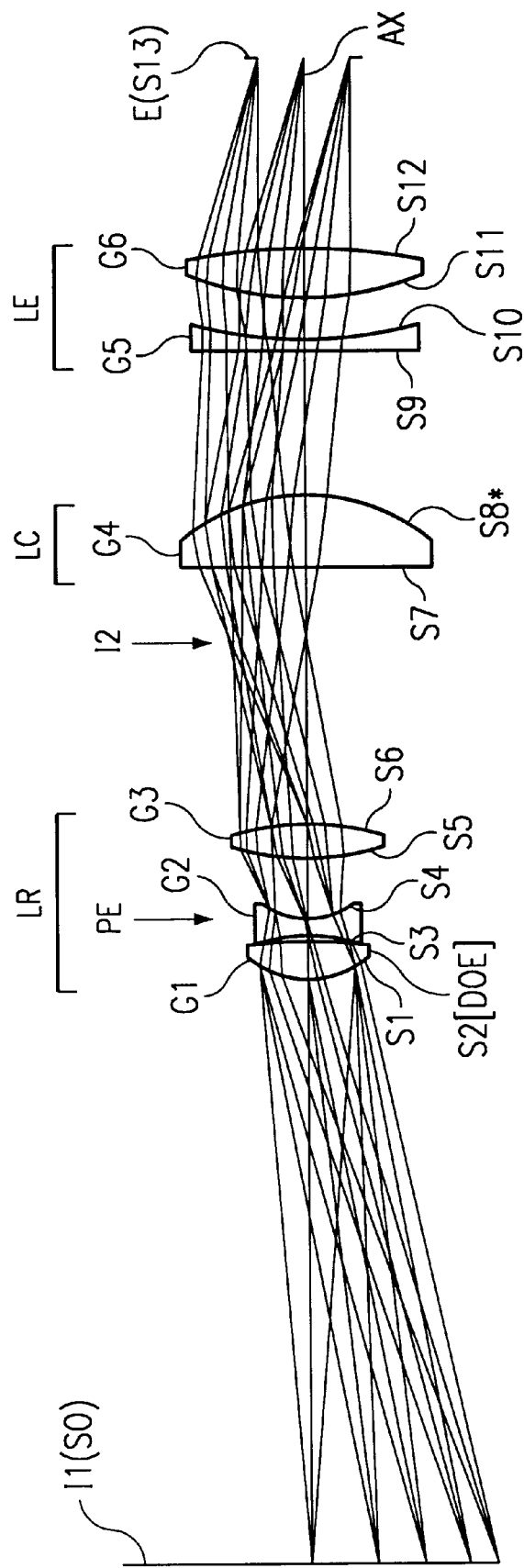
FIG. 3 is a diagram showing the lens construction and optical paths of a first embodiment of the present invention.
Figure 5:
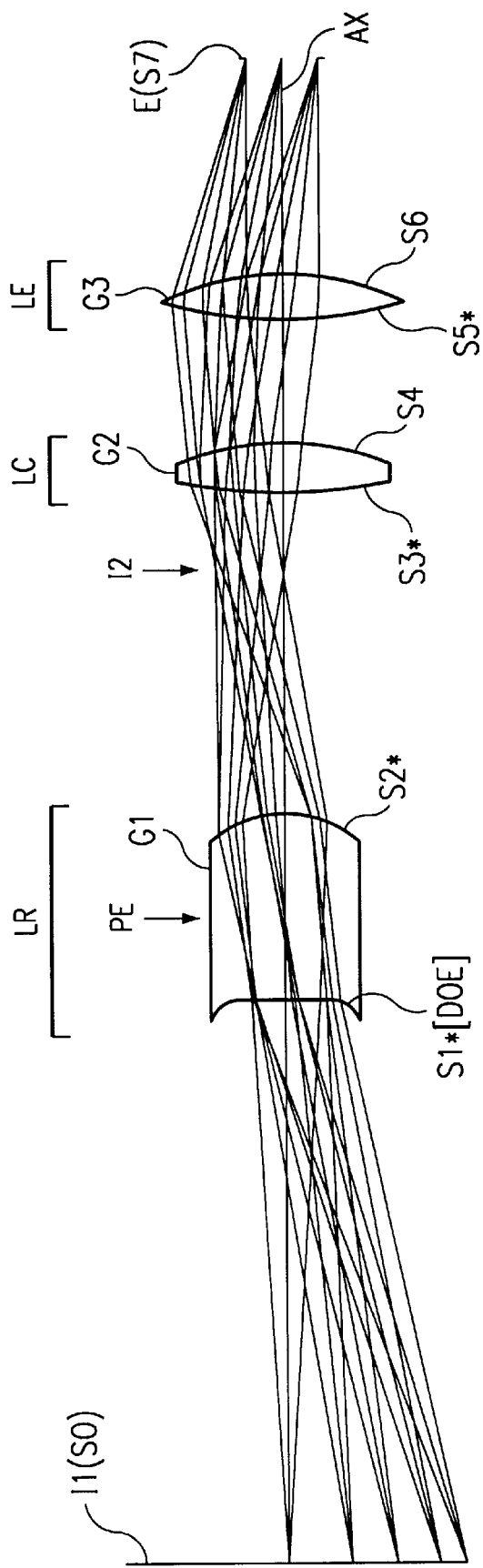
FIG. 5 is a diagram showing the lens construction and optical paths of a second embodiment of the present invention.

FIGS. 3 and 5 show the lens construction and optical paths of relay viewfinder optical systems as a first and a second embodiment, respectively, of the present invention. In these embodiments, the order of diffraction on diffracting optical surfaces is +1. In FIGS. 3 and 5, Si (I=0, 1, 2, 3, ...) represents the i-th surface from the primary image I1 (SO) side, and Gi (I=1, 2, ...) represents the i-th lens element from the primary image I1 side. Moreover, in FIGS. 3 and 5, a surface Si marked with an asterisk (*) is an aspherical surface, and a surface Si marked with [DOE] is a surface where a diffracting optical surface is formed on a refracting optical surface.

The primary image I1 corresponds to the focal plane of the taking lens (not shown). The relay viewfinder optical systems of the first and second embodiments are both constituted of, from the primary image I1 side, a relay lens LR, a condenser lens LC, and an eyepiece lens LE. The relay lens LR is disposed at a position that is substantially conjugate to the pupil E, and serves to form a secondary image I2 by refocusing the primary image I1. The condenser lens LC serves to condense the light beam exiting from the relay lens LR and to direct it to the eyepiece lens LE. The eyepiece lens LE serves to magnify the secondary image I2 formed by the relay lens LR. The thus magnified secondary image I2 is observed by the pupil (eye) E of an observer.

In the relay viewfinder optical system of the first embodiment, the relay lens RL is composed of, from the primary image I1 side, a positive biconvex lens element G1 (having a diffracting optical surface formed on its pupil E side surface S2), a negative biconcave lens element G2, and a positive biconvex lens element G3. The condenser lens LC is composed of a positive biconvex lens element G4 (having an aspherical surface on its pupil E side surface S8). The eyepiece lens LE is composed of, from the primary image I1 side, a negative meniscus lens element G5 with its concave surface facing toward the pupil E, and a positive biconvex lens element G6. Of these lens elements, the second and fourth lens elements G2 and G4 are plastic lenses made of PC (polycarbonate).

In the relay viewfinder optical system of the second embodiment, the relay lens LR is composed of a plano-convex lens element G1 (having aspherical surfaces on its both surfaces S1 and S2 and having a diffracting optical surface on its primary image I1 side surface S1) with its convex surface facing toward the pupil E. The condenser lens LC is composed of a positive biconvex lens element G2 (having an aspherical surface on its primary image I1 side surface S3). The eyepiece lens LE is composed of a positive biconvex lens element G3 (having an aspherical surface on its primary image I1 side surface S5). All of the three lens elements G1 to G3 are plastic lenses made of PMMA (polymethyl methacrylate).

The first and second embodiments are both characterized in that they have a diffracting optical surface between the position PE conjugate to the pupil E and the primary image I1. Since the relay lens LR is disposed at a position that is substantially conjugate to the pupil E, the position PE conjugate to the pupil E (i.e. the position where the image of the pupil E is formed) comes in the vicinity of the relay lens LR, and accordingly the diffracting optical surface is formed on one of the refracting optical surfaces included in the relay lens LR disposed between the conjugate position PE and the primary image I1. As to this arrangement of the diffracting optical surface at the conjugate position, a description will be given below.

Figure 1:
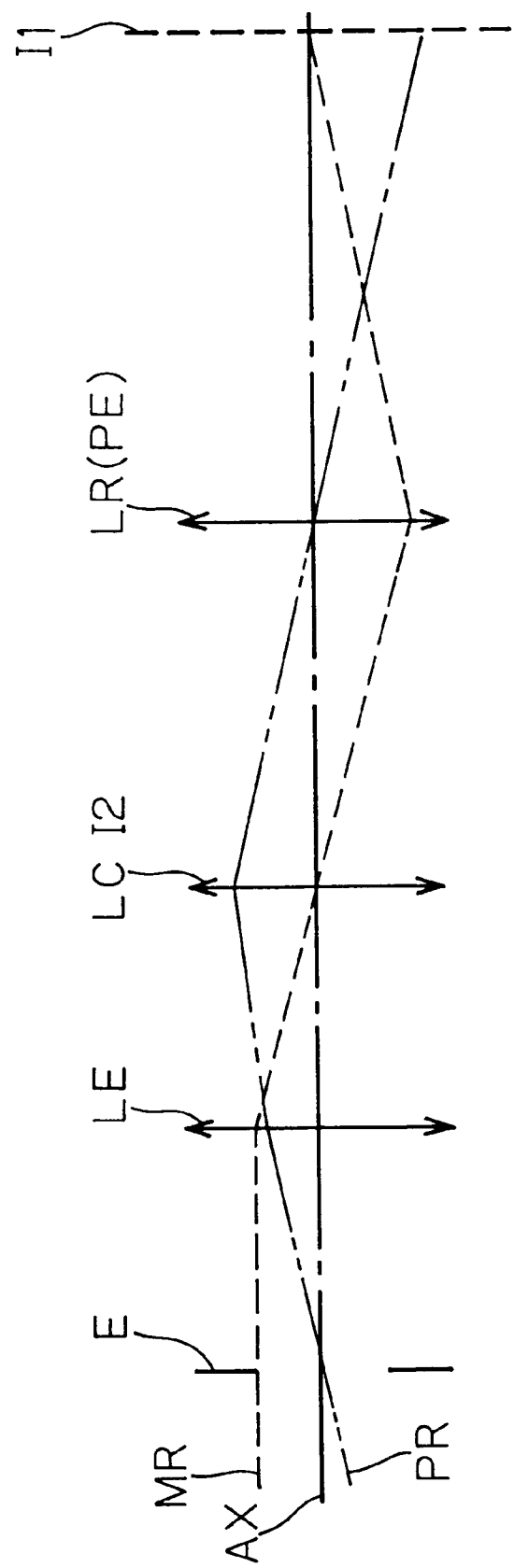
FIG. 1 is a diagram schematically showing the paraxial arrangement and optical paths of a typical relay viewfinder optical system.

FIG. 1 shows the paraxial arrangement of a typical relay viewfinder optical system. In this figure, the primary image I1 (corresponding, here, to the object plane) and the pupil E are illustrated in reversed positions in order to make it easier to follow the paths of light-rays (an ideal marginal ray MR and an ideal principal ray PR). The pupil E corresponds to the position of an observer's eye, and is usually substantially conjugate to the relay lens LR. The condenser lens LC is disposed in the vicinity of the focal point of the eyepiece lens LE, and serves to form an image of the pupil E at the position of the relay lens LR.

There are two types of chromatic aberration: axial chromatic aberration and lateral chromatic aberration. Assume that the coefficient of axial chromatic aberration is L, the coefficient of lateral chromatic aberration is T, the eyepiece lens is a first lens, the condenser lens LC is a second lens, and the relay lens is a third lens. Then, the total of each type of chromatic aberration occurring on the refracting optical surfaces of the i-th lens (here, i=1, 2, or 3) is expressed by formulae (A) and (B) below:

$$L = \sum_i \{hi^2(\phi i/vi)\} \qquad (A)$$

$$T = \sum_i \{hi \cdot hi\#(\phi i/vi)\} \qquad (B)$$

where $\phi i$: the power of the refracting optical surfaces of the i-th lens;

$vi$: the Abbe number of the refracting optical surfaces of the i-th lens;

$hi$: the height at which the ideal marginal ray MR crosses the i-th lens;

$hi\#$: the height at which the ideal principal ray PR crosses the i-th lens.

Both the power $\phi i$ and the Abbe number $vi$ of the refracting optical surfaces of the i-th lens are always positive ($\phi i>0$, $vi>0$). The height $hi$ at which the ideal marginal ray MR crosses the i-th lens and the height $hi\#$ at which the ideal principal ray PR crosses the i-th lens change their sign as shown in Table 1.

As for axial chromatic aberration, since both $hi^2$ and $\phi i/vi$ of both the eyepiece lens LE and the relay lens LR are positive ($h1^2$, $h3^2>0$; $\phi 1/v1$, $\phi 3/v3>0$), the axial chromatic aberration occurring in the eyepiece lens LE and that occurring in the relay lens LR are added together. On the other hand, since h2 of the condenser lens LC is zero, the refracting optical surfaces of the condenser lens LC do not affect the coefficient of axial chromatic aberration L. Accordingly, the coefficient of axial chromatic aberration L is always positive (L>0). This indicates that axial chromatic aberration cannot be corrected with a combination of single convex lenses alone. As for lateral chromatic aberration, since h2 of the condenser lens LC and h3# of the relay lens LR are both zero (h2=h3#=0), lateral chromatic aberration occurs only in the eyepiece lens LE, to the degree represented by the term h1·h1#($\phi 1/v1$).

When the relay viewfinder optical system includes diffracting optical surfaces, the axial chromatic aberration and lateral chromatic aberration occurring on the diffracting optical surface of the i-th lens are respectively added to those expressed by formulae (A) and (B). Accordingly, the total of each type of chromatic aberration occurring on the refracting and diffracting optical surfaces constituting the relay viewfinder optical system are expressed by formulae (C) and (D) below:

$$L = \sum_i \left[hi^2\left\{\left(\frac{\phi i}{vi}\right)+\left(\frac{\phi i'}{vi'}\right)\right\}\right] \qquad (C)$$

$$T = \sum_i \left[hi^2 \cdot hi\#\left\{\left(\frac{\phi i}{vi}\right)+\left(\frac{\phi i'}{vi'}\right)\right\}\right] \qquad (D)$$

where $\phi i'$: the power of the diffracting optical surface of the i-th lens;

$vi'$: the Abbe number of the diffracting optical surface of the i-th lens.

The Abbe number $v'$ of a diffracting optical surface is defined by formula (E) below. From formula (E), it is understood that a diffracting optical surface has remarkably large negative dispersion (i.e. a remarkably small Abbe number) of $v'=-3.45$.

$$v'=\lambda d/(\lambda F-\lambda C) \qquad (E)$$

where $\lambda d$: the wavelength of d-lines (=588 nm);

$\lambda F$: the wavelength of F-lines (=486 nm);

$\lambda C$: the wavelength of C-lines (=656 nm).

Figure 2:
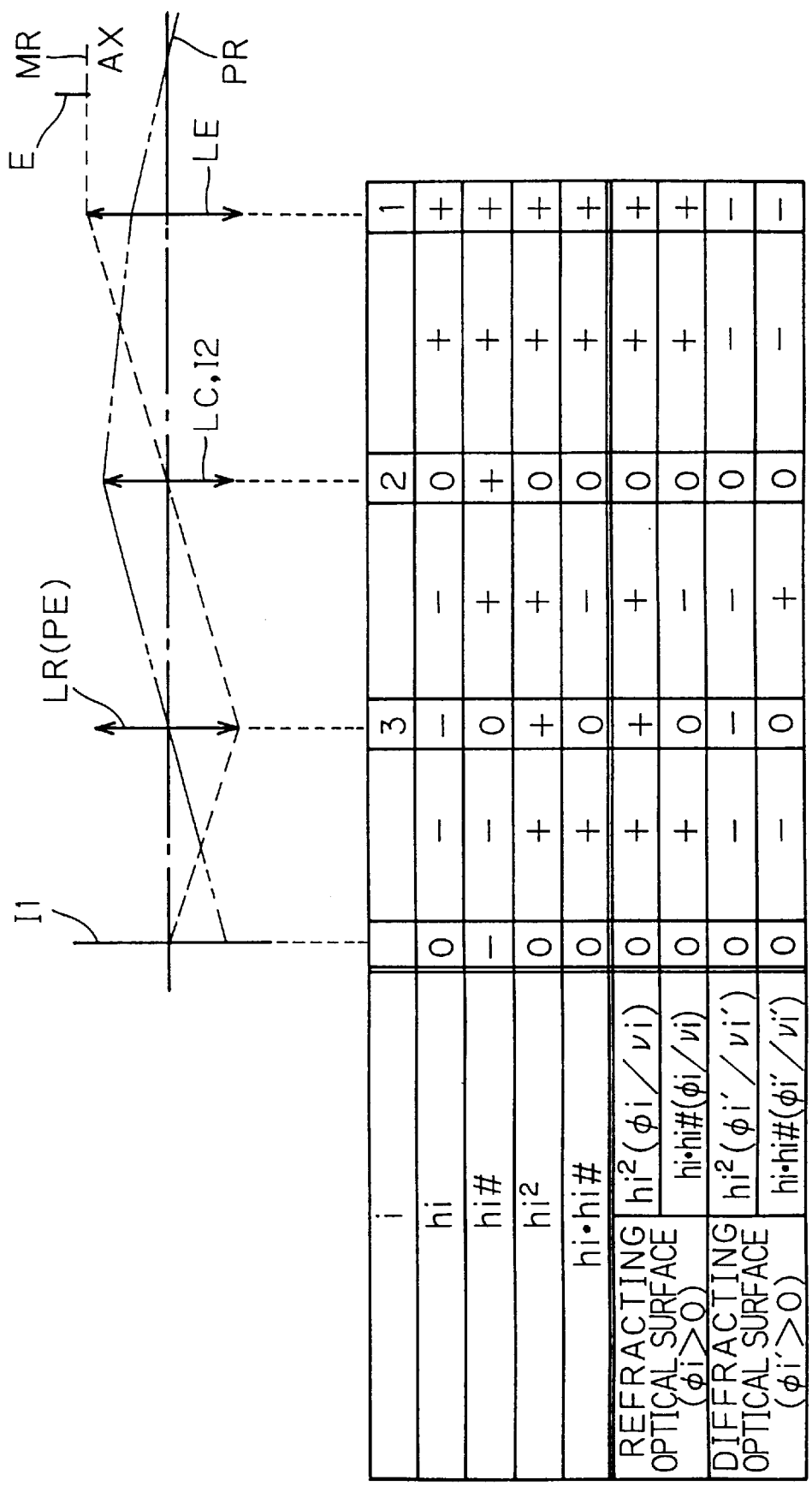
FIG. 2 is a diagram showing the relation between the height of a light ray and the degree of chromatic aberration at some particular positions of the relay viewfinder optical system of FIG. 1.

When the power $\phi i'$ of the diffracting optical surface of the i-th lens is positive ($\phi i'>0$), the term $\phi i'/vi'$ in formulae (C) and (D) is negative ($\phi i'/vi'<0$). This means that the diffracting optical surface has optical power that tends to correct both types of chromatic aberration occurring on the refracting optical surfaces. Accordingly, in order to reduce both the coefficient of axial chromatic aberration L and the coefficient of lateral chromatic aberration T, it is necessary to provide each of the lens units having optical power (i.e. the eyepiece lens LE, the condenser lens LC, and the relay lens LR) with a diffracting optical surface so that the term $\{(\phi i/vi)=(\phi i'/vi')\}$ in formulae (C) and (D) becomes equal to zero. However, with regard to the condenser lens LC, since both $h2^2$ and $h2 \cdot h2\#$ are zero (h2=0, hence $h2^2=h2\cdot h2\#=0$), the refracting optical surfaces of the condenser lens LC affect neither the coefficient L of axial chromatic aberration nor the coefficient T of lateral chromatic aberration. Therefore, in order to correct both axial chromatic aberration and lateral chromatic aberration, only the eyepiece lens LE and the relay lens LR need to be provided with a diffracting optical surface. FIG. 2 shows the chromatic aberration occurring on the refracting and diffracting surfaces of the relay viewfinder optical system (FIG. 1), as observed at some particular positions therein, together with hi, hi#, and other parameters, with a "+", "0", or "−" indication for each item.

As described above, chromatic aberration can be corrected if the eyepiece lens LE and the relay lens LR are provided with a diffracting optical surface. However, providing both the eyepiece lens LE and the relay lens LR with a diffracting optical surface leads to deterioration of diffraction efficiency on the diffracting optical surfaces, and thus to aggravation of flare. To lessen flare, it is necessary to reduce the number of diffracting optical surfaces. If, as in the first and second embodiments, a diffracting optical surface is provided only in the relay lens LR and in such a way that the diffracting optical surface can most effectively serve to correct chromatic aberration, it is not necessary to provide the eyepiece lens LE with a diffracting optical surface. The reason is as follows.

First, assume that the relay lens LR has a refracting optical surface at the position PE conjugate to the pupil E (at this conjugate position PE, h3<0 and h3#=0, as shown in FIG. 2). In this case, if a diffracting optical surface is formed on this refracting optical surface, the axial chromatic aberration occurring on the refracting surfaces of the relay lens LR and the eyepiece lens LE $\{h1^2(\phi1/v1), h3^2(\phi3/v3)>0\}$ is canceled out by the axial chromatic aberration occurring on the diffracting surface of the relay lens LR $\{h3^2(\phi3'/v3')<0\}$. Accordingly, it is possible to eliminate the axial chromatic aberration occurring over the entire system as a whole. However, since the above diffracting optical surface does not serve to correct lateral chromatic aberration (h3·h3#=0), it is not possible to correct the lateral chromatic aberration occurring on the refracting surfaces of the eyepiece lens LE $\{h1\cdot h1\#(\phi1/v1)>0\}$, unless the eyepiece lens LE is provided with a diffracting optical surface.

Next, assume that the relay lens LR is disposed between the position PE conjugate to the pupil E and the primary image I1, and that a diffracting optical surface is formed on one of the refracting optical surfaces of this relay lens LR. In this case, on the diffracting optical surface, h3·h3# is positive, and h3·h3#($\phi3'/v3'$) is negative, as seen from FIG. 2. Accordingly, the lateral chromatic aberration occurring on the refracting optical surfaces of the eyepiece lens LE $\{h1\cdot h1\#(\phi1/v1)>0\}$ is canceled out by the lateral chromatic aberration occurring on the diffracting optical surface of the relay lens LR $\{h3\cdot h3\#(\phi3'/v3')<0\}$. Thus, it is possible to eliminate the lateral chromatic aberration occurring over the entire system as a whole.

As described above, chromatic aberration occurring on refracting optical surfaces can be corrected with a diffracting optical surface, and proper arrangement of the diffracting optical surface makes possible proper correction of both axial chromatic aberration and lateral chromatic aberration. In addition, proper arrangement of a diffracting surface helps reduce the number of diffracting optical surfaces, and thus helps minimize flare, which results from deterioration of diffraction efficiency.

It is also possible to eliminate the axial chromatic aberration occurring in the eyepiece lens LE by providing a diffracting optical surface only in the eyepiece lens LE. In this case, however, since the axial chromatic aberration occurring on the refracting optical surfaces disposed behind the conjugate position PE is all positive, it is necessary to correct all the axial chromatic aberration occurring over the entire system with the negative axial chromatic aberration occurring on the diffracting optical surface of the eyepiece lens LE. This requires that the diffracting optical surface of the eyepiece lens LE be designed in consideration of the total axial chromatic aberration of the entire system. However, if the diffracting optical surface of the eyepiece lens LE is designed in consideration of the total axial chromatic aberration of the entire system, the lateral chromatic aberration occurring over the entire system is overcorrected. Therefore, it is not possible to correct properly both the axial chromatic aberration and lateral chromatic aberration occurring over the entire system in a construction where a diffracting optical surface is provided only in the eyepiece lens LE.

In the first embodiment, the pupil E, which corresponds to the position from which an observer observes through the viewfinder optical system, comes at a position that is substantially conjugate to the position of the second lens element G2 of the relay lens LR. Moreover, a diffracting optical surface having positive power is provided on the pupil E side surface S2 (disposed on the primary image I1 side of the position PE conjugate to the pupil E) of the first lens element G1 included in the relay lens LR. This diffracting optical surface serves to correct axial chromatic aberration and lateral chromatic aberration.

In the second embodiment, the pupil E comes at a position that is substantially conjugate to the middle position of the relay lens LR. Moreover, a diffracting optical surface having positive power is provided on the primary image I1 side S1 (disposed on the primary image I1 side of the position PE conjugate to the pupil E) of the relay lens LR, which is composed of one lens element G1. This diffracting optical surface serves to correct axial chromatic aberration and lateral chromatic aberration.

It is preferable that, as in the second embodiment, the diffracting optical surface be formed on a refracting optical surface having an aspherical shape. The power of the diffracting optical surface offers some of the effects as obtained by the use of an aspherical surface, but, as long as the diffracting optical surface is formed on a refracting optical surface (base surface) that is a spherical surface, it is impossible to eliminate chromatic spherical aberration and chromatic coma. If the diffracting optical surface is formed on an aspherical surface, it is possible to correct basic spherical aberration with the aspherical surface, and to correct chromatic aberration with the diffracting optical surface. In addition, it is possible to shape the aspherical surface and the diffracting optical surface at the same time by, for example, machining. This leads to the reduction of production time, and to the improvement of production accuracy.

Moreover, in either embodiment, it is preferable that condition (1) below be satisfied:

$$0.05 < \frac{\phi d}{\phi t} < 0.2 \quad (1)$$

where
  $\phi d$: the optical power of diffraction of the diffracting optical surface included in the relay lens system LR;
  $\phi t$: the composite optical power of both diffraction and refraction of the diffracting and refracting optical surfaces included in the relay lens system LR.

If the lower limit of condition (1) is exceeded, the power of the diffracting optical surface is insufficient, with the result that axial chromatic aberration is undercorrected. If the upper limit of condition (1) is exceeded, the power of the diffracting optical surface is excessive, with the result that axial chromatic aberration is overcorrected.

Tables 2 and 3 list the construction data of the relay viewfinder optical systems of the first and second embodiments (FIGS. 3 and 5), respectively.

In tables 2 and 3, Si (i=0, 1, 2, 3, . . . ) represents the i-th surface from the focal plane S0 side (i.e. from the primary image I1 side), ri (i=0, 1, 2, 3, . . . ) represents the radius of curvature of the i-th surface from the focal plane S0 side, di (i=0, 1, 2, 3, . . . ) represents the i-th axial distance from the focal plane S0 side, and Ni (i=1, 2, . . . ) and vi (i=1, 2, . . . ) respectively represent the index of refraction (Nd) and the Abbe number (vd), for d-lines, of the i-th lens from the focal plane S0 side.

In the construction data of the first and second embodiments, a surface Si marked with an asterisk (*) is an aspherical surface. The shape of an aspherical surface is defined by formula (AS) below:

$$X = \frac{C \cdot Y^2}{1 + \{1 - (1+K) \cdot C^2 \cdot Y^2\}^{1/2}} + \sum_i A i Y^i \quad \text{(AS)}$$

where

X: the displacement from the reference plane of the optical axis direction;

Y: the height in a direction perpendicular to the optical axis;

C: the paraxial curvature;

K: the conic coefficient;

Ai: the aspherical coefficient of the i-th degree.

In the construction data of the first and second embodiments, a surface Si marked with [DOE] is a surface where a diffracting optical surface is formed on a refracting optical surface. The pitch of a diffracting optical surface is determined by its phase shape, which is defined by formula (DS) below:

$$\phi(H) = 2\pi \cdot \left( \sum_i C i H^{2i} \right) / \lambda 0 \quad \text{(DS)}$$

where $\phi(H)$: the phase function of the diffracting optical surface;

Ci: the phase function coefficient of the diffracting optical surface of the 2i-th order;

H: the height in a direction perpendicular to the optical axis;

v0: the design reference wavelength (=546.07×10$^{-6}$ mm).

Table 4 lists the value ($\phi d/\phi t$) corresponding to condition (1) and related values ($\phi d$, $\phi t$) as observed in each embodiment.

FIGS. 4A to 4C are aberration diagrams showing the aberration observed in the first embodiment, and FIGS. 6A to 6C are aberration diagrams showing the aberration observed in the second embodiment. In these aberration diagrams, a broken line represents aberration for C-lines (wavelength: $\lambda C$=656.3 nm), a solid line represents aberration for e-lines (wavelength: $\lambda e$=546.1 nm), and a dash-dot line represents aberration for g-lines (wavelength: $\lambda g$=435.8 nm). In these aberration diagrams, aberration is plotted in millimeters and on the assumption that the entire system forms an imaging optical system having at the pupil E position an ideal lens with a focal length of $f_{id}$=20. Spherical aberration is plotted for h/h0, which is the radius h of the pupil E standardized by its maximum effective diameter h0, and astigmatism and distortion are plotted for half the angle of view $\omega$(°). Moreover, in these aberration diagrams, S1 to S3 indicate astigmatism on the sagittal plane, and M1 to M3 indicate astigmatism on the meridional plane.

FIG. 7 shows the lens construction and optical paths of a Kepler-type real-image viewfinder optical system as a third embodiment of the present invention, illustrating the state of the optical system at its wide-angle end [W]. FIG. 10 shows the lens construction and optical paths of an eyepiece optical system as a fourth embodiment of the present invention, illustrating the state of the optical system at dioptric power of −1.0 (diopter).

In FIG. 7, Si (i=1, 2, . . . ) represents the i-th surface from the object side. In FIG. 10, Si (i=1, 2, . . . ) represents the i-th surface from the pupil he side. A surface Si marked with an asterisk (*) is an aspherical surface. A surface Si marked with [DOE:−] is a surface where a diffracting optical surface having negative diffractive power is formed on a refracting optical surface. A surface Si marked with [DOE:+] is a surface where a diffracting optical surface having positive diffractive power is formed on a refracting optical surface.

The Kepler-type real-image viewfinder optical system of the third embodiment is constituted of, from the object side, an objective optical system tg, a reversing prism p, and an eyepiece optical system se. The objective optical system tg is composed of a first lens unit g1 having negative refractive power, a second lens unit g2 having positive refractive power, and a third lens unit g3 having positive refractive power. The first to third lens units g1 to g3 are each composed of one lens element, and zooming is performed by moving the first and second lens units g1 and g2 as indicated by arrows m1 and m2, respectively. The third lens unit g3 is formed as one unit together with an object-side reversing prism. The eyepiece-side reversing prism p has on its entrance surface a condenser lens formed as one unit together with the reversing prism p. The image formed by the objective optical system tg is reversed by the reversing prisms g3 and p, and is then observed through the eyepiece optical system se by an observer at the position of the pupil he.

The eyepiece optical system of the fourth embodiment is constituted of, from the pupil he side, a parallel-surfaced plate serving as a protection glass of the viewfinder window, a positive biconvex lens element, and a parallel-surfaced plate p serving as a pentaprism. Adjustment of the dioptric power is performed by moving the biconvex lens element along the optical axis. The image formed on the object plane ob by an objective optical system (not shown) is reversed and magnified by the eyepiece optical system of the fourth embodiment, and is then observed at the position of the pupil he.

In the third embodiment, a diffracting optical surface having negative diffractive power is formed on the pupil he side surface of the negative first lens unit g1, and a diffracting optical surface having positive diffractive power is formed on the object side surface of the positive second lens unit g2. In the fourth embodiment, a diffracting optical surface having positive diffractive power is formed on the object-plane ob side surface of the positive biconvex lens element, and a diffracting optical surface having negative diffractive power is formed on the pupil he side surface of the parallel-surfaced plate p. How correction of chromatic aberration and reduction of the number of lens elements are effectively achieved by the use of these diffracting optical surfaces will be described below.

As mentioned in formulas (A) through (E) of the first and second embodiments, it is understood that a diffracting optical surface has a remarkably small negative Abbe number equivalent value of v'=−3.45. Since normal lenses having only refracting optical surfaces have an Abbe number (representing their dispersion) ranging from 20–80, combined use of refracting and diffracting optical surfaces allows the positive term φi/vi to be canceled out by the negative term φi'/vi'. This means that the chromatic aberration occurring on the refracting optical surfaces can be corrected with the diffracting optical surfaces. Further, since a diffracting optical surface has a remarkably small Abbe-number equivalent value, it is also understood that the diffracting optical surfaces used exclusively for chromatic aberration correction need to have only small power. It is generally believed that, in an optical system, the chromatic aberration occurring on its refracting optical surfaces can be corrected if its diffracting optical surfaces have power corresponding to 5 to 10% of the composite power of all the refracting and diffracting optical surfaces of the entire optical system.

Moreover, the Petzval value (each of the terms constituting a Petzval sum) of a diffracting optical surface is zero. Accordingly, increasing the ratio of the power of the diffracting optical surfaces to the total power of the entire optical system causes overcorrection of chromatic aberration by the diffracting optical surfaces, but still leads to the improvement of the imaging performance of the optical system, because the Petzval values of the diffracting optical surfaces act favorably in this respect.

Now suppose that an imaging optical system consists of a lens having positive power and a lens having negative power, and that the positive lens has a diffracting optical surface having positive diffractive power and the negative lens has a diffracting optical surface having negative diffractive power. In this imaging optical system, the chromatic aberration occurring on the diffracting optical surface having positive power is canceled out by that occurring on the diffracting optical surface having negative power. Accordingly, the chromatic aberration occurring over the entire optical system is minimal. Therefore, in such a case, the ratio of the power of the diffracting optical surface having positive power to the total power of the entire imaging optical system can be increased, as compared with that in an optical system using only a diffracting optical surface having positive power, without causing chromatic aberration. On the other hand, the effect of the Petzval value of the diffracting optical surface having positive power on the power of the positive lens and the effect of the Petzval value of the diffracting optical surface having negative power on the power of the negative lens are both greater than in an optical system using only a diffracting optical surface having positive power. Thus, the diffracting optical surfaces serve to correct chromatic aberration, as well as to improve the imaging performance as compared with an optical system using only a positive diffracting optical surface.

From the above description, it will be understood that, in an optical system such as a zoom lens system whose optical function is determined by the arrangement of a lens unit having positive power and a lens unit having negative power relative to each other, correction of chromatic aberration and reduction of the number of lens elements are effectively achieved by forming a diffracting optical surface having positive diffractive power on a lens element having positive power in the lens unit having positive power and forming a diffracting optical surface having negative diffractive power on a lens element having negative power in the lens unit having negative power.

In the third embodiment, an optical system having a diffracting optical surface as described above is used as the objective optical system tg (FIG. 7) of a Kepler-type real-image viewfinder optical system. In a Kepler-type real-image viewfinder optical system, such as the third embodiment, whose objective optical system tg includes a diffracting optical surface, it is preferable that the objective optical system tg satisfy condition (2) below. When condition (2) is satisfied, it is possible to correct chromatic aberration further and to reduce the number of lens elements.

$$-0.12 < \frac{\sum \phi k}{\phi o} < 0.12 \tag{2}$$

where

Σφk: the composite optical power of diffraction of the diffracting optical surfaces, φo: the total optical power of both diffraction and refraction of the entire objective optical system.

In the fourth embodiment, an optical system having a diffracting optical surface is used as the eyepiece optical system (FIG. 10) of a Kepler-type real-image viewfinder optical system having a dioptric power adjustment mechanism. In a Kepler-type real-image viewfinder optical system, such as the fourth embodiment, whose eyepiece optical system includes a diffracting optical surface, it is preferable that the eyepiece optical system satisfy condition (3) below. When condition (3) is satisfied, it is possible to correct chromatic aberration further and to reduce the number of lens elements.

$$-0.12 < \frac{\sum \phi k}{\phi e} < 0.12 \tag{3}$$

where

Σφ(k: the composite optical power of diffraction of the diffracting optical surfaces, φe: the total optical power of both diffraction and refraction of the entire eyepiece optical system.

Tables 5 and 7 list the construction data of the Kepler-type real-image viewfinder optical systems of the third and fourth embodiments (FIGS. 7 and 10), respectively.

In the construction data of the third embodiment, Si (i=1, 2, . . . ) represents the i-th surface from the object side, ri (i=1, 2, . . . ) represents the radius of curvature of the i-th surface Si from the object side, and di (i=1, 2, . . . ) represents the i-th axial distance from the object side. For axial distances that vary with zooming (variable distances), two values are listed, which are, from the left, the surface-to-surface distances between the related lens units at the wide-angle end and at the telephoto end. Moreover, Ni (i=1, 2, . . . ) represents the index of refraction (Ne) for e-lines of the i-th optical element from the object side, and vi (i=1, 2, . . . ) represents the Abbe number (vd) for d-lines of the i-th optical element from the object side. Listed together with the construction data are the viewfinder magnification β, the value corresponding to condition (2), and the values related thereto at the wide-angle end and at the telephoto end.

In the construction data of the fourth embodiment, Si (i=1, 2, . . . ) represents the i-th surface from the pupil he side, ri (i=0, 1, 2, . . . ) represents the radius of curvature of the i-th surface Si from the pupil he side, and di (i=0, 1, 2, . . . ) represents the i-th axial distance from the pupil he side. For axial distances that vary with adjustment of the dioptric power (variable distances), three values are listed, which are, from the left, the surface-to-surface distances between the related optical elements at dioptric power of –3.1, –1.0, and +1.1 (diopters). Moreover, Ni (i=1, 2, 3) represents the index of refraction (Ne) for e-lines of the i-th optical element from the pupil he side, and vi (i=1, 2, 3) represents the Abbe number (vd) for d-lines of the i-th optical element from the pupil he side. Listed together with the construction data are the eyepiece focal length fe, the value corresponding to condition (3), and the values related thereto at dioptric power of –3.1, –1.0, and +1.1 (diopters).

In the construction data of the third and fourth embodiments, a surface Si marked with an asterisk (*) is an aspherical surface. The shape of an aspherical surface is defined by formula (AS) below:

$$Y = \frac{C \cdot X^2}{1 + (1 - \epsilon \cdot X^2 \cdot C^2)^{1/2}} + \sum_i Ai \cdot X^i \quad (AS)$$

where

Y: the displacement from the reference plane of the optical axis direction;

X: the height in a direction perpendicular to the optical axis;

C: the paraxial curvature;

$\epsilon$: the quadric surface parameter;

Ai: the aspherical coefficient of the i-th degree.

In the construction data of the third and fourth embodiments, a surface Si marked with [DOE:–] or [DOE:+] is a surface where a diffracting optical surface having negative or positive power is formed on a refracting optical surface. The pitch of a diffracting optical surface is determined by its phase shape, which is defined by formula (DS) noted earlier in the description of the first and second embodiments.

Figure 8A:
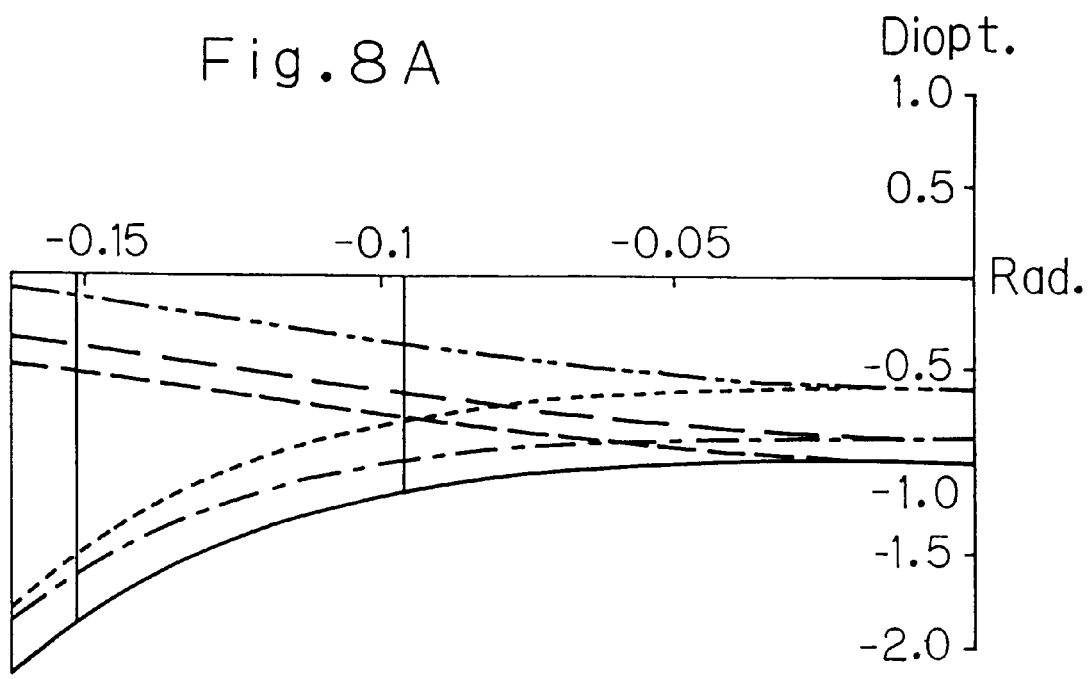
FIGS. 8A to 8C are aberration diagrams showing the aberration observed at the wide-angle end of the third embodiment.
Figure 8B:
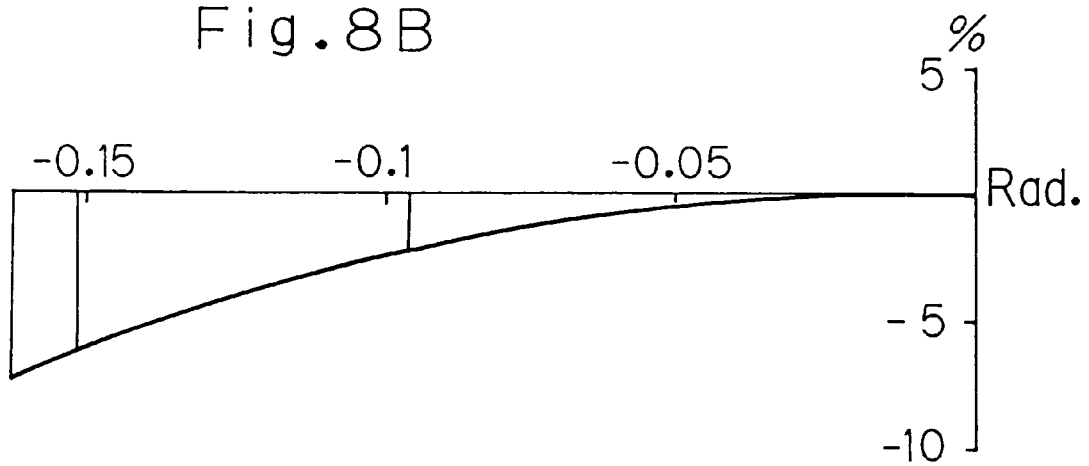
Figure 8C:
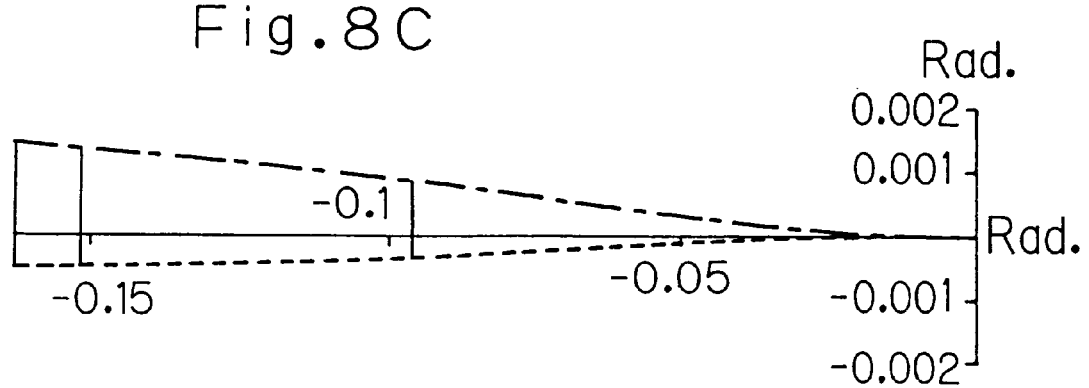
Figure 11A:
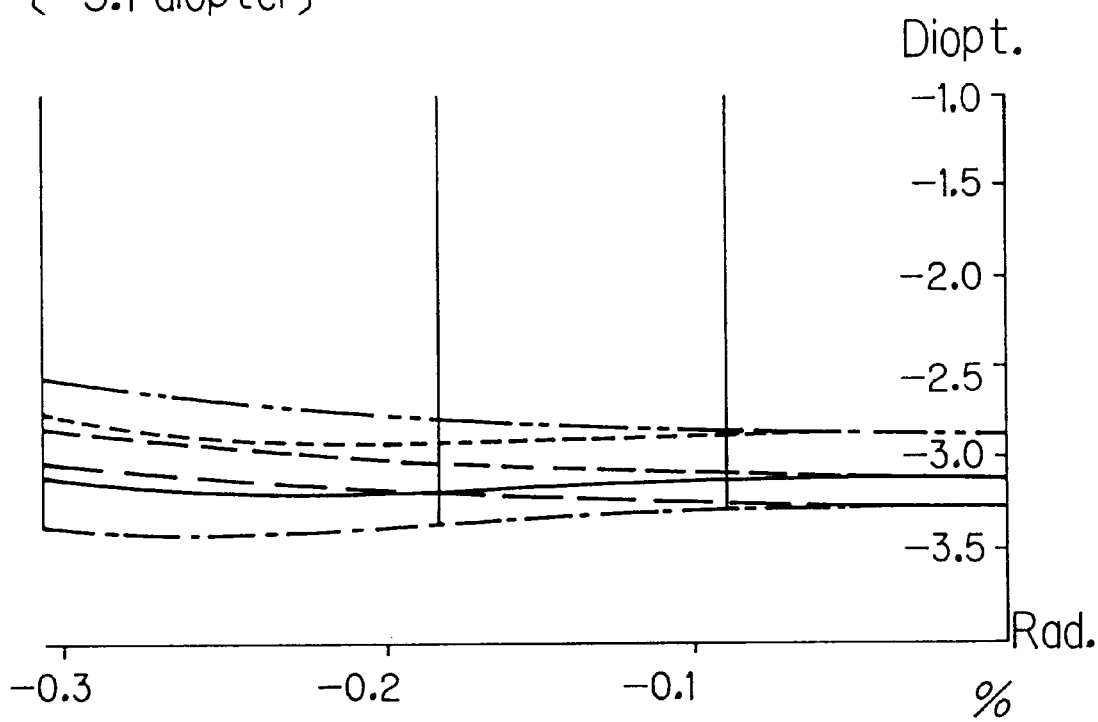
FIGS. 11A to 11C are aberration diagrams showing the aberration observed in the fourth embodiment, at dioptric power of −3.1 (diopters)
Figure 11B:
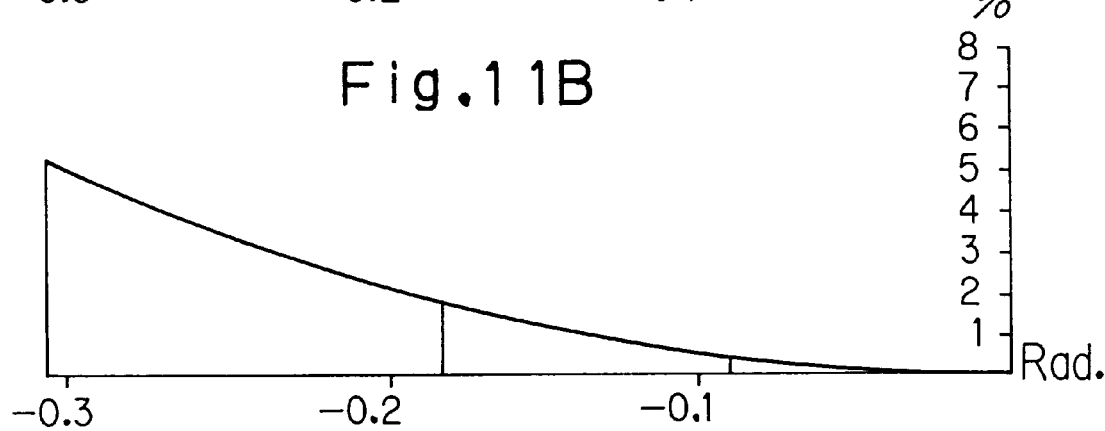
Figure 11C:
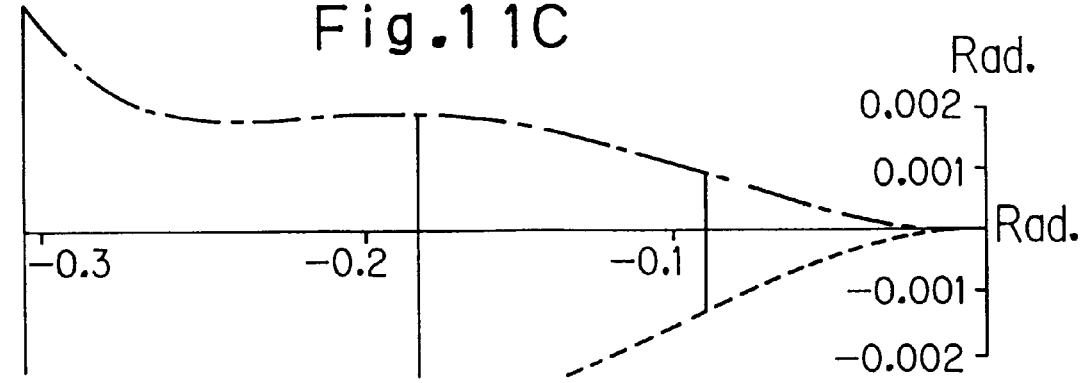
Figure 12A:
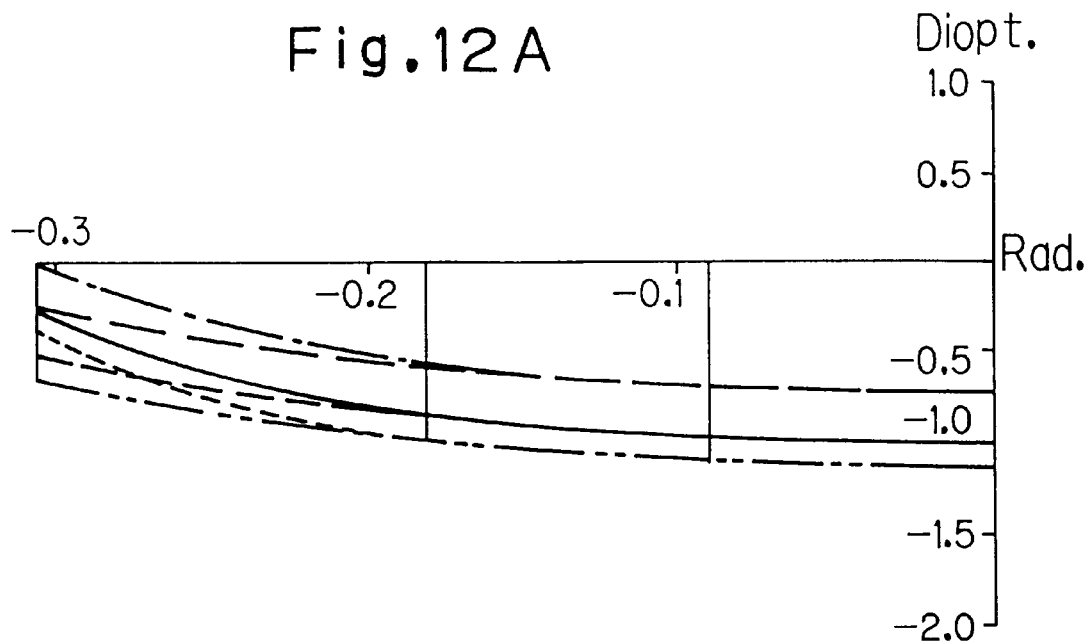
FIGS. 12A to 12C are aberration diagrams showing the aberration observed in the fourth embodiment, at dioptric power of −1.0 (diopter)
Figure 12B:
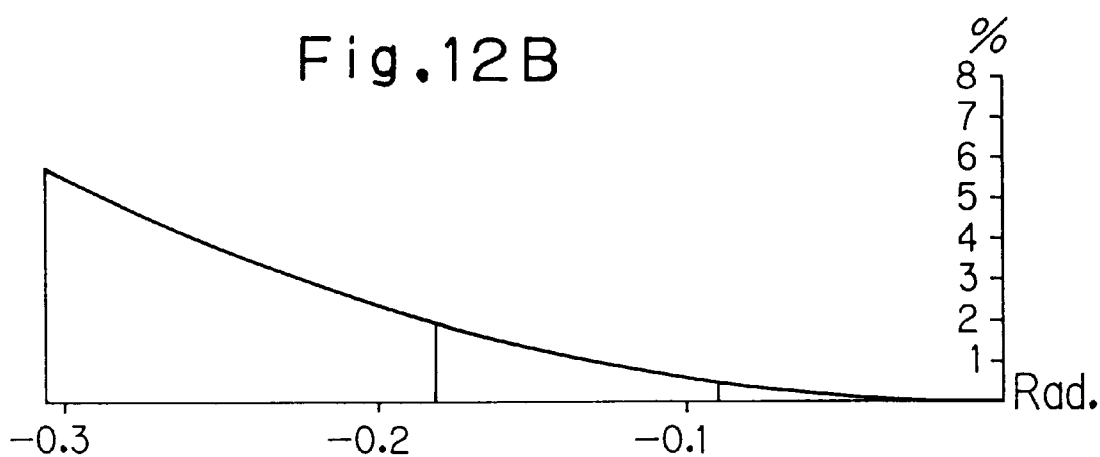
Figure 12C:
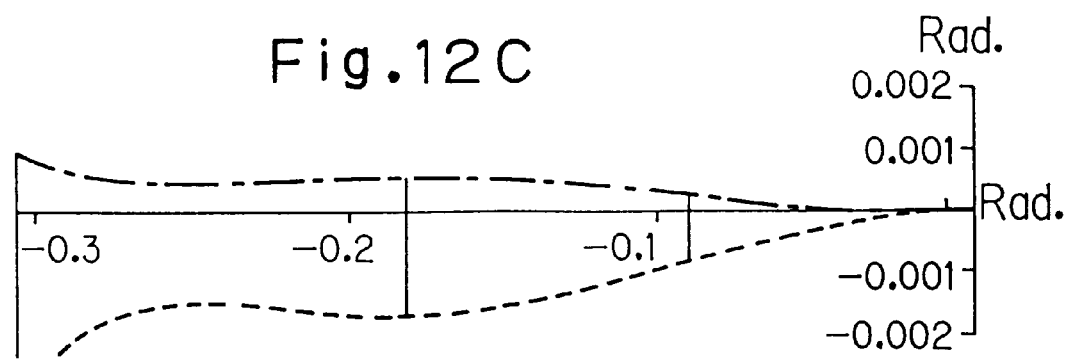
Figure 13A:
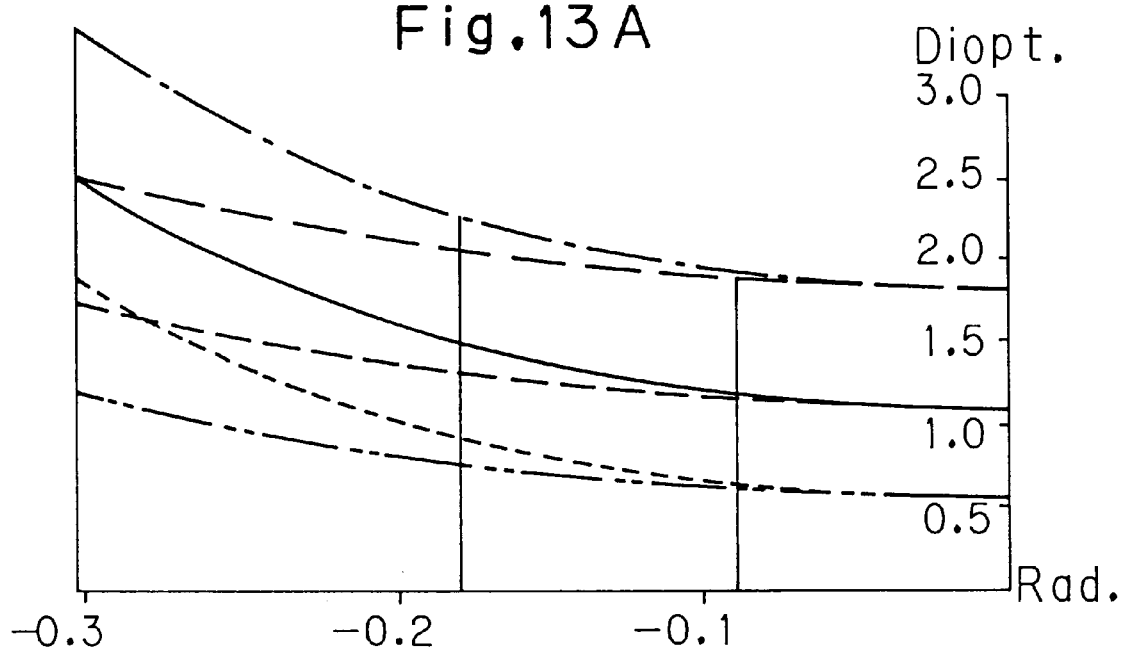
FIGS. 13A to 13C are aberration diagrams showing the aberration observed in the fourth embodiment, at dioptric power of +1.1 (diopters)
Figure 13B:
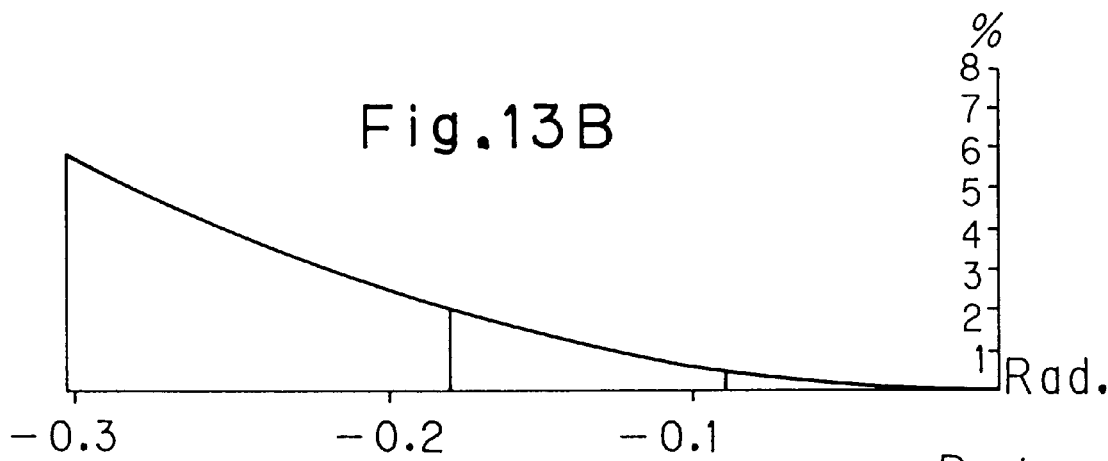
Figure 13C:
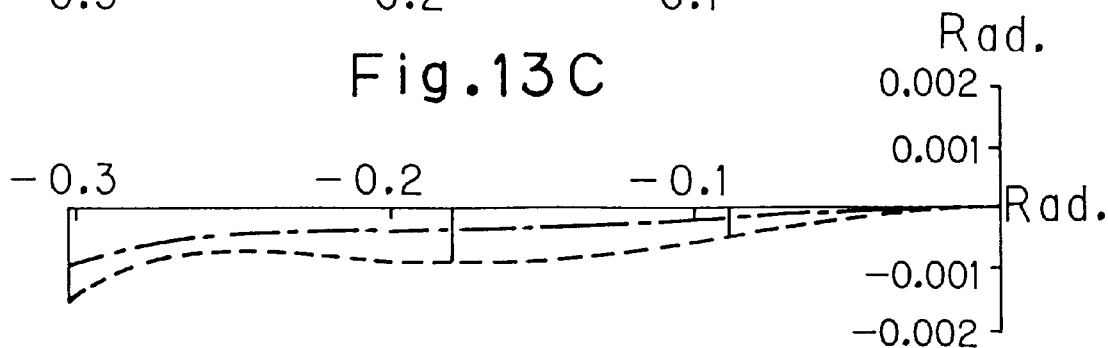

FIGS. 8A to 8C are aberration diagrams showing the aberration observed at the wide-angle end of the third embodiment; FIGS. 9A to 9C are aberration diagrams showing the aberration observed at the telephoto end of the third embodiment. FIGS. 11A to 11C are aberration diagrams showing the aberration observed in the fourth embodiment at a dioptric power of –3.1 (diopters); FIGS. 12A to 12C are aberration diagrams showing the aberration observed in the fourth embodiment at a dioptric power of –1.0 (diopter); FIGS. 13A to 13C are aberration diagrams showing the aberration observed in the fourth embodiment at a dioptric power of +1.1 (diopters). Of these aberration diagrams, FIGS. 8A, 9A, 11A, 12A, and 13A show astigmatism, FIGS. 8B, 9B, 11B, 12B, and 13B show distortion, and FIGS. 8C, 9C, 11C, 12C, and 13C show lateral chromatic aberration. In these aberration diagrams, aberration for light of different wavelengths (design wavelengths: e-lines, c-lines, and g-lines) is plotted with different types of line. Specifically, if FIG. 8A is taken as an example, the solid line 1 represents tangential aberration for e-lines, the short-dash line 2 represents sagittal aberration for e-lines, the dash-dot line 3 represents tangential aberration for c-lines, the long-dash line 4 represents sagittal aberration for c-lines, the dotted line 5 represents tangential aberration for g-lines, and the dash-dot-dot line 6 represents sagittal aberration for g-lines. Note that this distinction between the types of lines for light of different wavelengths is used also in similar aberration diagrams presented here and later, that is, in FIGS. 9A to 9C, 11A to 11C, 12A to 12C, 13A to 13C, 22A to 22C, 23A to 23C, 24A to 24C, 25A to 25C, 26A to 26C, 27A to 27C, 28A to 28C, 29A to 29C, 30A to 30C, 31A to 31C, 44A to 44C, 45A to 45C, 46A to 46C, 47A to 47C, 48A to 48C, 49A to 49C, 50A to 50C, 51A to 51C. In diagrams for astigmatism, the dioptric power (in diopters) is taken along the vertical axis; in diagrams for distortion, the percentage is taken along the vertical axis; in diagrams for lateral chromatic aberration, the angle with respect to the optical axis (in radians) is taken along the vertical axis. In all of these aberration diagrams, the angle of incidence (in radians) on the entrance pupil plane is taken along the horizontal axis.

FIG. 14 shows the lens construction and optical paths of an optical system presented as an example for comparison, at a dioptric power of –1.0 (diopters). This example for comparison corresponds to the fourth embodiment. Specifically, the optical system of the comparison example has the same construction as the fourth embodiment except that the former, despite having the same eyepiece focal length fe, has no diffracting optical surface and instead has a negative lens disposed on the exit side of the parallel-surfaced plate p serving as a pentaprism. Table 7 lists the construction data and related data of the comparison example just in the same manner as for the fourth embodiment.

Comparison of FIG. 10 with FIG. 14 makes the following points clear. Whereas the comparison example needs the negative lens to adjust its dioptric power, the fourth embodiment needs no such lens, since the latter is provided with a diffracting optical surface having negative power. Thus, the latter has fewer lens elements. Moreover, the elimination of the above negative lens makes it possible to secure more space for the dioptric power adjustment movement of the biconvex lens. Specifically, whereas the comparison example offers a dioptric power adjustment range from –2.51 to +0.47 (diopters), the fourth embodiment offers a range from –3.1 to +1.1 (diopters), which is wider by 1.22 (diopters) than the range of the former.

Figure 15:
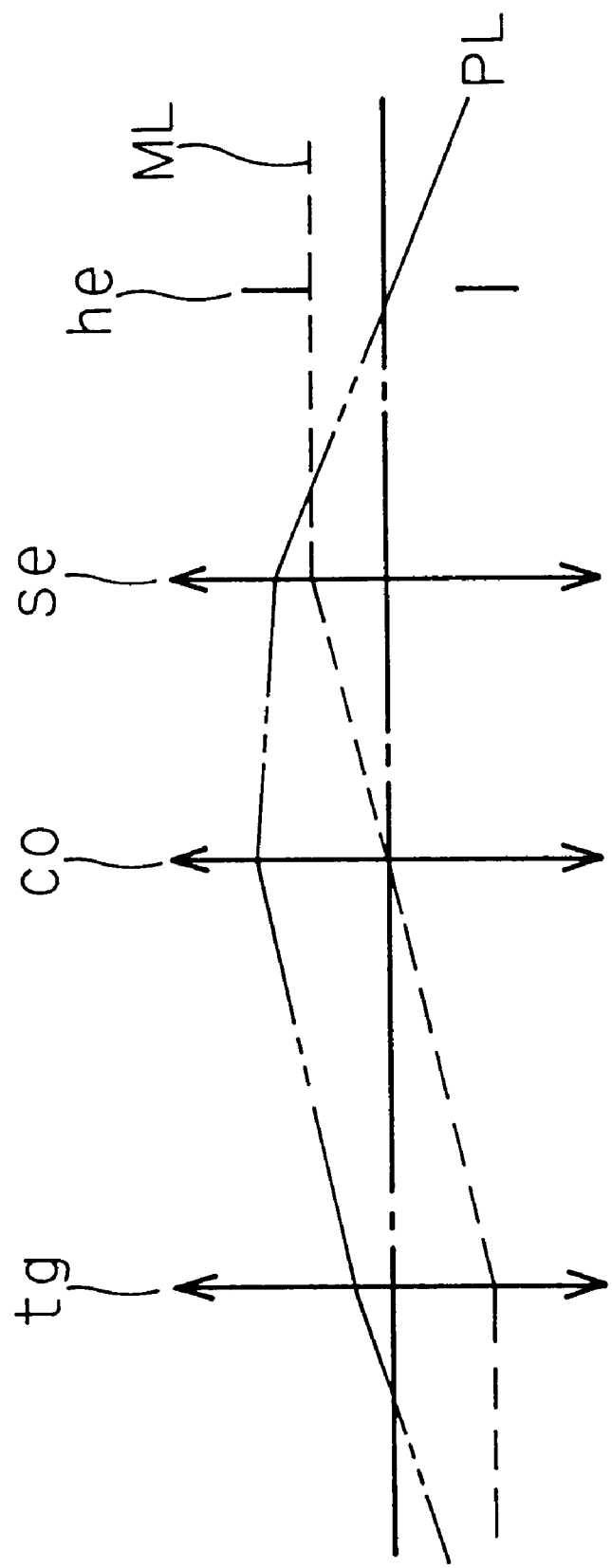
FIG. 15 is a diagram schematically showing the paraxial power arrangement and optical paths of a typical Kepler-type real-image viewfinder optical system.

FIG. 15 shows the paraxial power arrangement of a typical Kepler-type real-image viewfinder optical system. In FIG. 15, the light ray passing through the center of the pupil he is the ideal principal ray PL, and the light ray passing through the pupil he perpendicularly thereto is the ideal marginal ray ML. In this optical system, an objective lens tg forms an image of an object in the vicinity of a condenser lens co, and the thus formed image is then magnified by an eyepiece lens se so as to be observed from the position of the pupil he, which is positioned behind the eyepiece lens se.

As mentioned in formulas (A) through (E) of the first and second embodiments, it is understood that a diffracting optical surface has a remarkably small negative Abbe number equivalent value of v'=–3.45. Since normal lenses having only refracting optical surfaces have an Abbe number (representing their dispersion) ranging from 20–80, combined use of refracting and diffracting optical surfaces allows the positive term $\phi i/vi$ to be canceled out by the negative term $\phi i'/vi'$. This means that the chromatic aberration occurring on the refracting optical surfaces can be corrected with the diffracting optical surfaces.

Figure 16A:
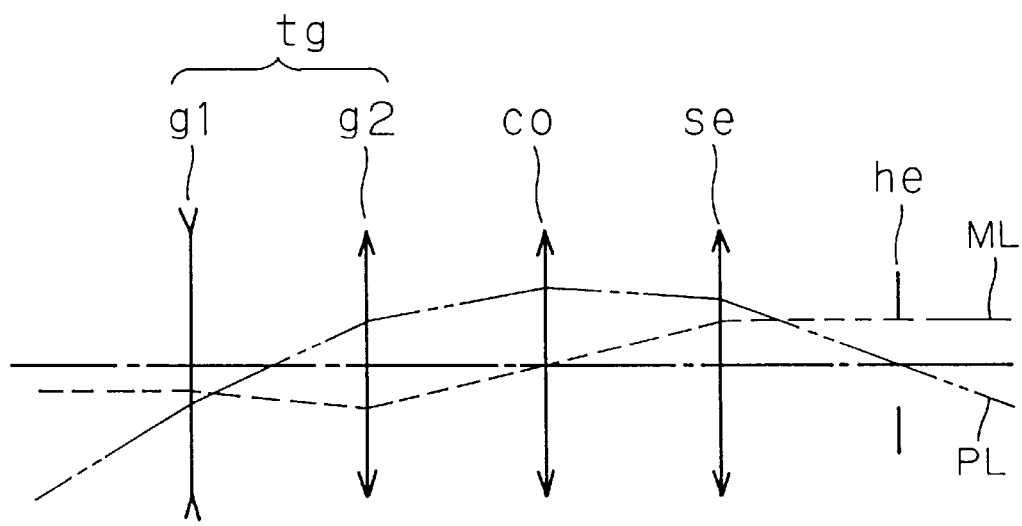
FIGS. 16A and 16B are diagrams schematically showing the paraxial power arrangement and optical paths of a Kepler-type real-image viewfinder optical system whose objective lens is a zoom lens system.
Figure 16B:
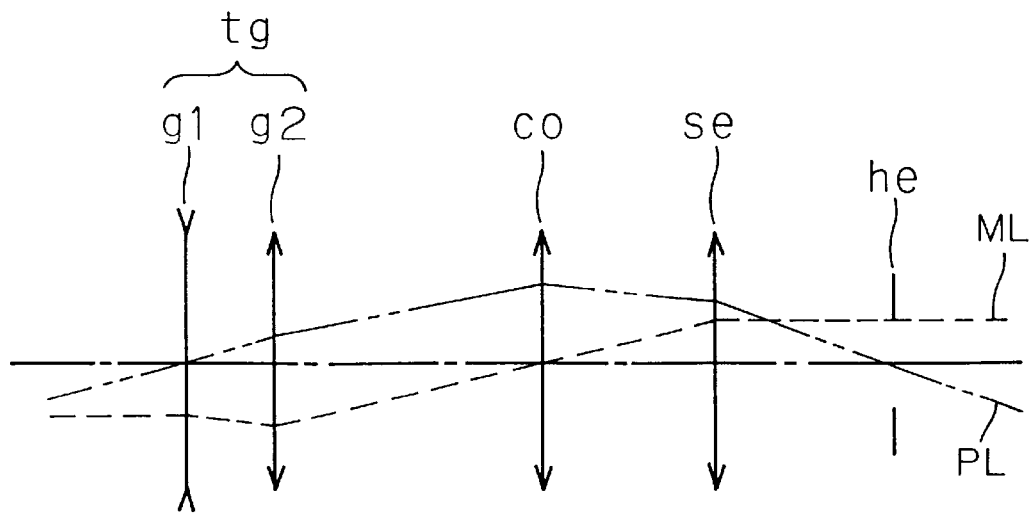
Figure 17:
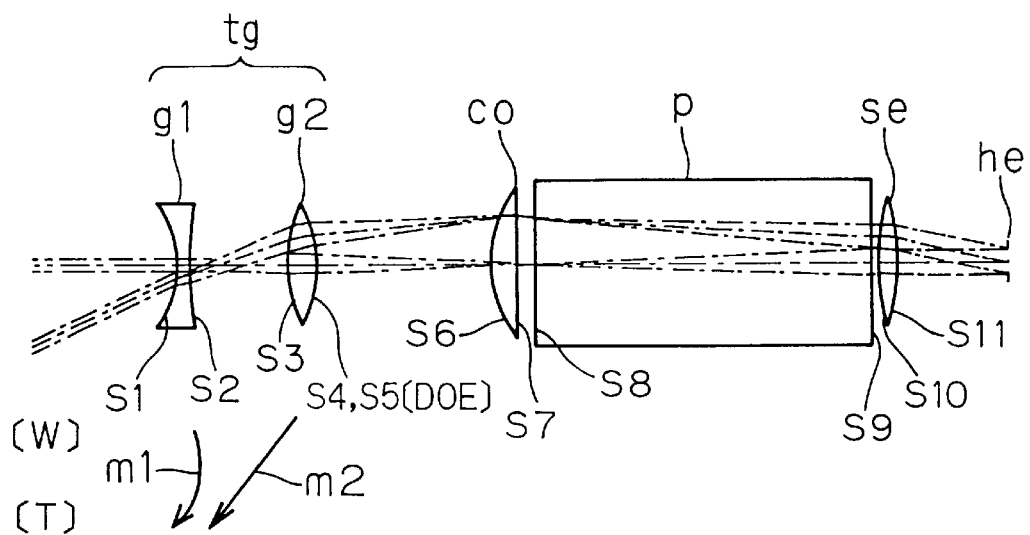
FIG. 17 is a diagram showing the optical arrangement and optical paths of the fifth embodiment of the present invention.
Figure 18:
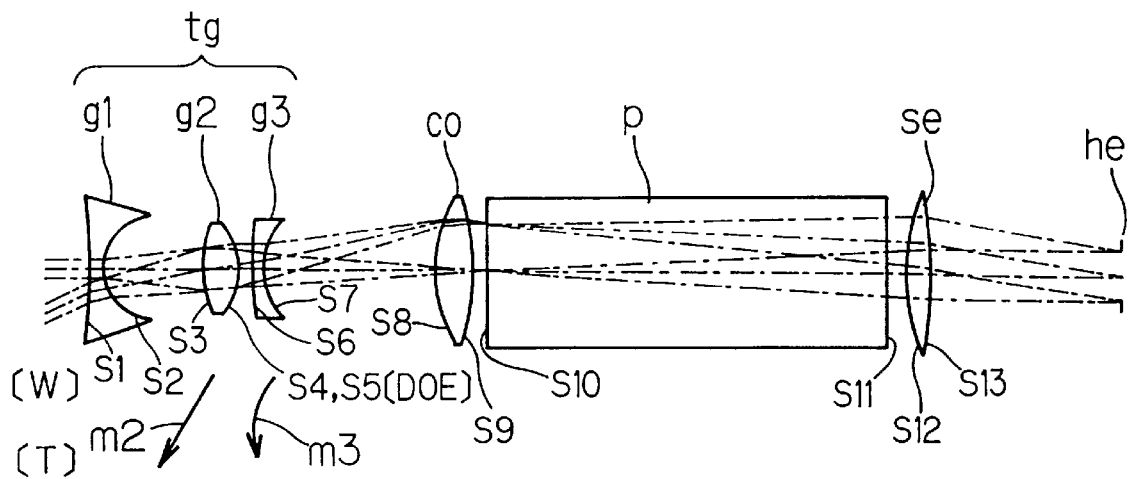
FIG. 18 is a diagram showing the optical arrangement and optical paths of the sixth embodiment of the present invention.
Figure 19:
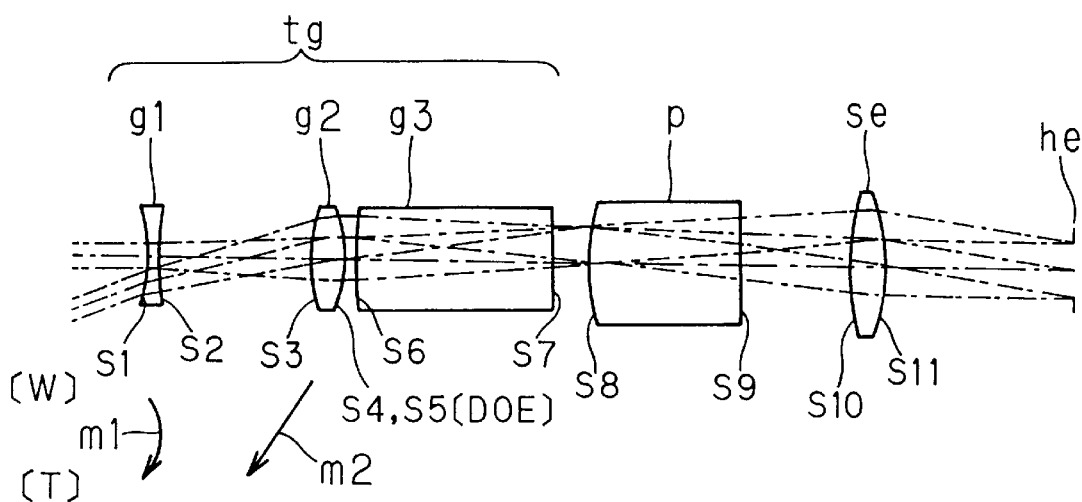
FIG. 19 is a diagram showing the optical arrangement and optical paths of the seventh embodiment of the present invention.
Figure 20:
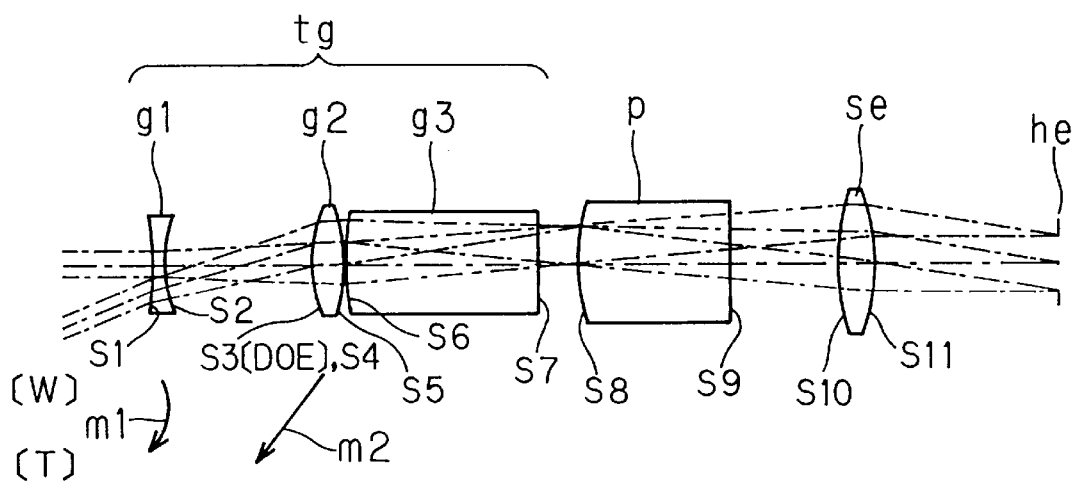
FIG. 20 is a diagram showing the optical arrangement and optical paths of the eighth embodiment of the present invention.
Figure 21:
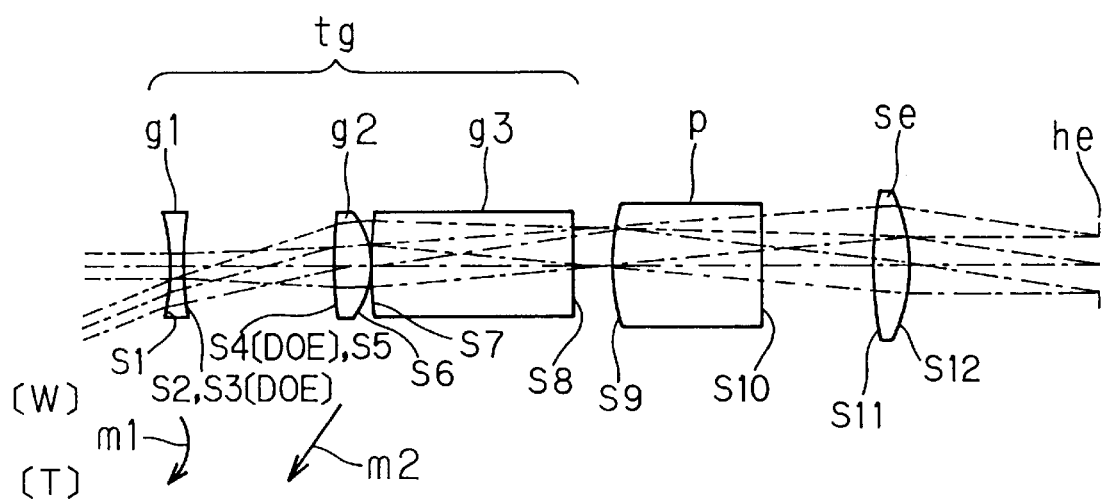
FIG. 21 is a diagram showing the optical arrangement and optical paths of the ninth embodiment of the present invention.

FIGS. 16A and 16B show the paraxial power arrangement of a viewfinder optical system whose objective lens tg is a zoom lens system constituted of two lens units, with FIG. 16A illustrating the state at the wide-angle end and FIG. 16B illustrating the state at the telephoto end. Here, the objective lens tg is constituted of, from the object side, a first lens unit g1 having negative power, and a second lens unit g2 having positive power, just like a typical zoom lens system. The second lens unit g2 mainly serves as a variator for zooming, and the first lens unit g1 serves as a compensator for adjusting the image plane.

From FIGS. 16A and 16B, it will be understood that, with the movement of the second lens unit g2 that has the longer distance to move, the heights h and h' significantly vary in the second lens unit g2. This means that the tendency of chromatic aberration significantly varies during zooming. Accordingly, if a diffracting optical surface is provided in the second lens unit g2 that is moved for zooming, it is possible to reduce the variation of chromatic aberration during zooming. The heights h and h' do vary also in the first lens unit g1, but, since the second lens unit g2 has stronger power than the first lens unit g1, the variation of chromatic aberration can be reduced by providing a diffracting optical surface only in the variator (the second lens unit g2) that moves the longer distance.

As described above, in a viewfinder optical system provided with an objective lens tg that is a zoom lens system constituted of two, i.e. negative and positive, lens units, it is possible to correct chromatic aberration properly over the entire zoom range by providing a diffracting optical surface at least in the second lens unit g2. However, it is preferable that the objective lens tg include a third lens unit having positive or negative power so that the zoom lens system includes three lens units. If the zoom lens system includes three lens units, it is possible to improve aberration characteristics other than those related to chromatic aberration.

FIGS. 17 to 21 show the optical arrangement and optical paths of viewfinder optical systems as a fifth to a ninth embodiment, respectively, of the present invention, each showing the state of the optical system at the wide-angle end [W]. In FIGS. 17 to 21, arrows m1, m2, and m3 indicate the movement of the first, second, and third lens units g1, g2, and g3, respectively, during zooming from the wide-angle end [W] to the telephoto end [T].

In the fifth to ninth embodiments, a zoom lens system is used as the objective lens tg, and a diffracting optical surface is provided in the lens unit that is moved to achieve zooming. A diffracting optical surface has a great ability to correct chromatic aberration, and it exhibits a greater chromatic aberration correction ability when provided in the objective lens tg than when provided in the eyepiece lens se. Specifically, by providing a diffracting optical surface in the objective lens tg, it is possible to correct not only the chromatic aberration occurring in the objective lens tg, but also the chromatic aberration occurring in the eyepiece lens se.

It is preferable that a viewfinder optical system which is constituted of more than two lens units including, from the object side, a first lens unit g1 having negative power and a second lens unit g2 having positive power and in which a diffracting optical surface is provided at least in the second lens unit g2 satisfy condition (4) below:

$$-0.007 < \frac{\phi N \cdot \phi PD}{\phi P} < -0.001 \quad (4)$$

where

φN: the optical power of both diffraction and refraction of the diffracting and refracting optical surfaces included in the negative first lens unit;

φP: the optical power of both diffraction and refraction of the diffracting and refracting optical surfaces included in the positive second lens unit;

φPD: the optical power of diffraction of the diffracting optical surface included in the second lens unit.

When condition (4) is satisfied, well-balanced correction of chromatic aberration is possible over the entire zoom range. If the lower limit of condition (4) is exceeded, the diffracting optical surface exhibits an excessively great chromatic aberration correction ability, with the result that chromatic aberration is overcorrected. If the upper limit of condition (4) is exceeded, the diffracting optical surface exhibits an insufficient chromatic aberration correction ability, with the result that desirable balance of chromatic aberration cannot be kept over the entire zoom range.

It is preferable that the eyepiece lens se is composed only of refracting optical surfaces. Since the lens surfaces of the objective lens tg have positive dioptric power, even if a diffracting optical surface is provided in the objective lens tg as in the fifth to ninth embodiments, the pattern of the diffraction grating is invisible from the eyepiece se side. Accordingly, if a diffracting optical surface is provided in the objective lens tg, and, in addition, the eyepiece lens se is composed only of refracting optical surfaces, the viewfinder optical system does not suffer from visually undesirable appearance.

Moreover, it is preferable that diffracting optical surfaces be introduced to the objective lens tg and the eyepiece lens se by providing each of these lenses tg and se with a diffracting optical element that has a diffracting optical surface formed on a refracting optical surface (i.e. a diffracting/refracting hybrid lens). This is because the use of such hybrid lenses not only makes it possible to correct the chromatic aberration occurring on the refracting optical surface with the diffracting optical surface, but also eliminates the need to use an additional optical element (e.g. a negative lens) for chromatic aberration correction. Thus, as compared with the optical system where chromatic aberration is corrected by the use of a negative lens in the objective lens tg or the eyepiece lens se, it is possible to reduce the number of the lens elements.

Tables 8 to 12 list the construction data of the viewfinder optical systems of the fifth to ninth embodiments (FIGS. 17 to 21), respectively. In the construction data of tables 8 to 12, Si (i=1, 2, . . . ) represents the i-th surface from the object side, ri (i=1, 2, . . . ) represents the radius of curvature of the i-th surface Si from the object side, and di (i=1, 2, . . . ) represents the i-th axial distance from the object side. For axial distances that vary with zooming (variable distances), two values are listed, which are, from the left, the surface-to-surface distances between the related lens units at the wide-angle end and at the telephoto end. Moreover, Ni (i=1, 2, . . . ) represents the index of refraction (Ne) for e-lines of the i-th lens element from the object side, and vi (i=1, 2, . . . ) represents the Abbe number (vd) for d-lines of the i-th lens element from the object side. The symbol of an optical element is given on the right side of its Abbe number. Listed together with the construction data are the viewfinder magnification β, the value corresponding to condition (4) {φN·φPD/φP}, and the values related thereto {φN, φP, φPD} at the wide-angle end and at the telephoto end.

In the construction data of the fifth to ninth embodiments, a surface Si marked with [DOE] is a surface where a diffracting optical surface is formed on a refracting optical surface. Moreover, a surface Si marked with an asterisk (*) is an aspherical surface. The shape of an aspherical surface is defined by formula (AS) noted earlier in the description of the third and fourth embodiments.

Figure 22A:
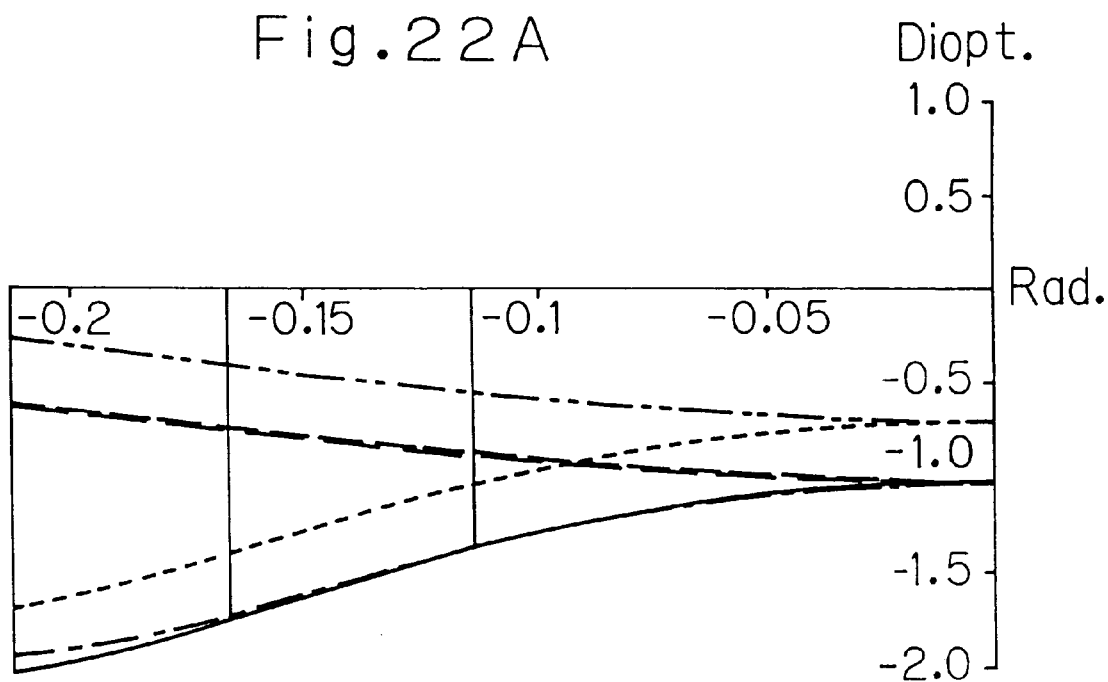
FIGS. 22A to 22C are aberration diagrams showing the aberration observed at the wide-angle end of the fifth embodiment.
Figure 22B:
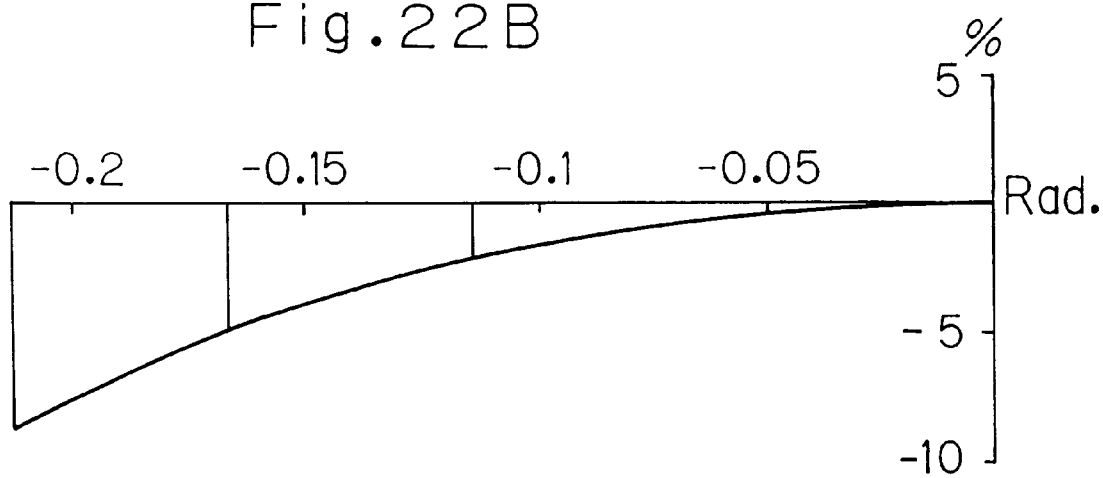
Figure 22C:
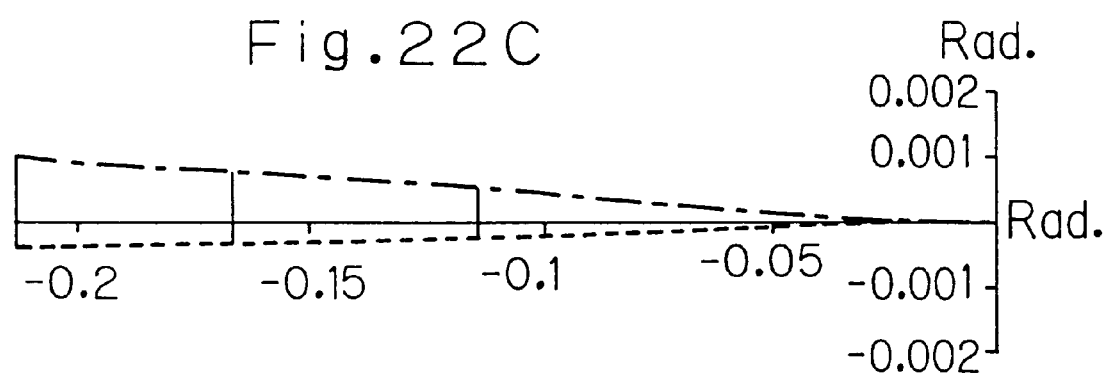
Figure 23A:
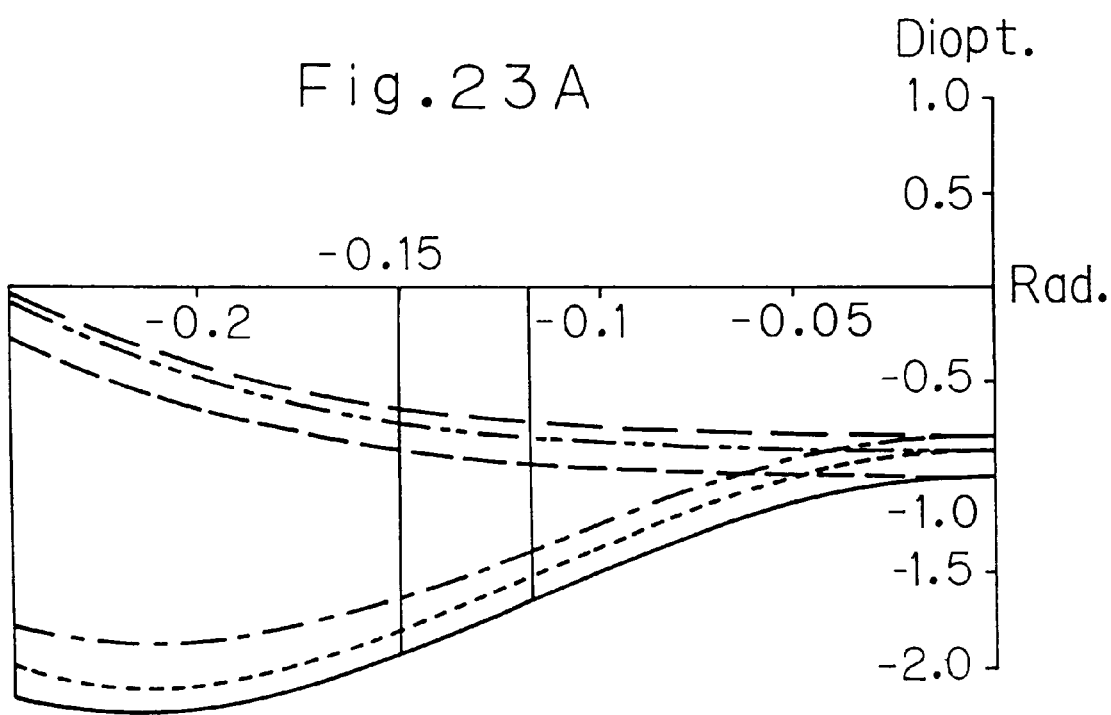
FIGS. 23A to 23C are aberration diagrams showing the aberration observed at the telephoto end of the fifth embodiment.
Figure 23B:
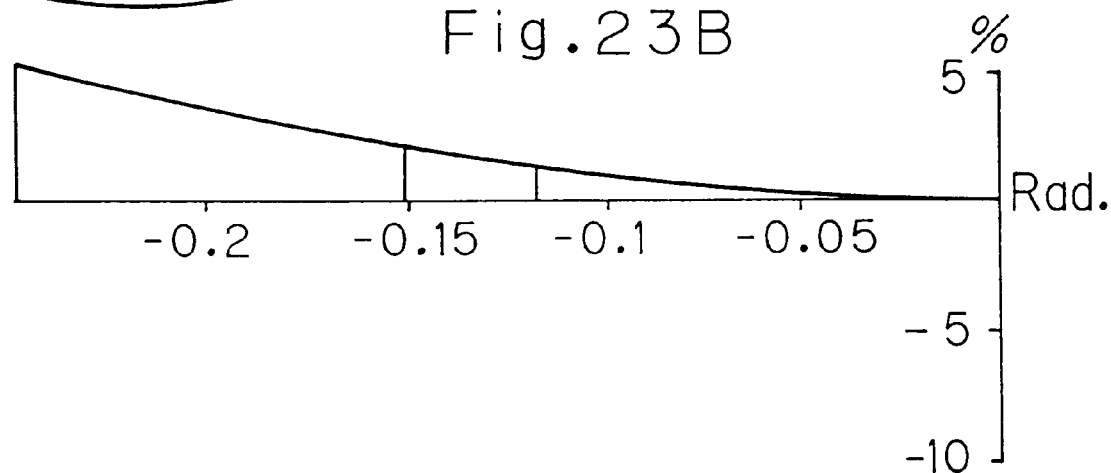
Figure 23C:
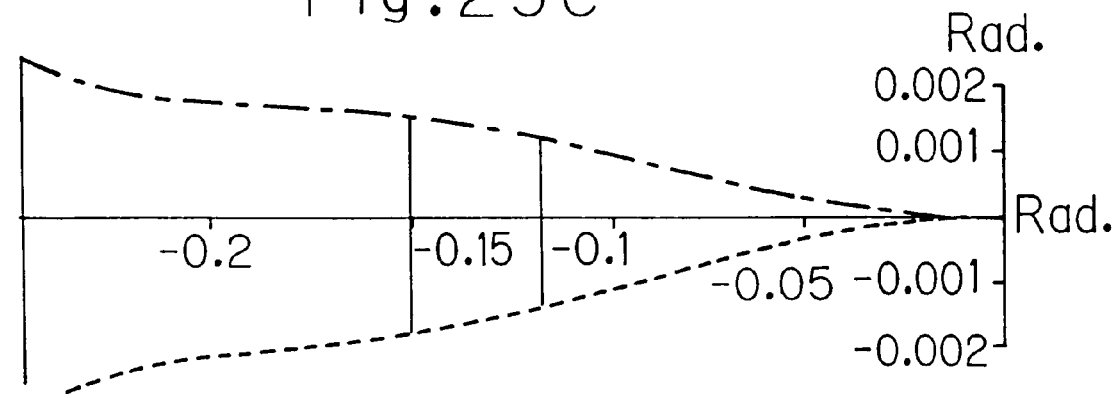
Figure 24A:
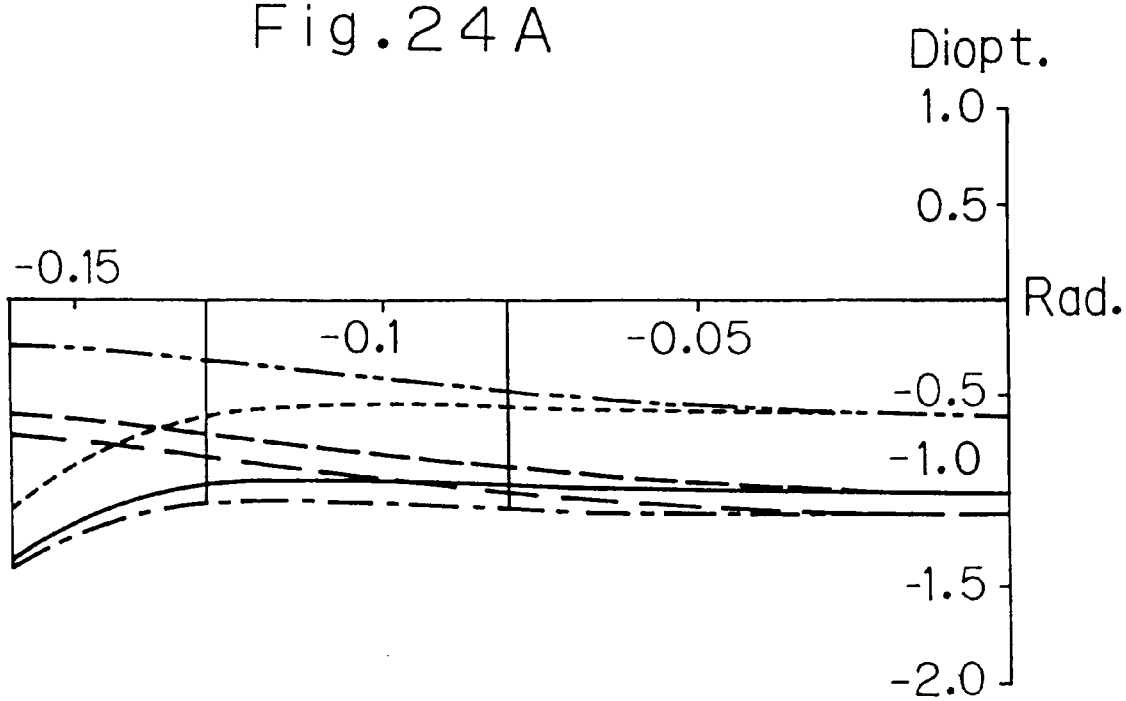
FIGS. 24A to 24C are aberration diagrams showing the aberration observed at the wide-angle end of the sixth embodiment.
Figure 24B:
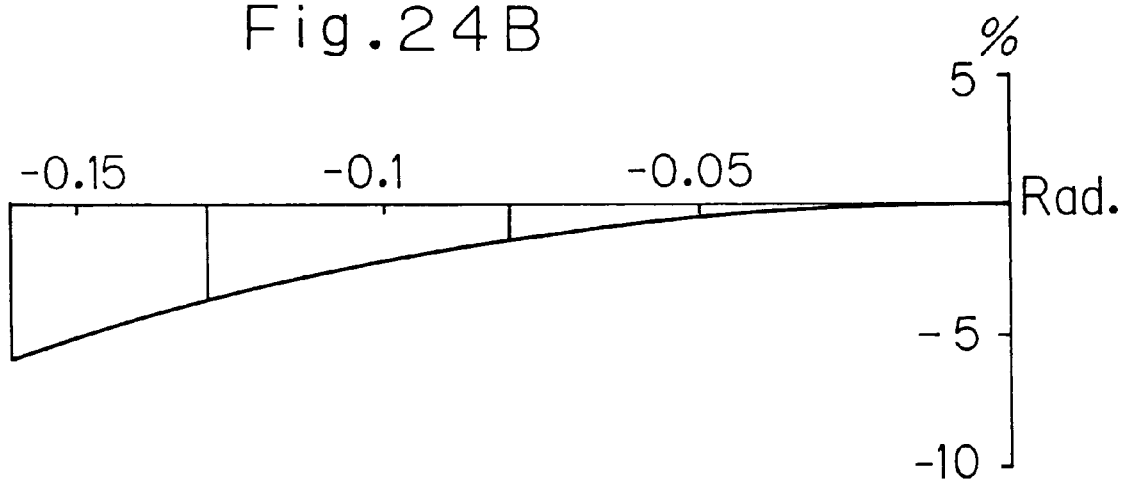
Figure 24C:
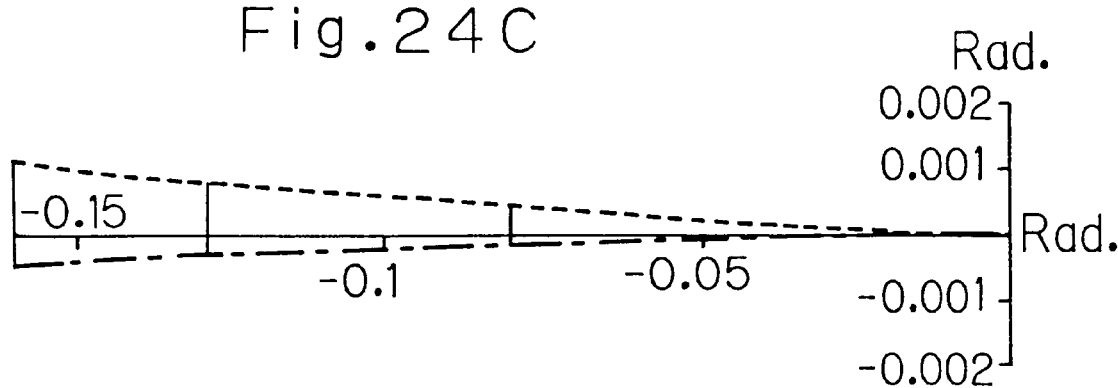
Figure 25A:
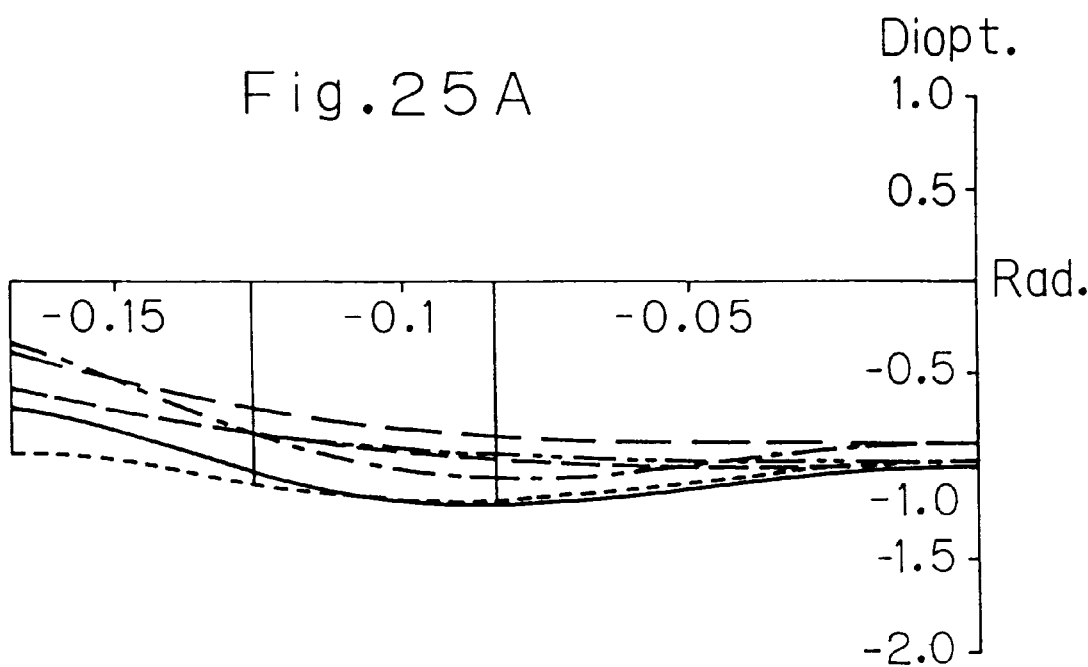
FIGS. 25A to 25C are aberration diagrams showing the aberration observed at the telephoto end of the sixth embodiment.
Figure 25B:
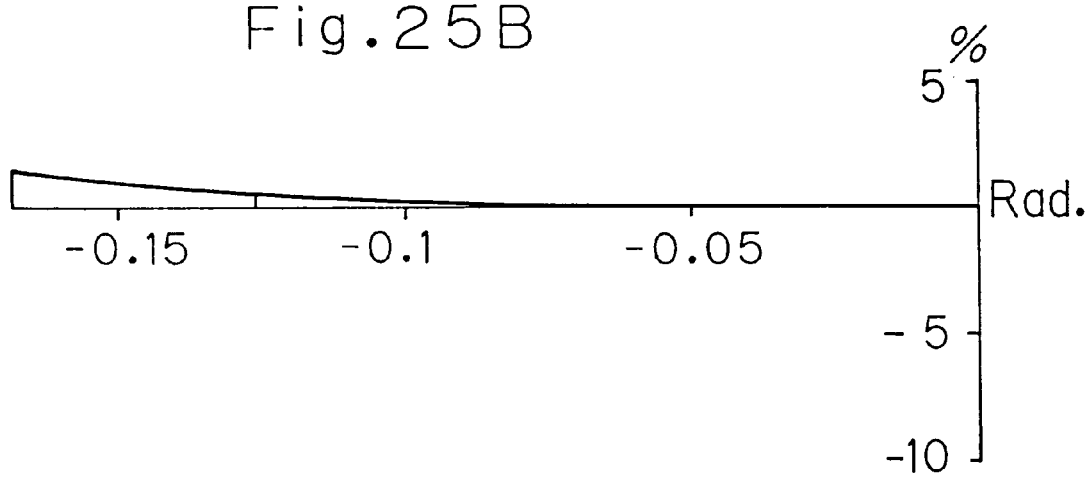
Figure 25C:
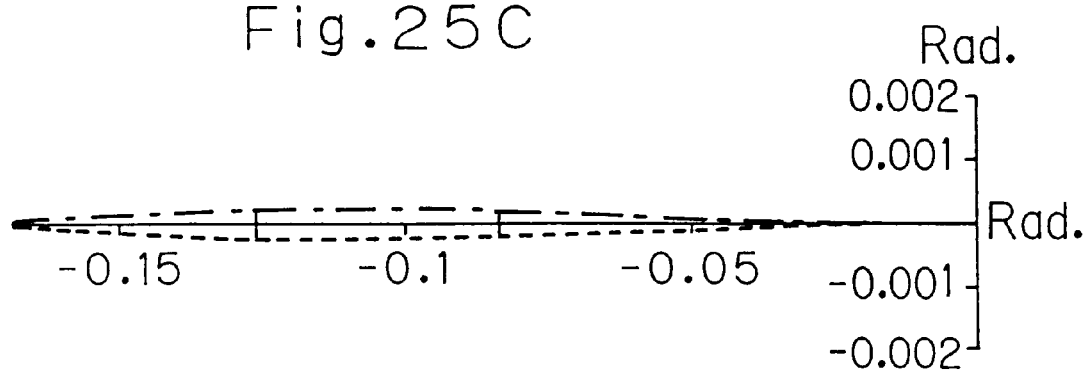
Figure 27A:
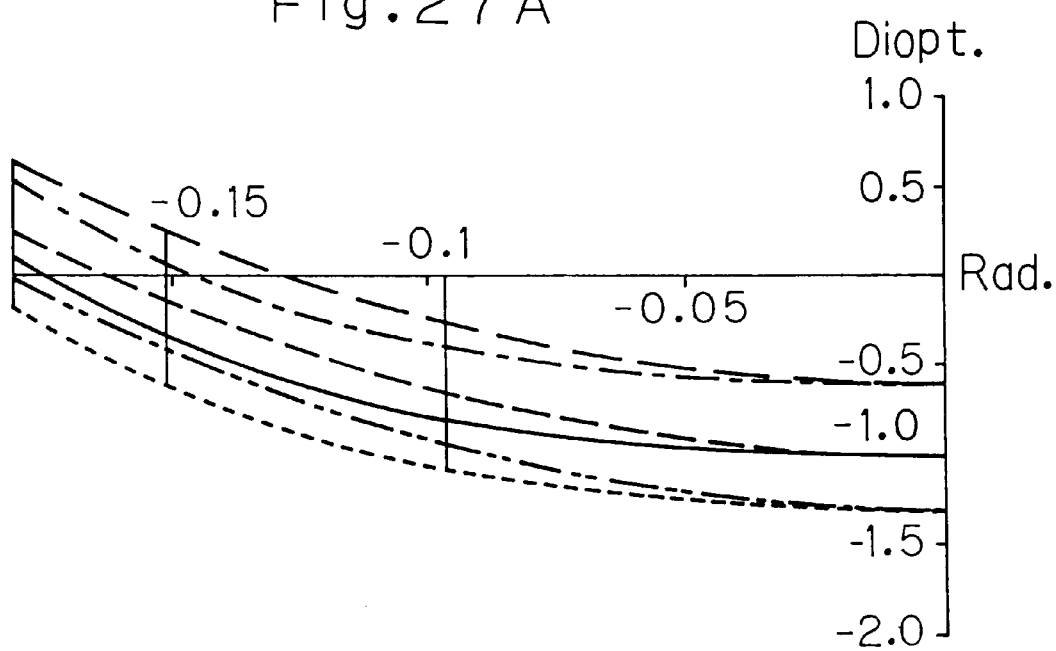
FIGS. 27A to 27C are aberration diagrams showing the aberration observed at the telephoto end of the seventh embodiment.
Figure 27B:
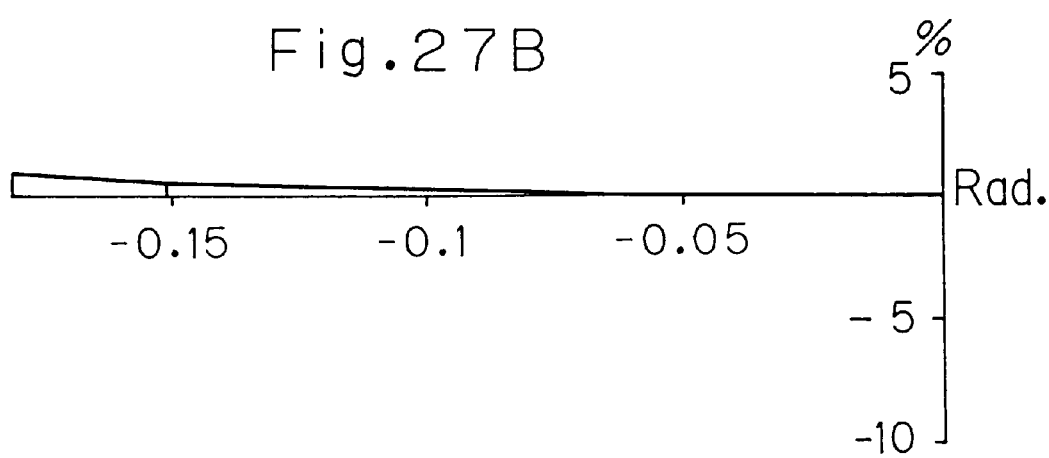
Figure 27C:
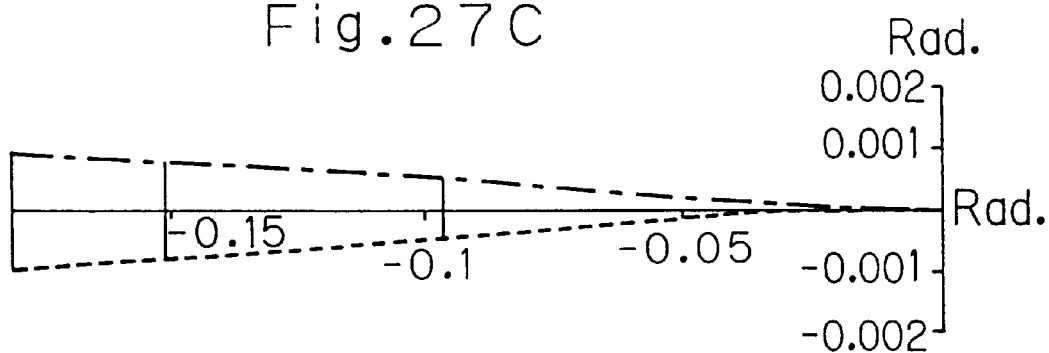
Figure 29A:
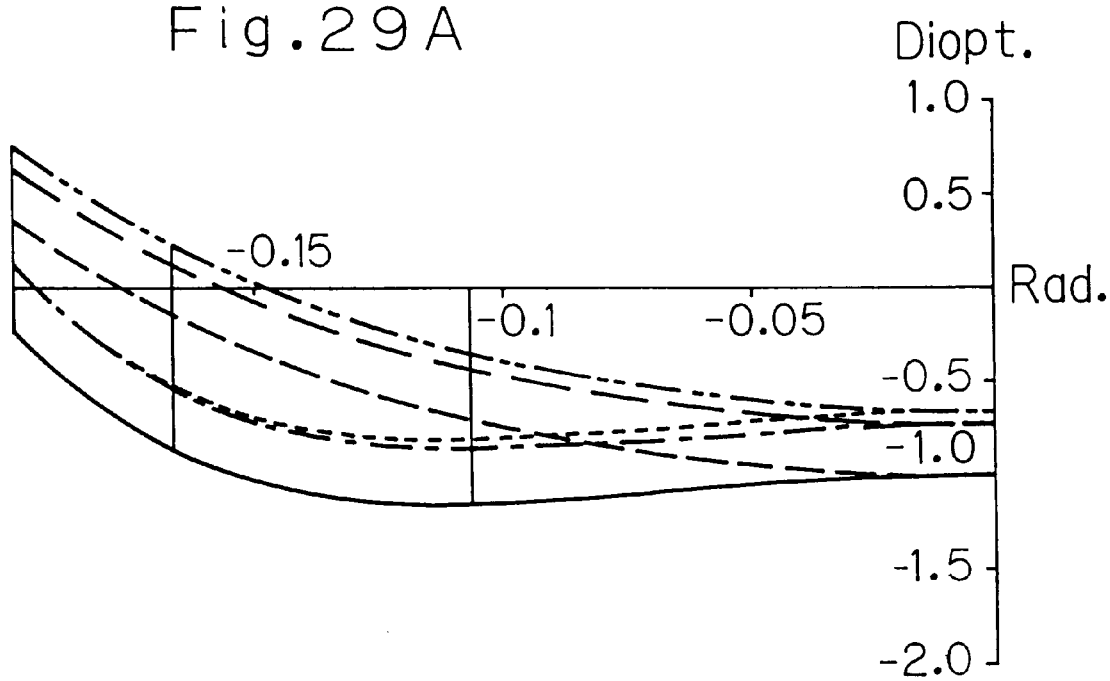
FIGS. 29A to 29C are aberration diagrams showing the aberration observed at the telephoto end of the eighth embodiment.
Figure 29B:
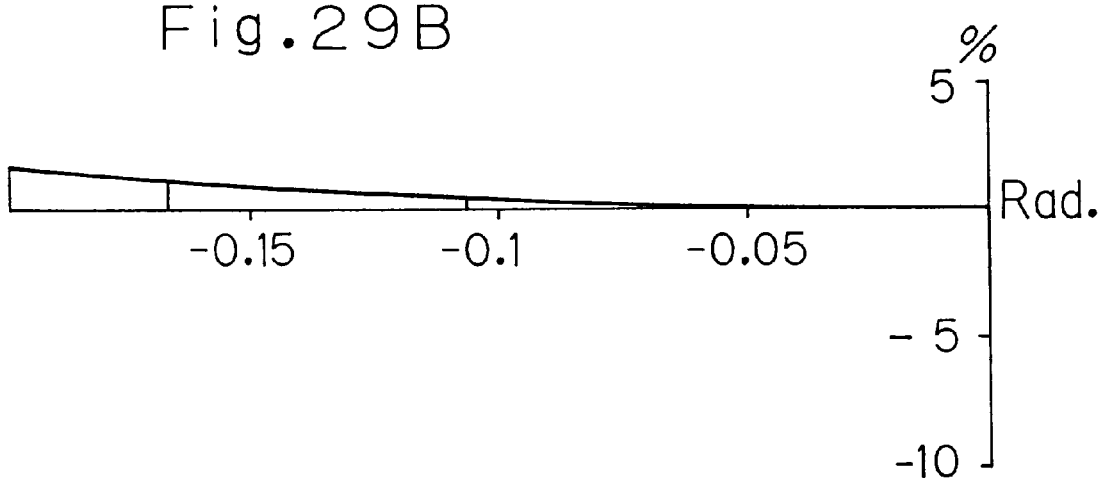
Figure 29C:
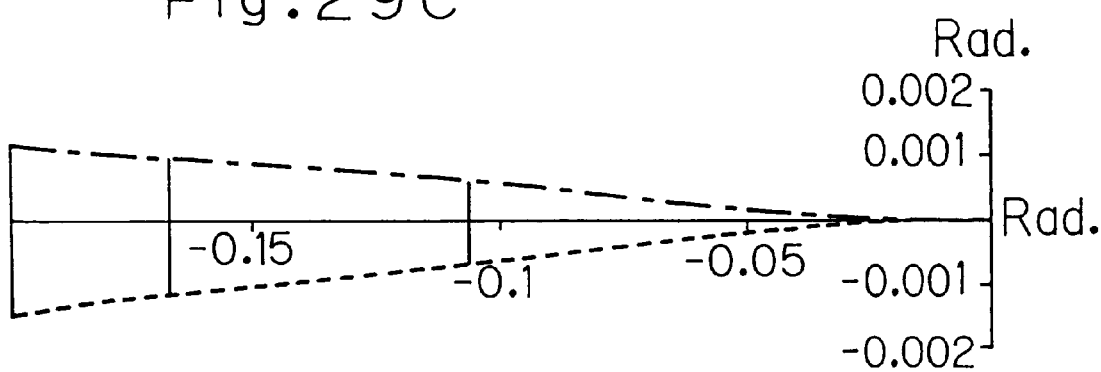
Figure 30A:
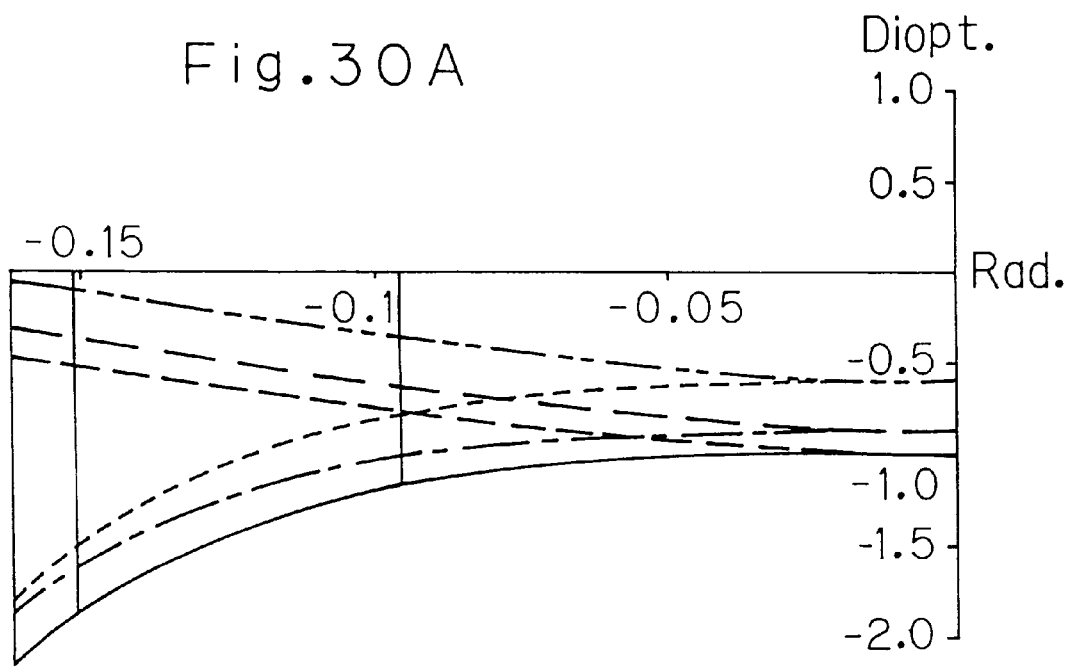
FIGS. 30A to 30C are aberration diagrams showing the aberration observed at the wide-angle end of the ninth embodiment.
Figure 30B:
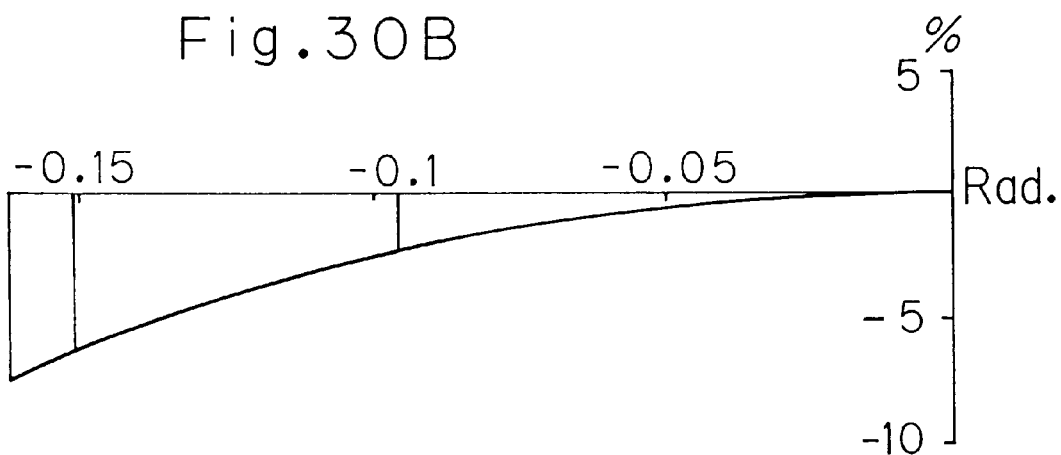
Figure 30C:
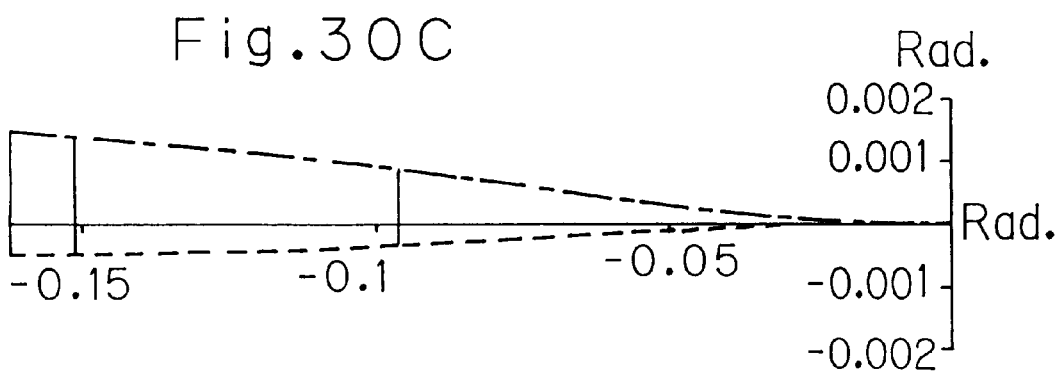
Figure 31A:
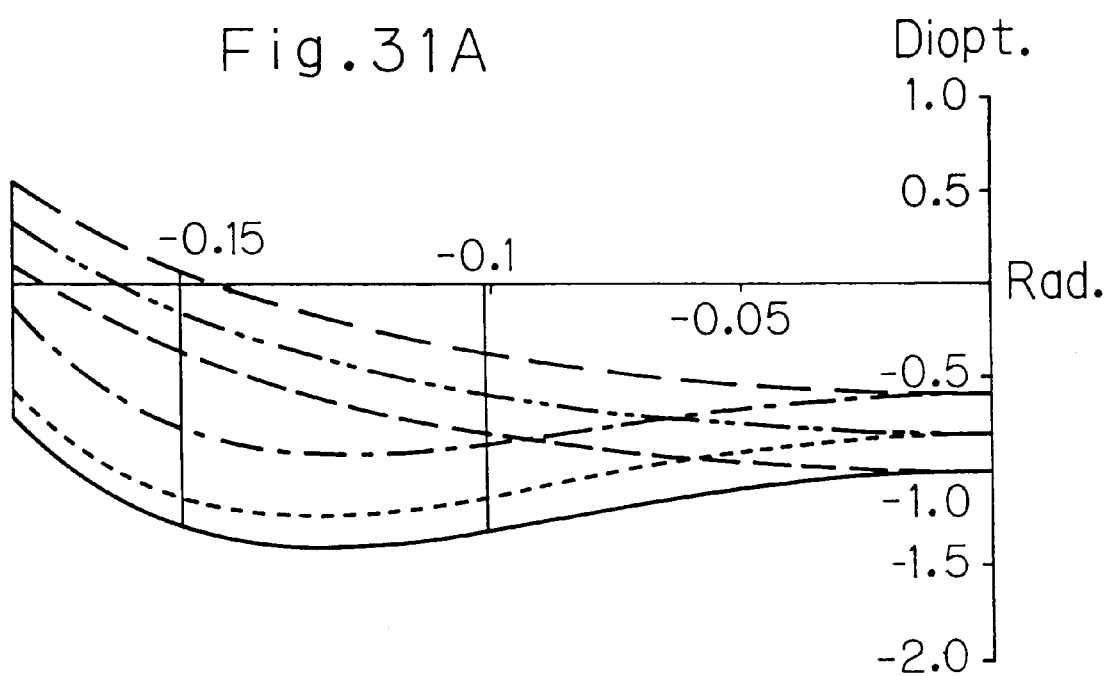
FIGS. 31A to 31C are aberration diagrams showing the aberration observed at the telephoto end of the ninth embodiment.
Figure 31B:
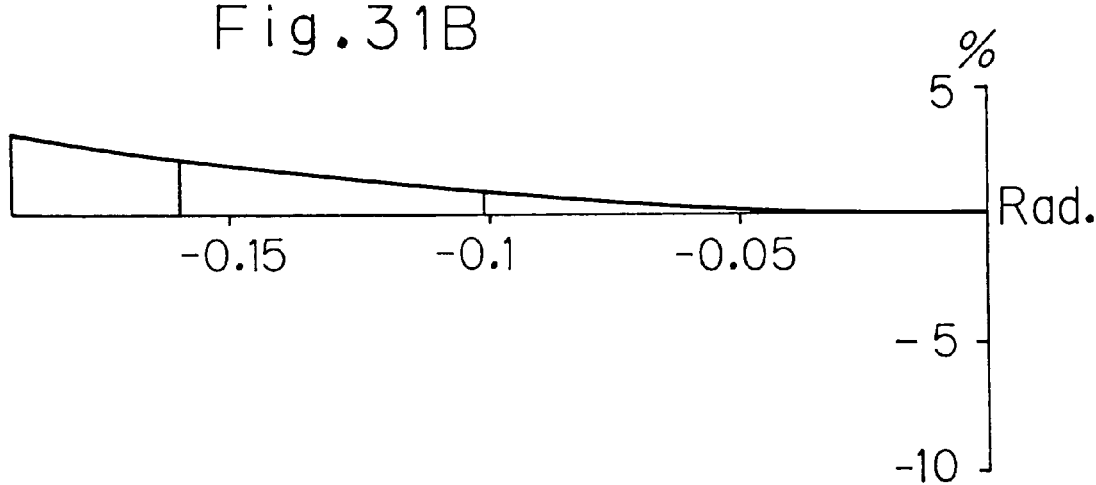
Figure 31C:
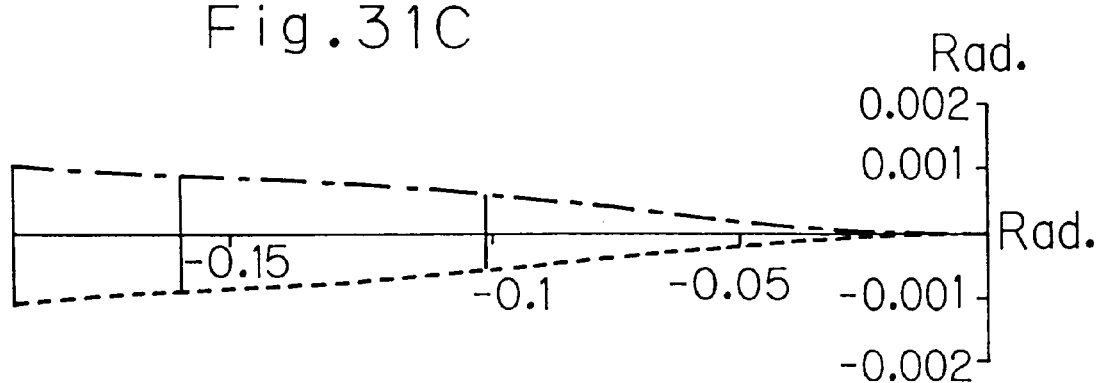

FIGS. 22A to 22C are aberration diagrams showing the aberration observed at the wide-angle end of the fifth embodiment; FIGS. 23A to 23C are aberration diagrams showing the aberration observed at the telephoto end of the fifth embodiment. FIGS. 24 A to 24 C are aberration diagrams showing the aberration observed at the wide-angle end of the sixth embodiment; FIGS. 25A to 25C are aberration diagrams showing the aberration observed at the telephoto end of the sixth embodiment. FIGS. 26 A to 26C are aberration diagrams showing the aberration observed at the wide-angle end of the seventh embodiment; FIGS. 27A to 27C are aberration diagrams showing the aberration observed at the telephoto end of the seventh embodiment. FIGS. 28A to 28C are aberration diagrams showing the aberration observed at the wide-angle end of the eighth embodiment; FIGS. 29A to 29C are aberration diagrams showing the aberration observed at the telephoto end of the eighth embodiment. FIGS. 30A to 30C are aberration diagrams showing the aberration observed at the wide-angle end of the ninth embodiment; FIGS. 31A to 31C are aberration diagrams showing the aberration observed at the telephoto end of the ninth embodiment.

Of these aberration diagrams, FIGS. 22A to 31A show astigmatism, FIGS. 22B to 31B show distortion, and FIGS. 22C to 31C show lateral chromatic aberration. In all of these aberration diagrams, the object distance is assumed to be 3 m. In these aberration diagrams, aberration for light of different wavelengths (design wavelengths: e-lines, c-lines, and g-lines) is plotted with different types of line. For astigmatism, the dioptric power (in diopters) is taken along the vertical axis; for distortion, the percentage of distortion is taken along the vertical axis; for lateral chromatic aberration, the angle with respect to the optical axis (in radians) is taken along the vertical axis. For all types of aberration, the angle of incidence (in radians) on the entrance pupil plane is taken along the horizontal axis.

For the fifth to ninth embodiments, as seen from their construction data, the aberration occurring on the diffracting optical surfaces is evaluated by the use of the Sweatt model. The Sweatt model refers to a method of performing optical calculations on diffracting optical surfaces in a simplified way. According to the Sweatt model, calculations on diffracting optical surfaces can be performed in a similar way as ordinary calculations in geometrical optics, simply by using an extremely large index of refraction in relation to a given wavelength. Here, each type of aberration is calculated on the assumption that the index of refraction for e-lines is 1001.00000.

In the viewfinder optical system of the fifth embodiment, the objective lens tg is constituted of a first lens unit g1 having negative power, and a second lens unit g2 having positive power, and zooming is performed by moving the first and second lens units g1 and g2 as indicated by arrows m1 and m2, respectively. The condenser lens co is disposed in the vicinity of the image plane of the objective lens tg. An image formed by the objective lens tg is magnified by a reversing and inverting prism p and the eyepiece lens se, and is then observed from the position of the pupil he.

In the viewfinder optical system of the sixth embodiment, the objective lens tg is constituted of a first lens unit g1 having negative power, a second lens unit g2 having positive power, and a third lens unit g3 having negative power, and zooming is performed by moving the second and third lens units g2 and g3 as indicated by arrows m2 and m3, respectively. The use of a negative lens as the third lens unit g3 allows the lens back of the objective lens tg to be made shorter, and thus makes the optical system as a whole compact. Moreover, the arrangement of the negative lens in the vicinity of the image plane contributes to the improvement of the imaging performance.

In the viewfinder optical systems of the seventh to ninth embodiments, the objective lens tg is constituted of a first lens unit g1 having negative power, a second lens unit g2 having positive power, and a third lens unit g3 having positive power, and zooming is performed by moving the first and second lens units g1 and g2 as indicated by arrows m1 and m2, respectively. The use of a positive lens as the third lens unit g3 reduces the composite power of the first and second lens units g1 and g2, and thus makes the optical system less sensitive to errors. This contributes to the improvement of the viewfinder performance. The third lens unit g3 is formed as one unit together with a prism having a reversing function, and the condenser lens co is formed on the entrance surface of the reversing prism p as one unit together with the reversing prism p.

In the fifth to seventh embodiments, a diffracting optical surface is formed on the pupil he side surface of the second lens unit g2, which has the longer distance to move. However, in this embodiment, the diffracting optical surface may be formed on either of the object side surface and the pupil he side surface of the lens. In the eighth embodiment, a diffracting optical surface is formed on the object side surface of the second lens unit g2, which has the longer distance to move. In the ninth embodiment, diffracting optical surfaces are formed on the pupil he side surface of the first lens unit g1 and on the object side surface of the second lens unit g2. Moreover, in the ninth embodiment, the position conjugate to the pupil he comes at the mid point between the first and second lens units g1 and g2, and accordingly the sign of lateral chromatic aberration is reversed in between. This makes it easy to balance chromatic aberration with the two diffracting optical surfaces. In any of the fifth to ninth embodiments, both axial chromatic aberration and lateral chromatic aberration are well balanced between the wide-angle end and the telephoto end, as seen from the aberration diagrams FIGS. 22A–22C to 31A–31C, which will be described later.

Figure 32A:
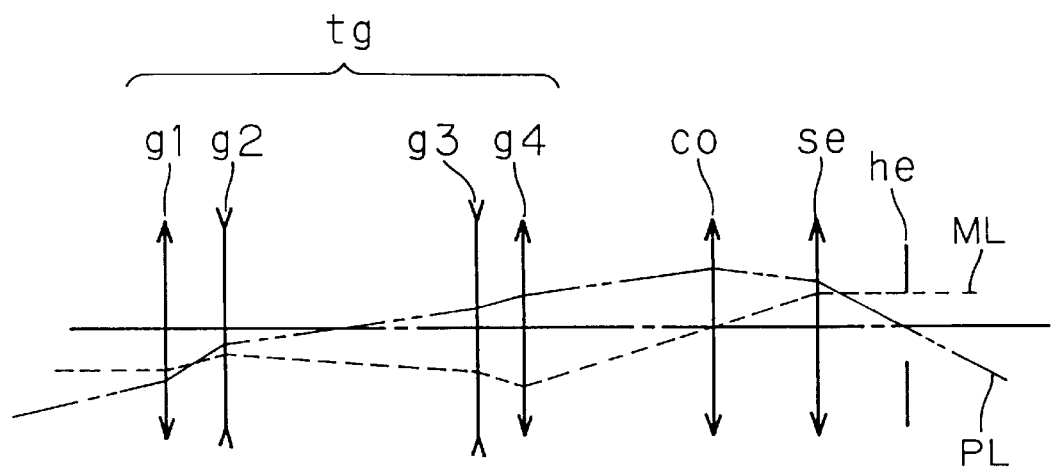
FIGS. 32A and 32B are diagrams schematically showing the paraxial power arrangement and optical paths of a Kepler-type real-image viewfinder optical system whose objective lens is a zoom lens system.
Figure 32B:
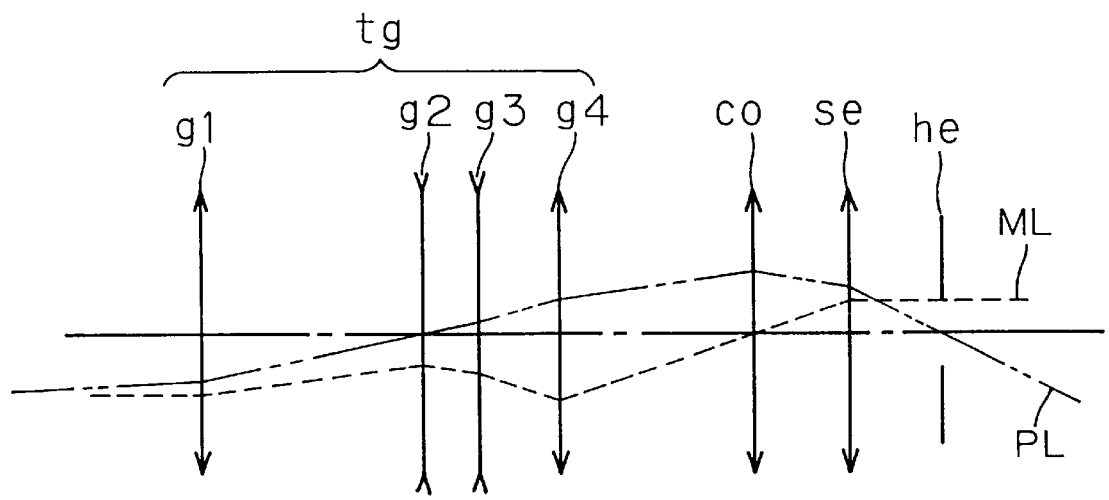

FIGS. 32A and 32B show the paraxial power arrangement of a viewfinder optical system whose objective lens tg is a zoom lens system constituted of four lens units, with FIG. 32A illustrating the state at the wide-angle end and FIG. 32B illustrating the state at the telephoto end. Here, the objective lens tg is constituted of, from the object side, a first lens unit g1 having positive power, a second lens unit g2 having negative power, a third lens unit g3 having negative power, and a fourth lens unit g4 having positive power. During zooming, the first and fourth lens units g1 and g4 are kept in fixed positions. To achieve zooming from the wide-angle state to the telephoto state, the second lens unit g2 is moved linearly toward the eyepiece lens se side, whereas the third lens unit g3 is first moved toward the object side and is then moved slightly backward toward the eyepiece lens se.

As seen from FIGS. 32A and 32B, during zooming, the height h' of the ideal principal ray PL significantly varies in the second and third lens units g2 and g3. This means that the zoom movement of the second and third lens units g2 and g3 causes the variation of lateral chromatic aberration. Accordingly, if a diffracting optical surface is provided in the second and third lens units g2 and g3 that are moved during zooming, and thus the coefficients of chromatic aberration are reduced within those lens units, it is possible to reduce the variation of the lateral chromatic aberration occurring over the entire zoom viewfinder optical system during zooming.

Figure 33:
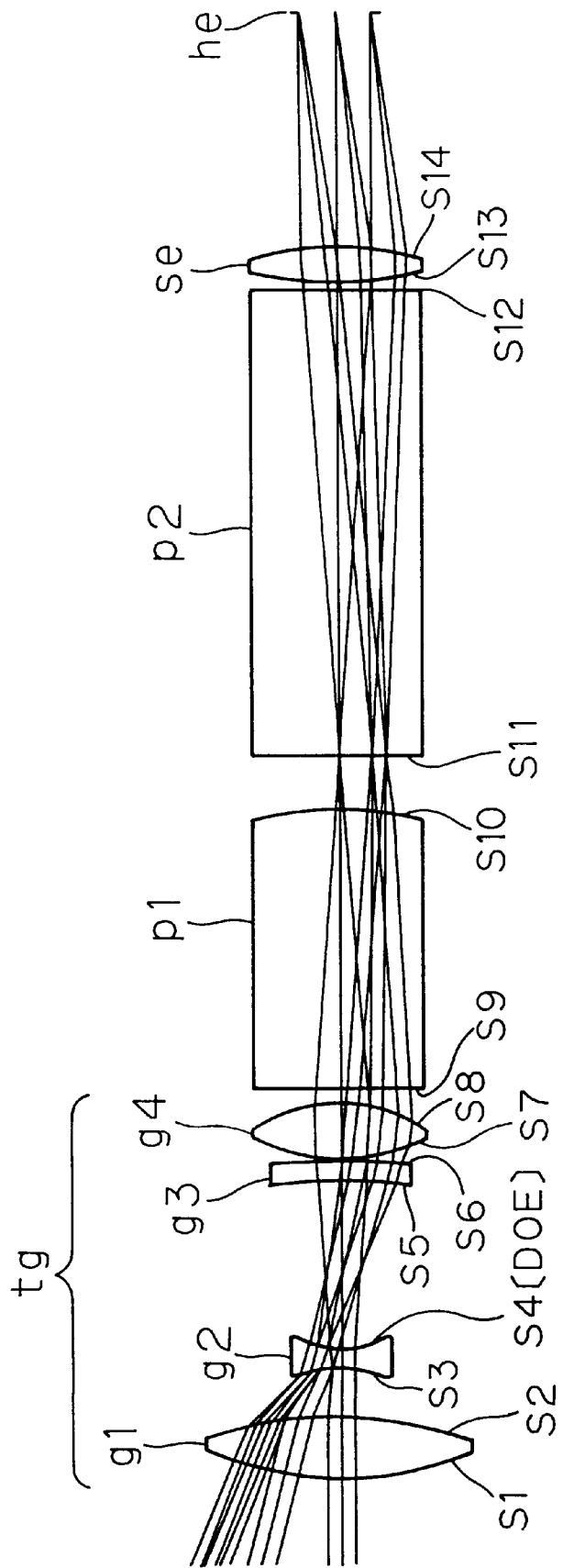
FIG. 33 is a diagram showing the optical arrangement and optical paths of the tenth embodiment of the present invention.
Figure 34:
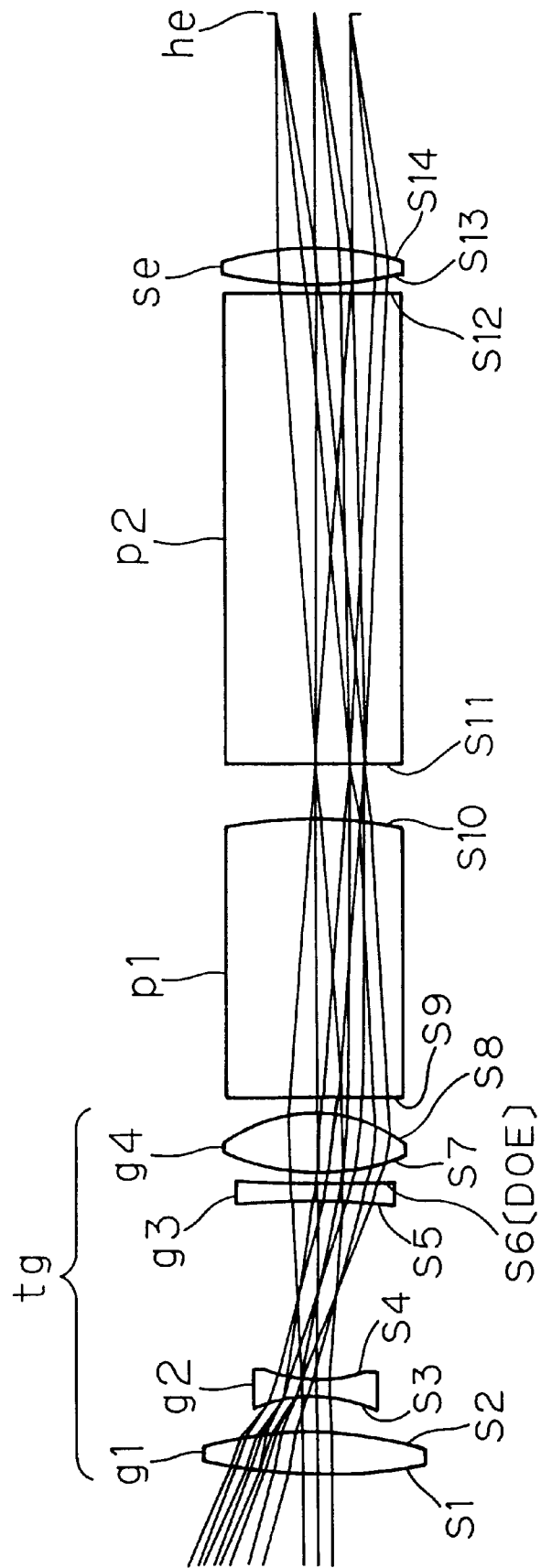
FIG. 34 is a diagram showing the optical arrangement and optical paths of the eleventh embodiment of the present invention.

FIGS. 33 and 34 show the optical arrangement and optical paths of zoom viewfinder optical systems as a tenth and an eleventh embodiment, respectively, of the present invention, each showing the state of the optical system at the wide-angle end.

In the tenth and eleventh embodiments, a zoom lens system constituted of four, i.e. positive, negative, negative, and positive, lens units is used as the objective lens tg, and a diffracting optical surface is provided in the second or third lens unit g2 or g3. This makes it possible to correct chromatic aberration properly over the entire zoom range with a reduced number of lens elements. In addition, since zooming is performed by moving the second and third lens units g2 and g3, reduction of the variation of chromatic aberration and reduction of the number of lens elements can be achieved effectively.

A diffracting optical surface has a great ability to correct chromatic aberration, and it exhibits a greater chromatic aberration correction ability when provided in the objective lens tg than when provided in the eyepiece lens se. Specifically, by providing a diffracting optical surface in the objective lens tg, it is possible to correct not only the chromatic aberration occurring in the objective lens tg, but also the chromatic aberration occurring in the eyepiece lens se.

It is preferable that a zoom viewfinder optical system which is constituted of four, i.e., from the object side, positive, negative, negative, and positive, lens units and in which the second lens unit g2 is provided with a diffracting optical surface satisfy condition (5) below:

$$-0.2 < \frac{\phi 2D}{\phi 2} < -0.05 \quad (5)$$

where $\phi 2D$: the optical power of both diffraction and refraction of the diffracting and refracting optical surfaces included in the second lens unit;

$\phi 2$: the optical power of diffraction of the diffracting optical surface included in the second lens unit.

It is preferable that a zoom viewfinder optical system which is constituted of four, i.e., from the object side, positive, negative, negative, and positive, lens units and in which the third lens unit g3 is provided with a diffracting optical surface satisfy condition (6) below:

$$-0.2 < \frac{\phi 3D}{\phi 3} < -0.05 \quad (6)$$

where $\phi 3D$: the optical power of both diffraction and refraction of the diffracting and refracting optical surfaces included in the third lens unit;

$\phi 3$: the optical power of diffraction of the diffracting optical surface included in the third lens unit.

Conditions (5) and (6) define conditions related to the chromatic aberration correction ability of the diffracting optical surface. When condition (5) or (6) is satisfied, chromatic aberration can be corrected effectively over the entire zoom range. If the upper limit of condition (5) or (6) is exceeded, the chromatic aberration correction ability of the diffracting optic al surface is insufficient, with the result that chromatic aberration is undercorrected. If the lower limit of condition (5) or (6) is exceeded, the chromatic aberration correction ability of the diffracting optical surface is excessive, with the result that chromatic aberration is overcorrected.

It is preferable that the eyepiece lens se is composed only of refracting optical surfaces. Since the lens surfaces of the objective lens tg have positive dioptric power, even if a diffracting optical surface is provided in the objective lens tg, the pattern of the diffraction grating is invisible from the eyepiece se side. Accordingly, if a diffracting optical surface is provided in the objective lens tg, and, in addition, the eyepiece lens se is composed only of refracting optical surfaces, the viewfinder optical system does not suffer from visually undesirable appearance.

Tables 13 and 14 list the construct ion data of the zoom viewfinder optical systems of the tenth and eleventh embodiments (FIGS. 33 and 34), respectively. In the construction data of tables 13 and 14, the symbols and marks such as Si, ri, di, Ni, vi, vd, (*), and [DOE] are defined in the same ways as in the tables presented earlier (for example, in table 8). Listed together with the construction data are the viewfinder magnification β, the value corresponding to condition (5) and related values (for the tenth embodiment only), and the value corresponding to condition (6) and related values (for the eleventh embodiment only) at the wide-angle end and at the telephoto end.

In the tenth and eleventh embodiments, the objective lens tg is constituted of a first lens unit g1 having positive power, a second lens unit g2 having negative power, a third lens unit g3 having negative power, and a fourth lens unit g4 having positive power. Each of the lens units g1 to g4 is composed of single lenses. Zooming is performed by moving the second and third lens units g2 and g3 along the optical axis. During zooming, the first and fourth lens units g1 and g4 are kept in fixed positions.

In the tenth and eleventh embodiments, on the pupil he side of the objective lens tg are disposed prisms p1 and p2 for reversing the image, and on the pupil he side of the prism p2 is disposed the eyepiece lens se. The pupil he side surface of the prism p1 is located in the vicinity of the image plane formed by the objective lens tg, and, on this pupil he side surface of the prism p1, a condenser lens co (FIGS. 32A and 32B) is formed as one unit together with the prism p1. The image formed by the objective lens tg is reversed by the prisms p1 and p2, is magnified by the eyepiece lens se, and is then observed at the position of the pupil he.

Although the diffracting optical surface [DOE] is provided on the pupil he side surface of the second lens unit g2 in the tenth embodiment and on the pupil he side surface of the third lens unit g3 in the eleventh embodiment, the diffracting optical surface [DOE] may be provided either on the object side surface or on the pupil he side surface of the lens. The lens having the diffracting optical surface [DOE] can be produced by injection molding, or by bonding ultraviolet-ray-setting resin onto the lens surface, that is, by any method that allows integration of a diffracting optical surface with a refracting optical surface.

Figure 36A:
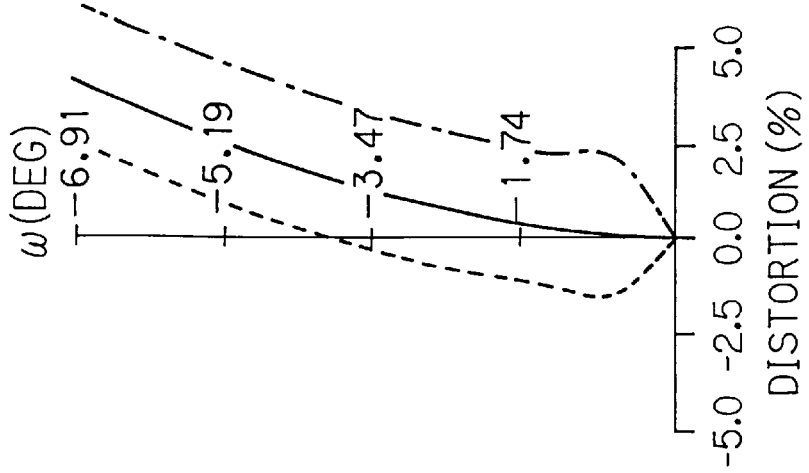
FIGS. 36A to 36C are aberration diagrams showing the aberration observed at the telephoto end of the tenth embodiment.
Figure 36B:
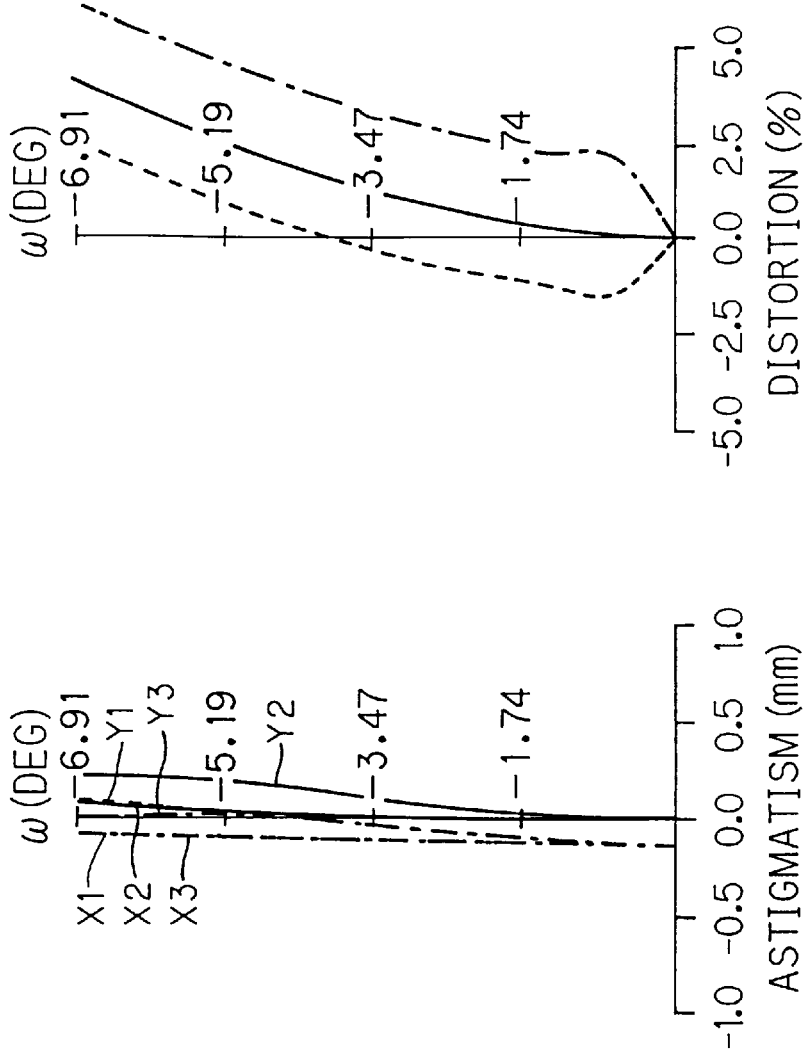
Figure 36C:
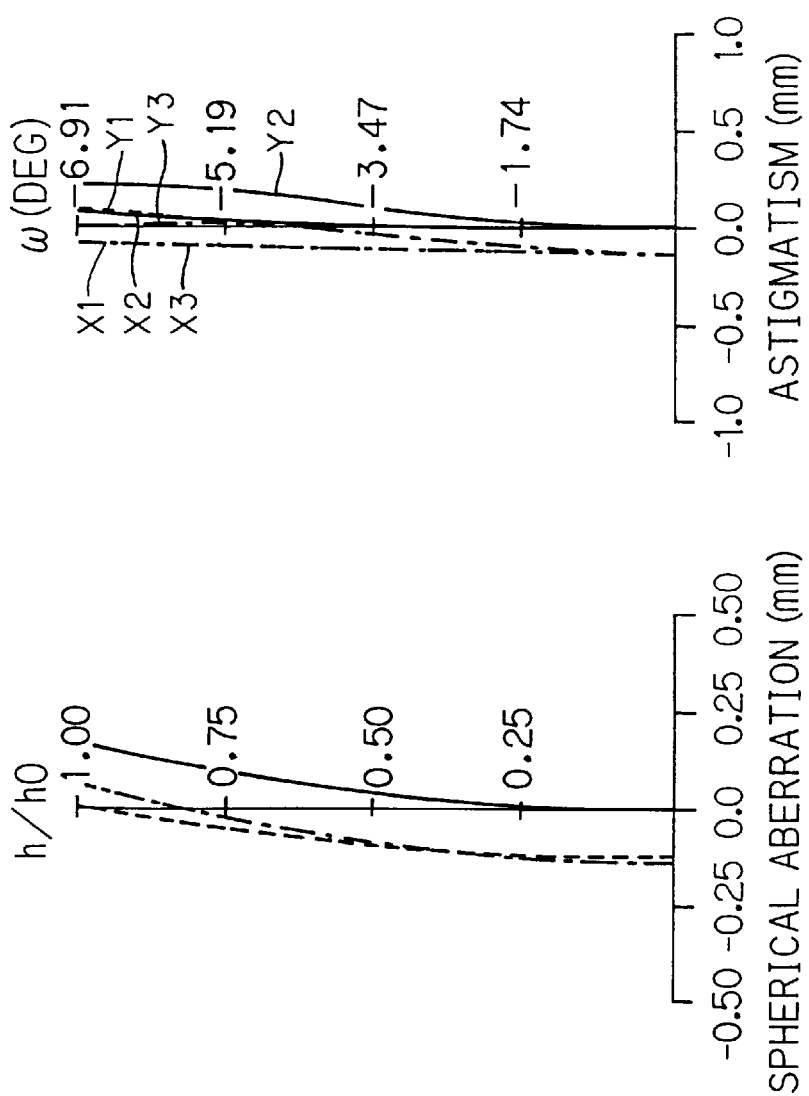
Figure 38C:
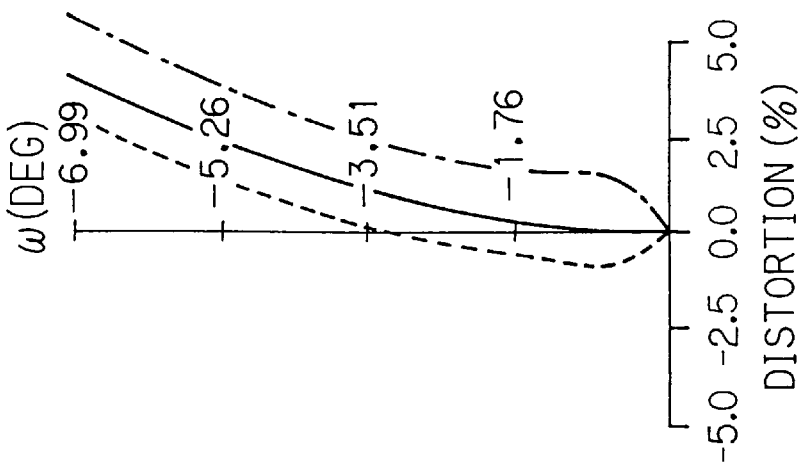
FIGS. 38A to 38C are aberration diagrams showing the aberration observed at the telephoto end of the eleventh embodiment.
Figure 38B:
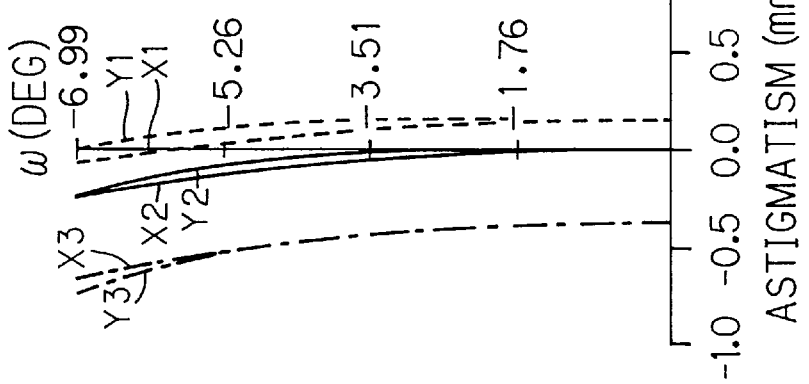
Figure 38A:
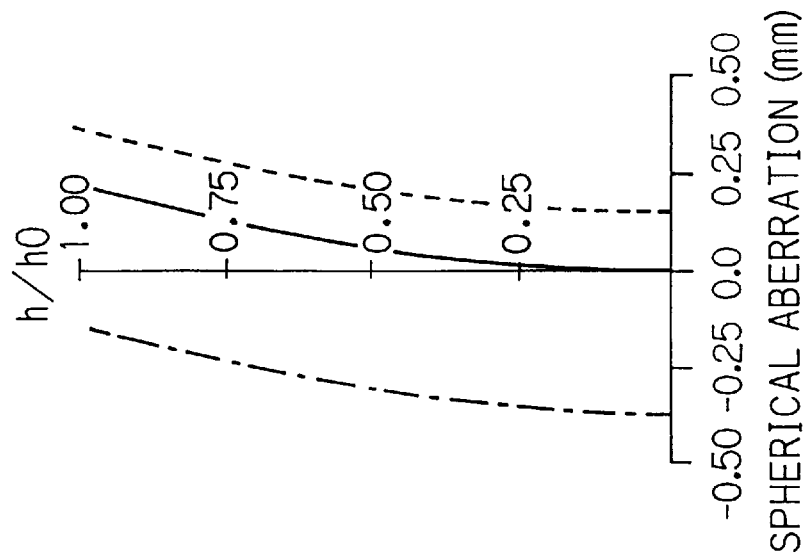

FIGS. 35A to 35C are aberration diagrams showing the aberration observed at the wide-angle end of the tenth embodiment; FIGS. 36A to 36C are aberration diagrams showing the aberration observed at the telephoto end of the tenth embodiment. FIGS. 37A to 37C are aberration diagrams showing the aberration observed at the wide-angle end of the eleventh embodiment; FIGS. 38A to 38C are aberration diagrams showing the aberration observed at the telephoto end of the eleventh embodiment. In these aberration diagrams, a broken line represents aberration for C-lines (wavelength: λC=656.3 nm), a solid line represents aberration for e-lines (wavelength: λe=546.1 nm), and a dash-dot line represents aberration for g-lines (wavelength: λg=435.8 nm). Of these aberration diagrams, FIGS. 35A to 38A show spherical aberration, FIGS. 35B to 38B show astigmatism, and FIGS. 35C to 38C show distortion. In all of these aberration diagrams, aberration is plotted in millimeters on the assumption that the object distance is 4 m, and that the entire optical system serves as an imaging lens system having at its pupil SE position an ideal lens with a focal length of $f_{id}$=20 mm.

For spherical aberration, the deviation (mm) along the optical axis from the paraxial image plane is taken along the horizontal axis, and h/h0, which is a value obtained by standardizing the height h of light rays on the pupil plane (SE) with respect to the maximum height h0, is taken along the vertical axis. For astigmatism, the deviation of sagittal imaging points (X1 to X3, mm) and the deviation of meridional imaging points (Y1 to Y3, mm) from the paraxial image plane are taken along the horizontal axis, and the angle of incidence ω (degrees) on the pupil plane (SE) is taken along the vertical axis. For distortion, the percentage of distortion (%) is taken along the horizontal axis, and the angle of incidence ω (degrees) on the pupil plane (SE) is taken along the vertical axis. From these aberration diagrams, it would be understood that, in both of the tenth and eleventh embodiments, well-balanced correction of chromatic aberration is achieved over the entire range from the wide-angle end to the telephoto end.

Figure 39A:
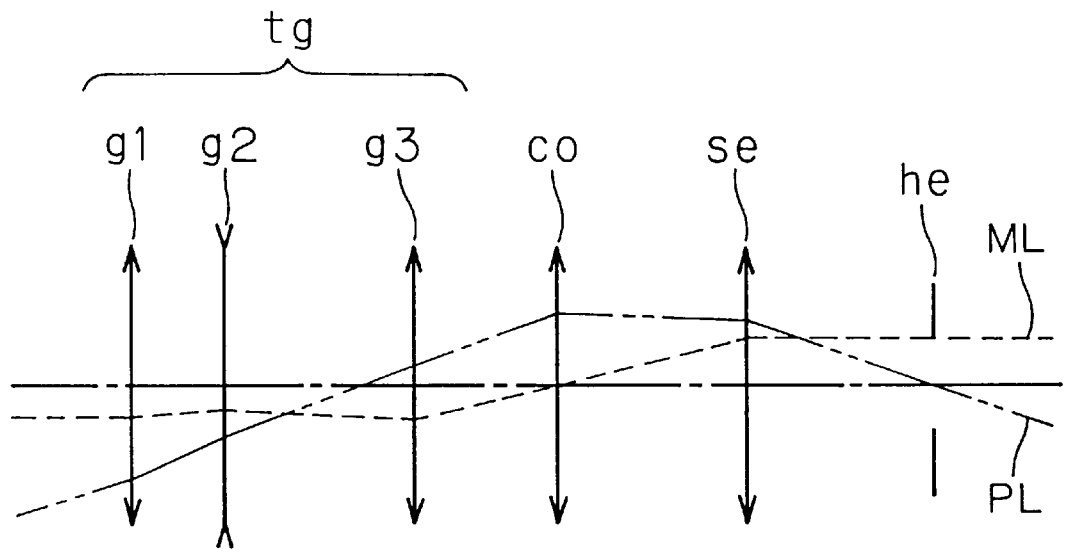
FIGS. 39A and 39B are diagrams schematically showing the paraxial power arrangement and optical paths of a Kepler-type real-image viewfinder optical system whose objective lens is a zoom lens system.
Figure 39B:
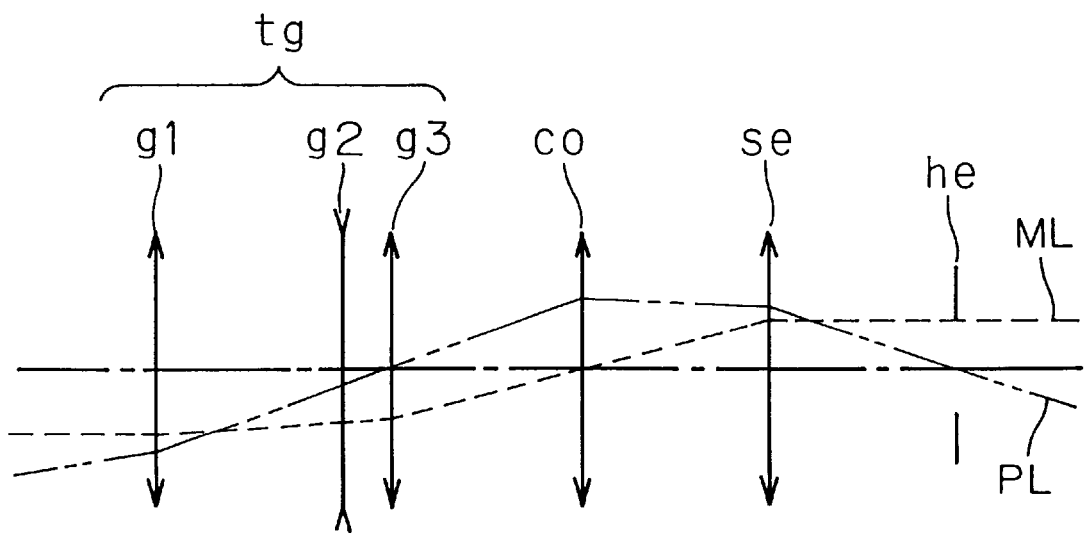
Figure 40:
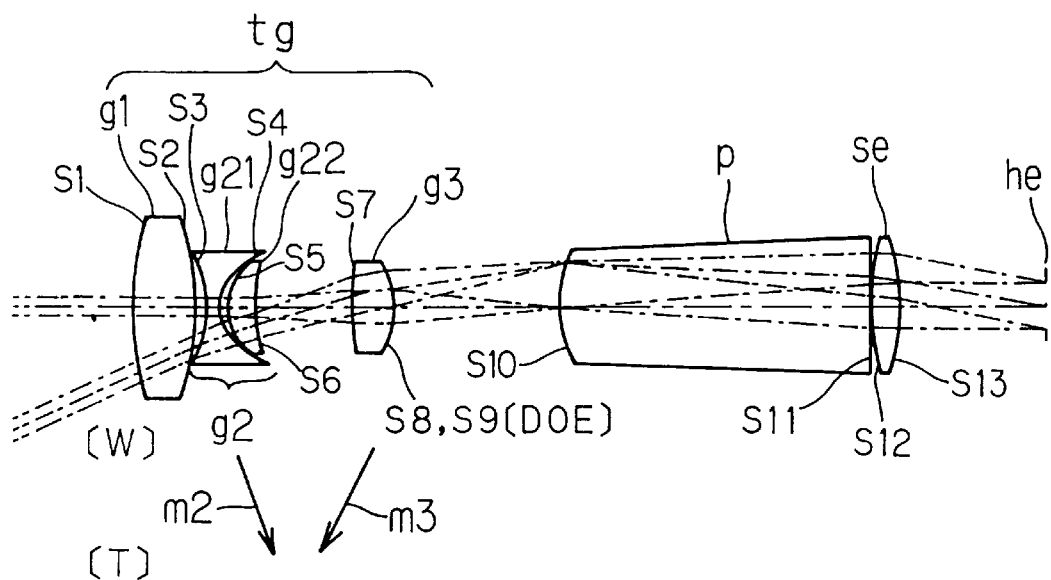
FIG. 40 is a diagram showing the optical arrangement and optical paths of the twelfth embodiment of the present invention.
Figure 41:
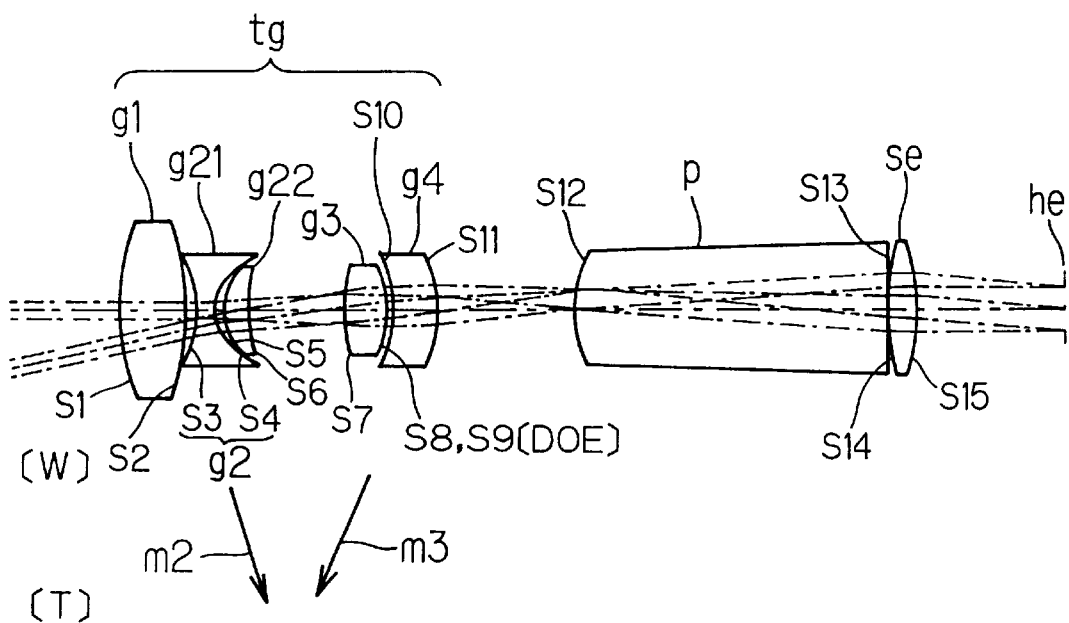
FIG. 41 is a diagram showing the optical arrangement and optical paths of the thirteenth embodiment of the present invention.
Figure 42:
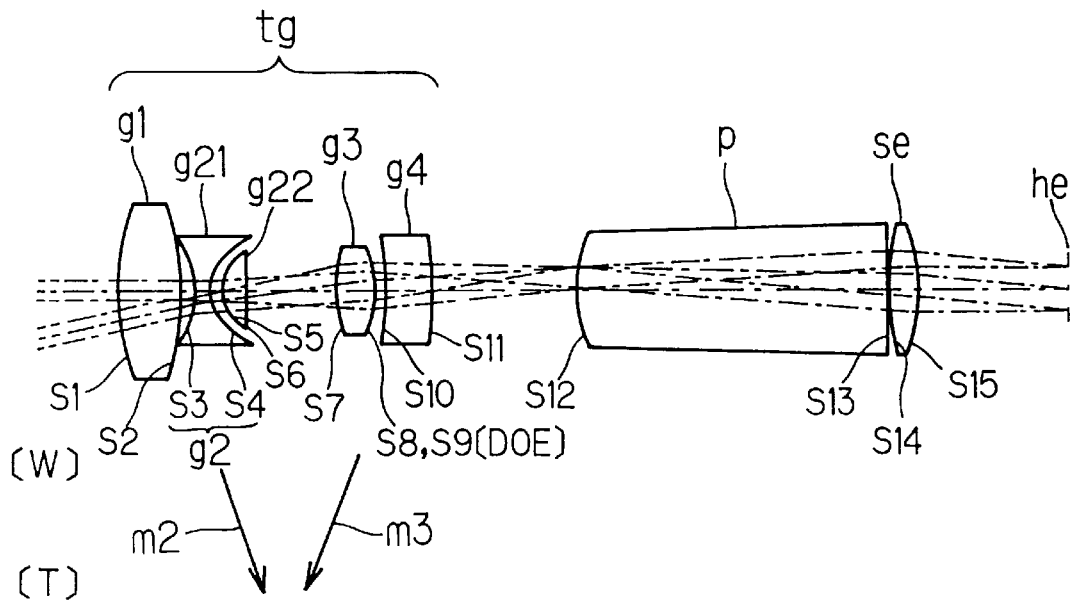
FIG. 42 is a diagram showing the optical arrangement and optical paths of the fourteenth embodiment of the present invention.
Figure 43:
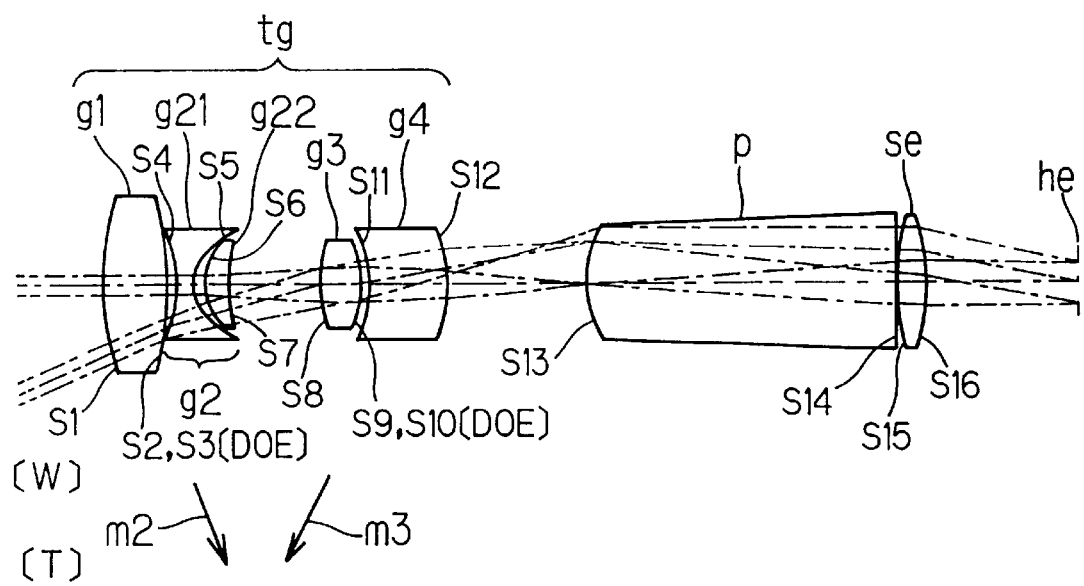
FIG. 43 is a diagram showing the optical arrangement and optical paths of the fifteenth embodiment of the present invention.

FIGS. 39A and 39B show the paraxial power arrangement of a viewfinder optical system whose objective lens tg is a zoom lens system constituted of three lens units, with FIG. 39A illustrating the state at the wide-angle end and FIG. 39B illustrating the state at the telephoto end. Here, the objective lens tg is constituted of, from the object side, a first lens unit g1 having positive power, a second lens unit g2 having negative power, and a third lens unit g3 having positive power. During zooming, the first lens unit g1 is kept in a fixed position. To achieve zooming from the wide-angle state to the telephoto state, the second lens unit g2 is moved toward the eyepiece lens se side, and the third lens unit g3 is moved toward the object side.

As seen from FIGS. 39A and 39B, the height h of the ideal marginal ray ML in the third lens unit g3 is large both in the wide-angle state and in the telephoto state, and it does not vary significantly with zooming. This indicates that the third lens unit g3 is the lens unit most suitable for use in correcting axial chromatic aberration.

FIGS. 40 to 43 show the optical arrangement and optical paths of zoom viewfinder optical systems as a twelfth to a fifteenth embodiment, respectively, of the present invention, each showing the state of the optical system at the wide-angle end. In FIGS. 40 to 43, arrows m2 and m3 indicate the movement of the second and third lens units g2 and g3, respectively, during zooming from the wide-angle end to the telephoto end.

In the twelfth to fifteenth embodiments, a zoom lens system constituted of three, i.e. positive, negative, and positive, lens units is used as the objective lens tg, and a diffracting optical surface is provided in the third lens unit g3. This makes it possible to correct chromatic aberration properly over the entire zoom range with a reduced number of lens elements. In addition, since zooming is performed by moving the second and third lens units g2 and g3, reduction of the variation of chromatic aberration and reduction of the number of lens elements can be achieved effectively. Moreover, if the zoom lens system is further provided with a fourth lens unit having positive or negative power so as to include four lens units in total, it is possible to further improve the aberration characteristics of the objective lens tg.

A diffracting optical surface has a great ability to correct chromatic aberration, and it exhibits a greater chromatic aberration correction ability when provided in the objective lens tg than when provided in the eyepiece lens se. Specifically, by providing a diffracting optical surface in the objective lens tg, it is possible to correct not only the chromatic aberration occurring in the objective lens tg, but also the chromatic aberration occurring in the eyepiece lens se.

Although the first lens unit g1 has weaker power than the third lens unit g3, a major part of chromatic aberration is attributable to the first lens unit g1, since the height h of the ideal marginal ray ML and the height h' of the ideal principal ray PL are larger in the first lens unit g1 than in the third lens unit 3. Accordingly, by providing a diffracting optical surface also in the first lens unit g1, it is possible to further correct chromatic aberration. In that case, however, since the height h of the ideal marginal ray ML varies with zooming, it is preferable to correct axial chromatic aberration with the second lens unit g2 and correct lateral chromatic aberration with the diffracting optical surface provided in the first lens unit g1.

It is preferable that a zoom viewfinder optical system which is constituted of more than three, i.e., from the object side, positive, negative, and positive, lens units and in which the third lens unit g3 is provided with a diffracting optical surface satisfy condition (7) below:

$$0.01 < \frac{\phi 3D}{\phi 3} < 0.1 \tag{7}$$

where $\phi$3D: the optical power of both diffraction and refraction of the diffracting and refracting surfaces included in the third lens unit, $\phi$3: the optical power of diffraction of the diffracting surface included in the third lens unit.

Conditions (7) defines conditions related to the chromatic aberration correction ability of the diffracting optical surface. When condition (7) is satisfied, chromatic aberration can be corrected effectively over the entire zoom range. If the lower limit of condition (7) is exceeded, the chromatic aberration correction ability of the diffracting optical surface is insufficient, with the result that chromatic aberration is undercorrected. If the upper limit of condition (7) is exceeded, the chromatic aberration correction ability of the diffracting optical surface is excessive, with the result that chromatic aberration is overcorrected.

It is preferable that the eyepiece lens se is composed only of refracting optical surfaces. Since the lens surfaces of the objective lens tg have positive dioptric power, even if a diffracting optical surface is provided in the objective lens tg, the pattern of the diffraction grating is invisible from the eyepiece se side. Accordingly, if a diffracting optical surface is provided in the objective lens tg, and, in addition, the eyepiece lens se is composed only of refracting optical surfaces, the viewfinder optical system does not suffer from visually undesirable appearance.

Tables 15 to 18 list the construction data of the zoom viewfinder optical systems of the twelfth to fifteenth embodiments (FIGS. 40 to 43), respectively. In the construction data of tables 15 to 18, the symbols and marks such as Si, ri, di, Ni, vi, vd, (*), and [DOE] are defined in the same ways as in the tables presented earlier (for example, in table 8). Listed together with the construction data are the viewfinder magnification β, and the value corresponding to condition (7) and related values at the wide-angle end and at the telephoto end of each of the twelfth to fifteenth embodiments.

In the twelfth embodiment, the objective lens tg is constituted of a first lens unit g1 having positive power, a second lens unit g2 having negative power (composed of a negative lens g21 and a positive lens g22), and a third lens unit g3 having positive power. In the thirteenth and fifteenth embodiments, the objective lens tg is constituted of a first lens unit g1 having positive power, a second lens unit g2 having negative power (composed of a negative lens g21 and a positive lens g22), a third lens unit having positive power, and a fourth lens unit having positive power. In the fourteenth embodiment, the objective lens tg is constituted of a first lens unit g1 having positive power, a second lens unit g2 having negative power (composed of a negative lens g21 and a positive lens g22), a third lens unit g3 having positive power, and a fourth lens unit having negative power. In all of the twelfth to fifteenth embodiments, the second lens unit g2 is composed of two lenses, and the other lens units are each composed of a single lens.

In the twelfth to fifteenth embodiments, zooming is performed by moving the second and third lens units g2 and g3 along the optical axis. During zooming, the first lens unit g1 is kept in a fixed position in the twelfth embodiment, and the first and fourth lens units g1 and g4 are kept in fixed positions in the thirteenth to fifteenth embodiments.

In the twelfth to fifteenth embodiments, on the pupil he side of the objective lens tg is disposed a prism p for reversing the image, and on the pupil he side of the prism p is disposed the eyepiece lens se. The object side surface of the prism p is located in the vicinity of the image plane formed by the objective lens tg, and, on this object side surface of the prism p, a condenser lens co (FIGS. 39A and 39B) is formed as one unit together with the prism p. The image formed by the objective lens tg is reversed by the prism p, is magnified by the eyepiece lens se, and is then observed at the position of the pupil he.

Although the diffracting optical surface [DOE] is provided on the pupil he side surface of the third lens unit g3 in the twelfth to fifteenth embodiments and additionally on the pupil he side surface of the first lens unit g1 in the fifteenth embodiment, the diffracting optical surface [DOE] may be provided either on the object side surface or on the pupil he side surface of the lens. The lens having the diffracting optical surface [DOE] can be produced by injection molding, or by bonding ultraviolet-ray-setting resin onto the lens surface, that is, by any method that allows integration of a diffracting optical surface with a refracting optical surface.

Figure 44A:
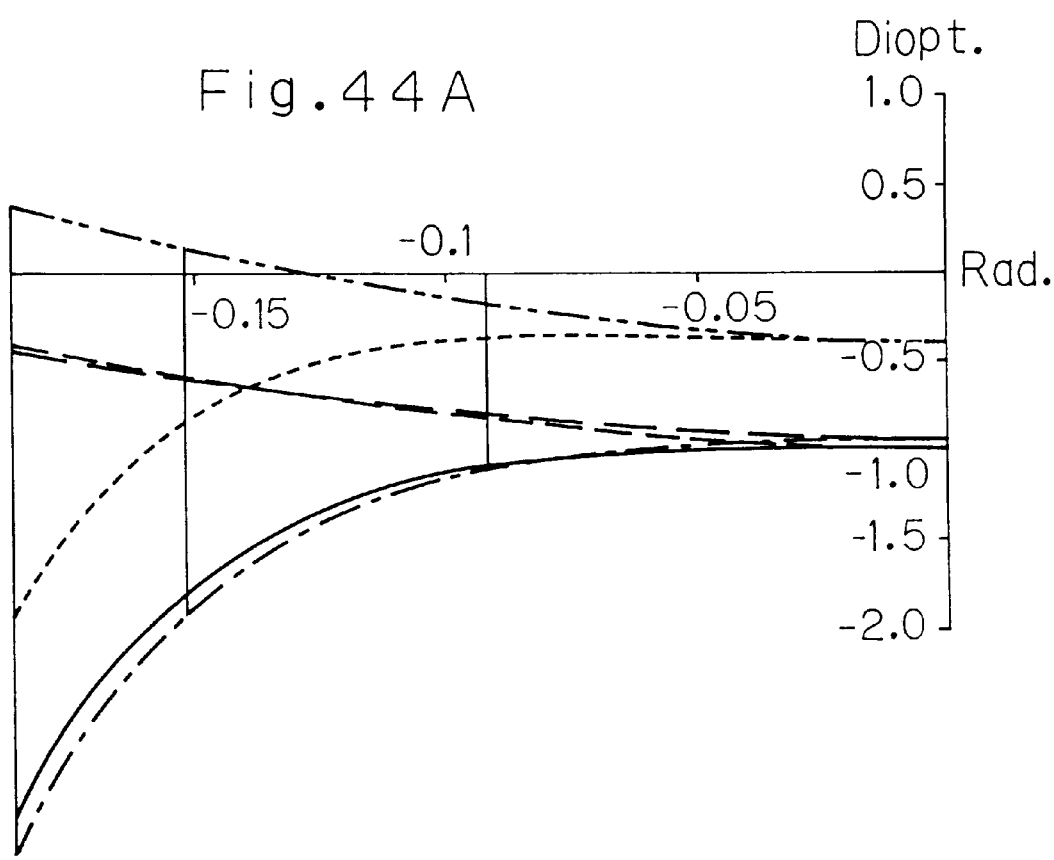
FIGS. 44A to 44C are aberration diagrams showing the aberration observed at the wide-angle end of the twelfth embodiment.
Figure 44B:
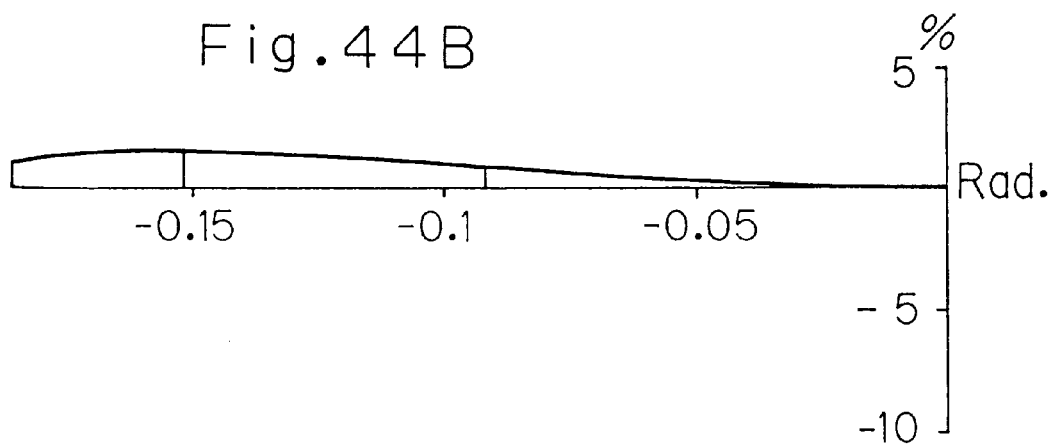
Figure 44C:
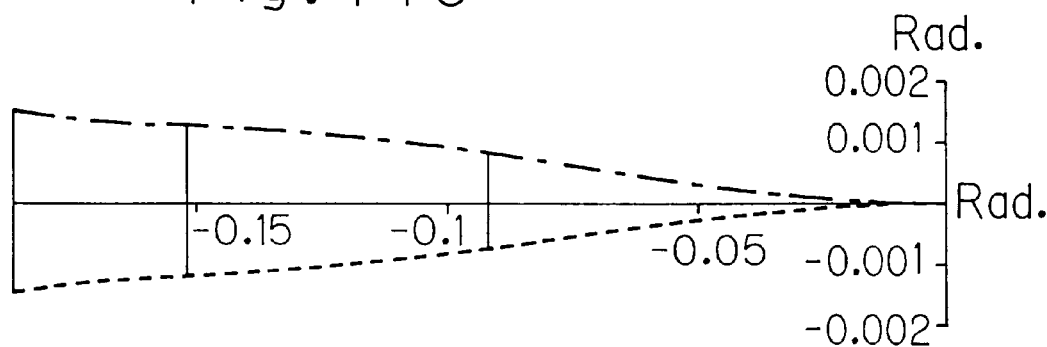
Figure 45A:
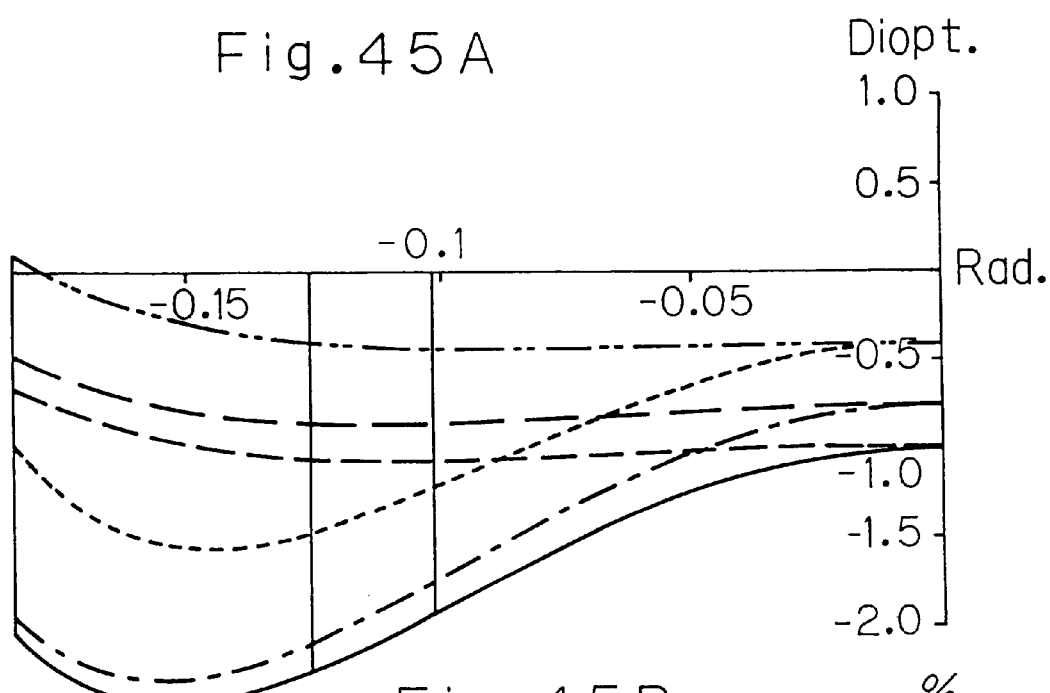
FIGS. 45A to 45C are aberration diagrams showing the aberration observed at the telephoto end of the twelfth embodiment.
Figure 45B:
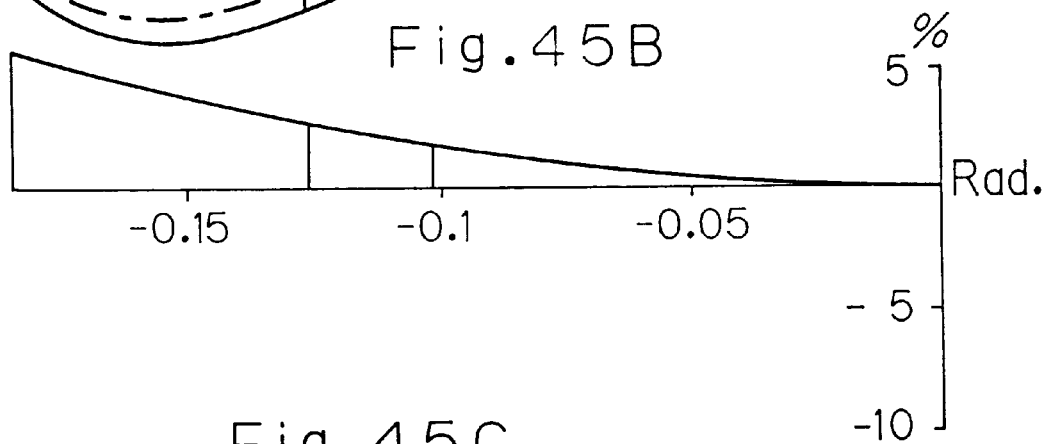
Figure 45C:
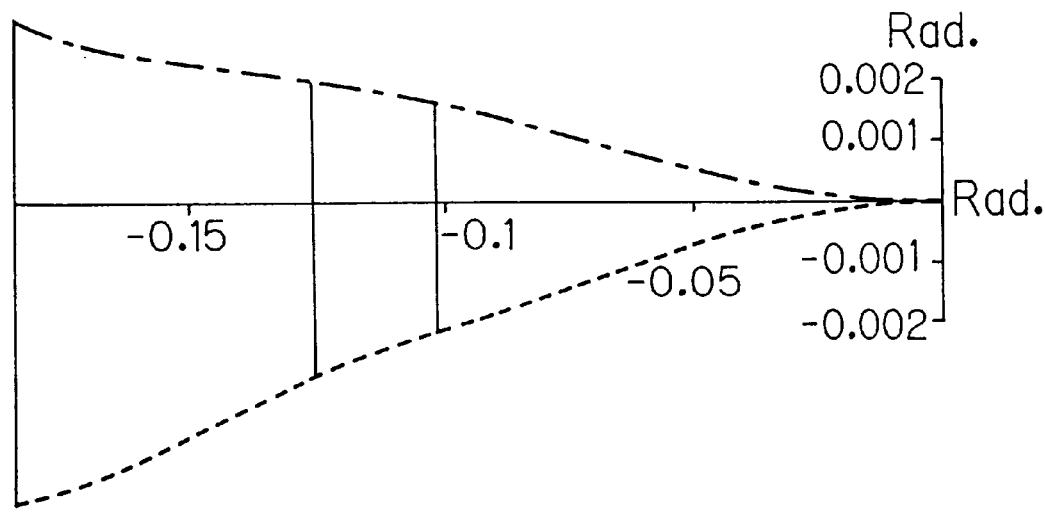
Figure 46A:
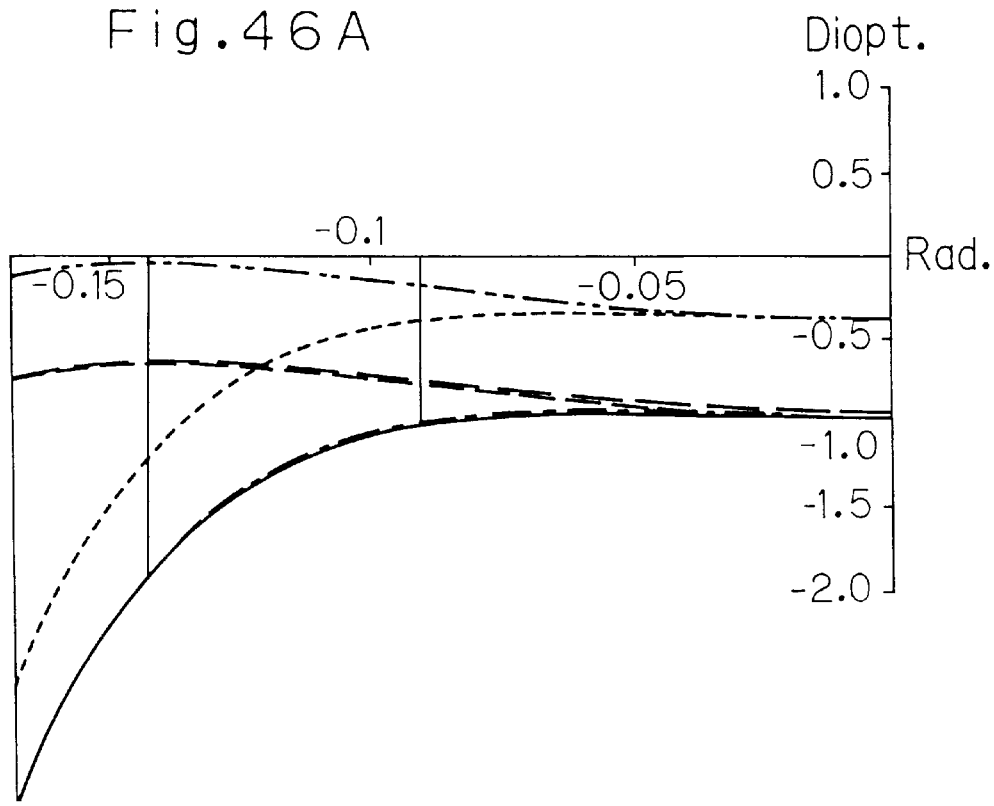
FIGS. 46A to 46C are aberration diagrams showing the aberration observed at the wide-angle end of the thirteenth embodiment.
Figure 46B:
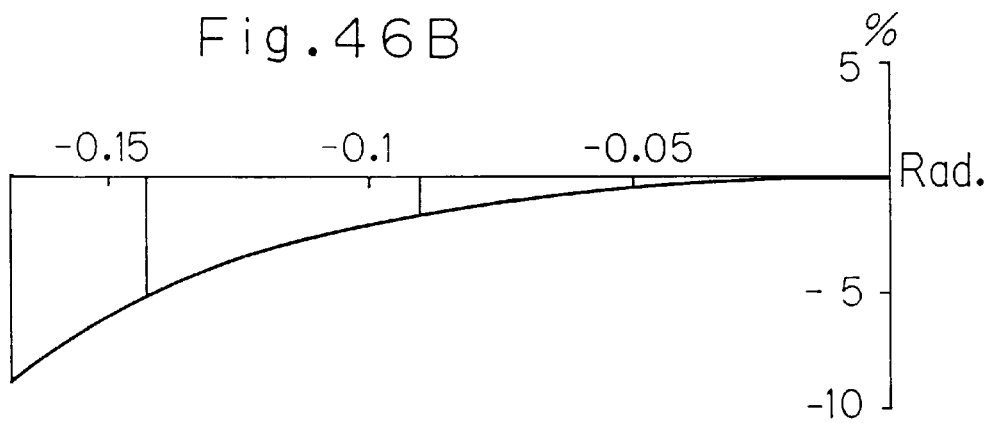
Figure 46C:
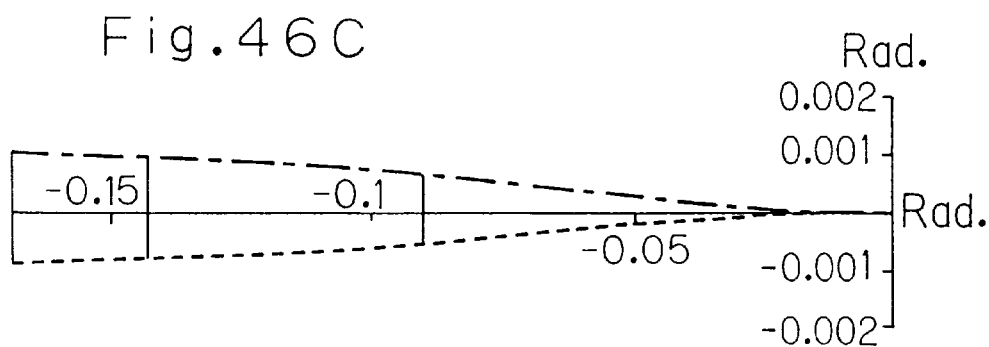
Figure 47A:
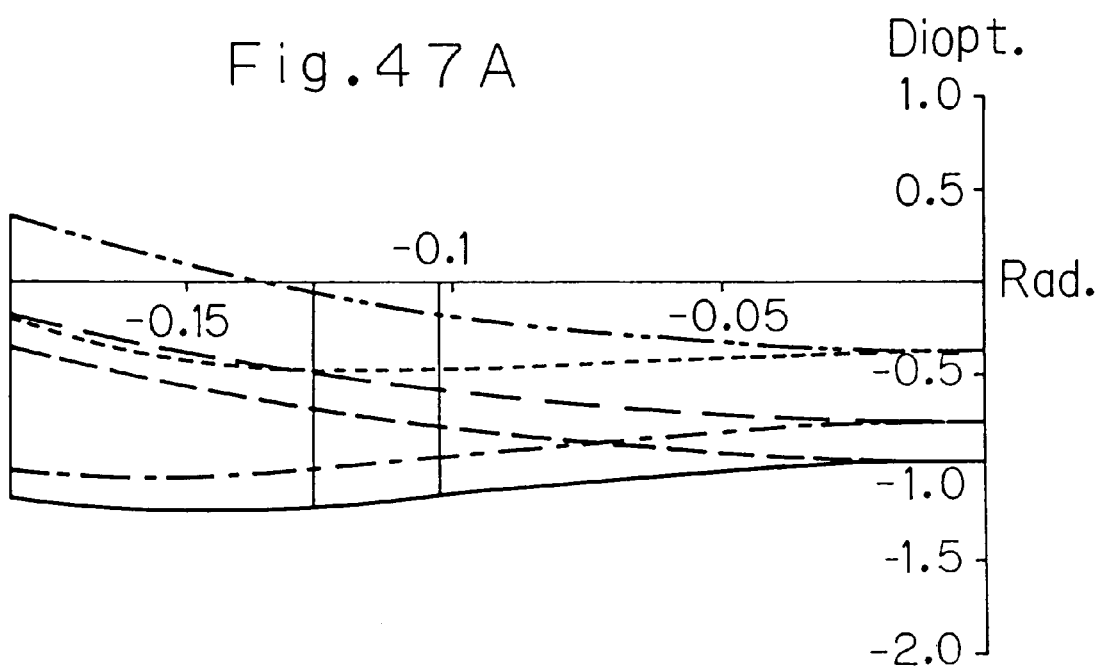
FIGS. 47A to 47C are aberration diagrams showing the aberration observed at the telephoto end of the thirteenth embodiment.
Figure 47B:
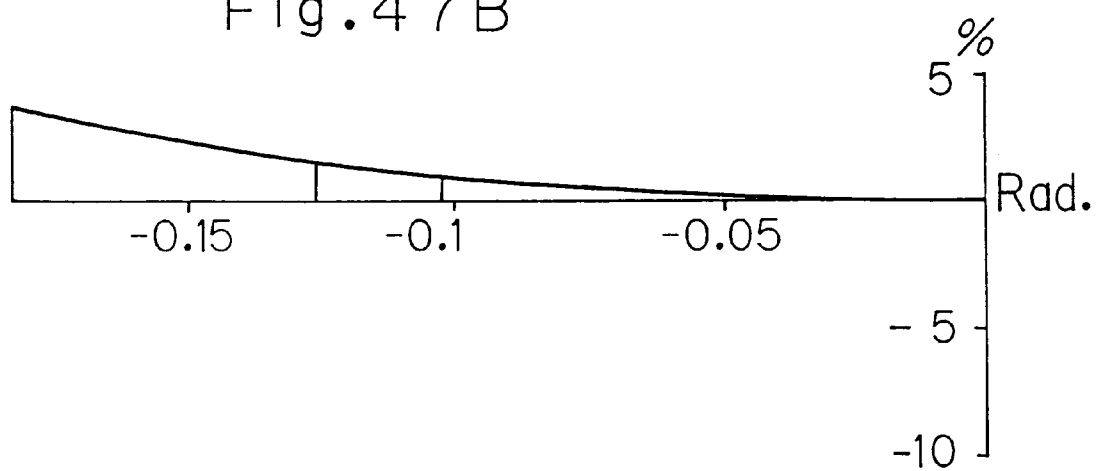
Figure 47C:
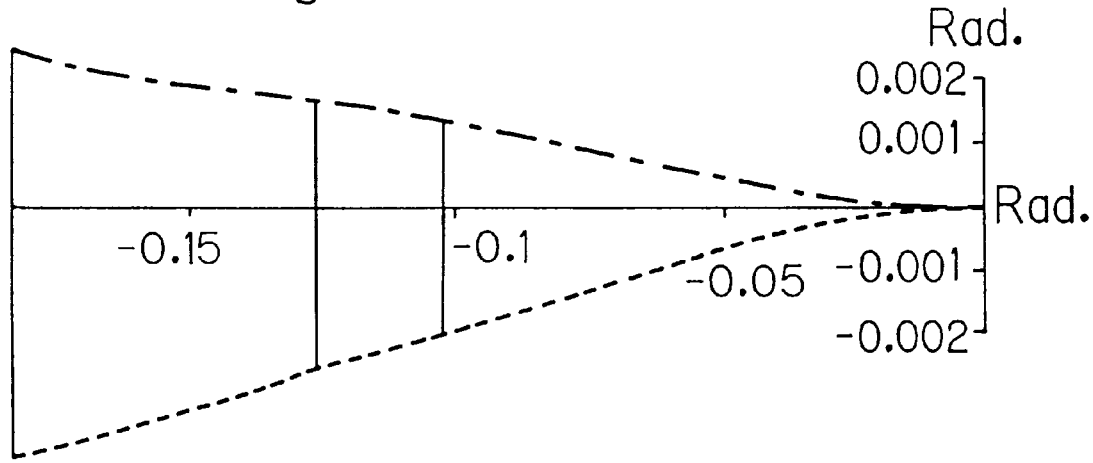
Figure 48A:
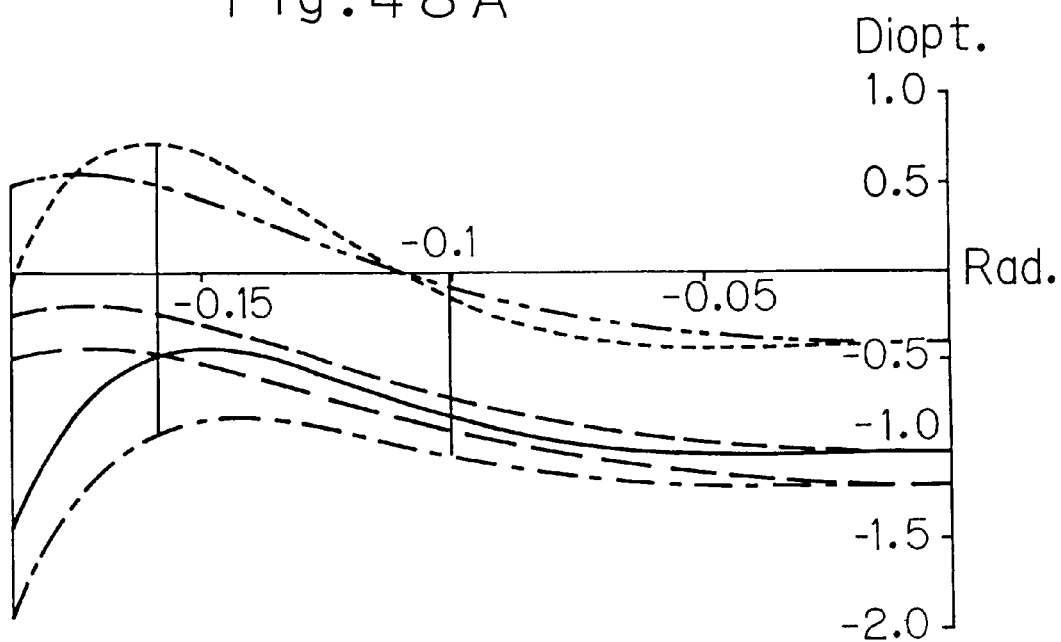
FIGS. 48A to 48C are aberration diagrams showing the aberration observed at the wide-angle end of the fourteenth embodiment.
Figure 48B:
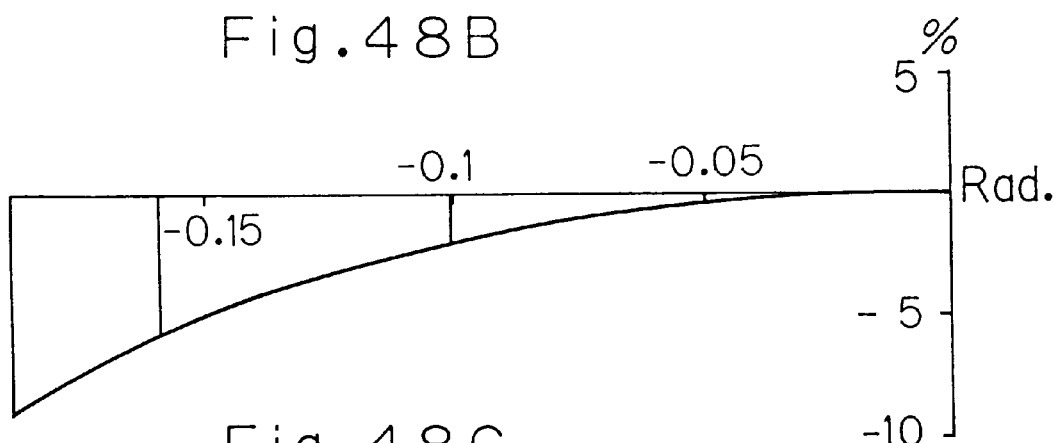
Figure 48C:
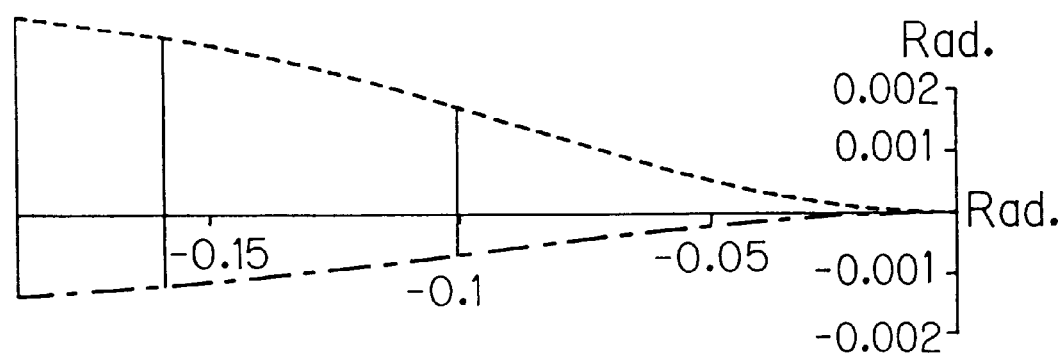
Figure 49A:
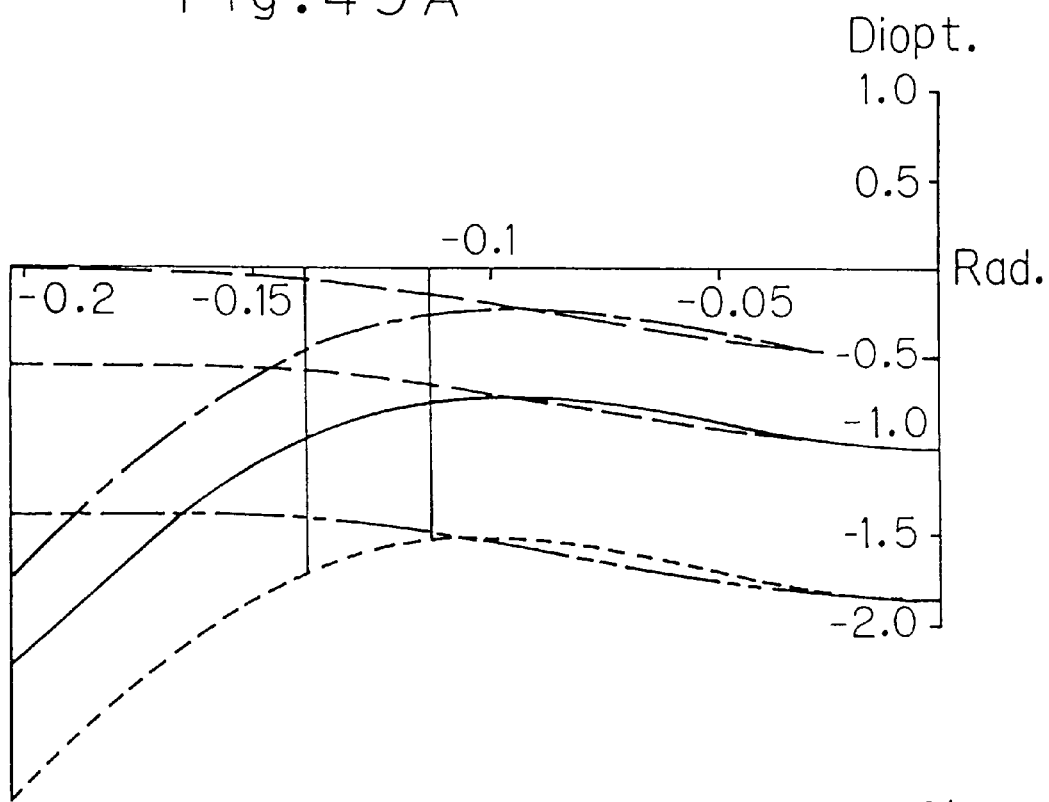
FIGS. 49A to 49C are aberration diagrams showing the aberration observed at the telephoto end of the fourteenth embodiment.
Figure 49B:
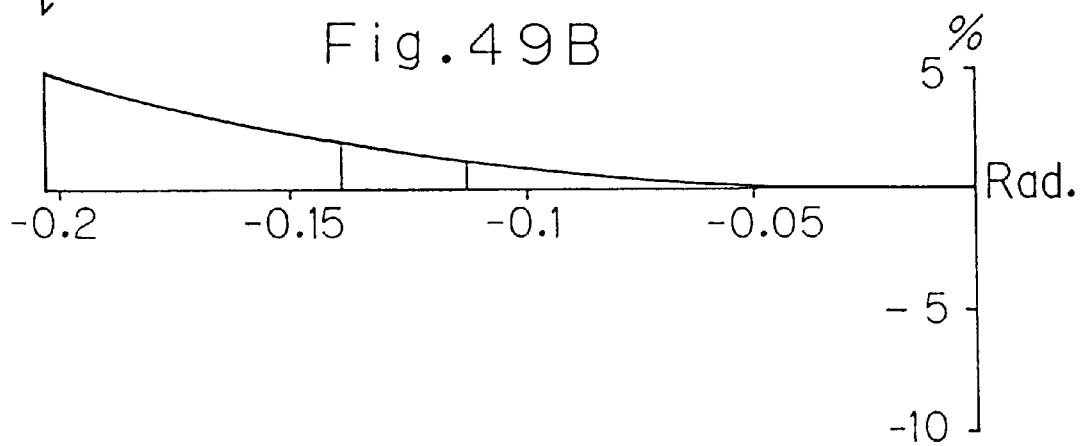
Figure 49C:
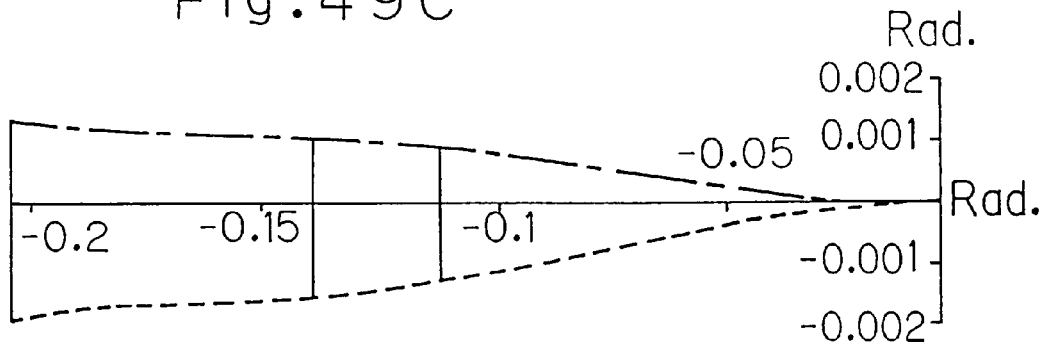
Figure 50A:
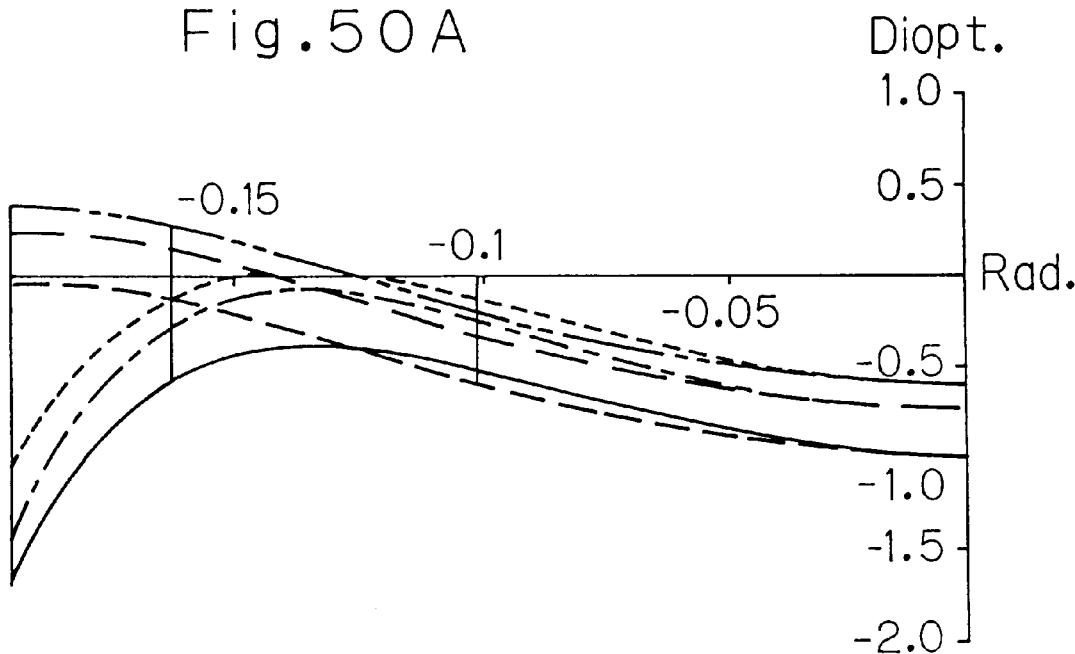
FIGS. 50A to 50C are aberration diagrams showing the aberration observed at the wide-angle end of the fifteenth embodiment.
Figure 50B:
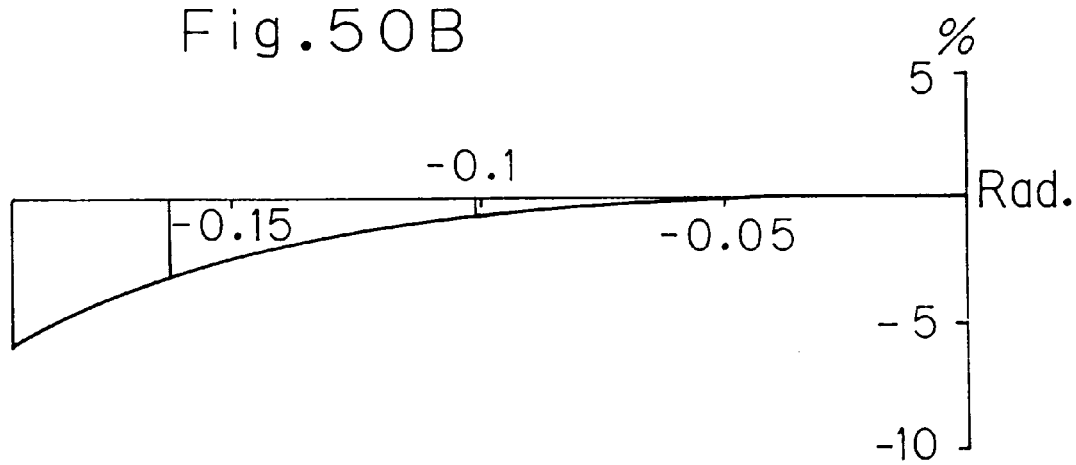
Figure 50C:
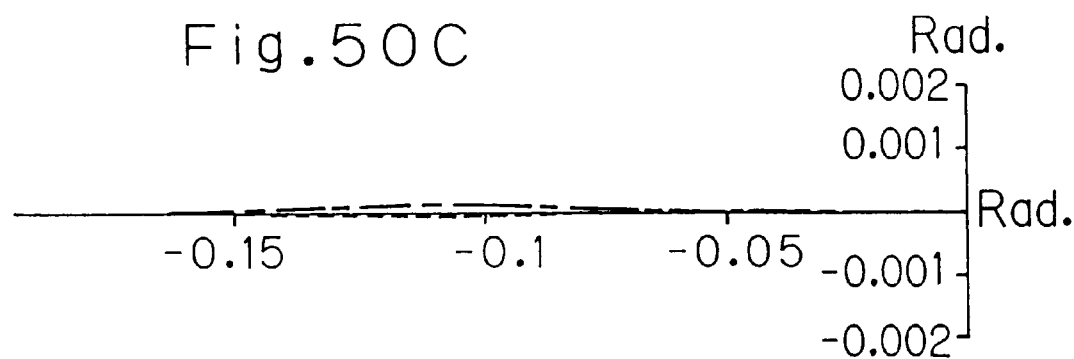

FIGS. 44A to 44C are aberration diagrams showing the aberration observed at the wide-angle end of the twelfth embodiment; FIGS. 45A to 45C are aberration diagrams showing the aberration observed at the telephoto end of the twelfth embodiment. FIGS. 46A to 46C are aberration diagrams showing the aberration observed at the wide-angle end of the thirteenth embodiment; FIGS. 47A to 47C are aberration diagrams showing the aberration observed at the telephoto end of the thirteenth embodiment. FIGS. 48A to 48C are aberration diagrams showing the aberration observed at the wide-angle end of the fourteenth embodiment; FIGS. 49A to 49C are aberration diagrams showing the aberration observed at the telephoto end of the fourteenth embodiment. FIGS. 50A to 50C are aberration diagrams showing the aberration observed at the wide-angle end of the fifteenth embodiment; FIGS. 51A to 51C are aberration diagrams showing the aberration observed at the telephoto end of the fifteenth embodiment.

Of these aberration diagrams, FIGS. 44A to 51A show astigmatism, FIGS. 44B to 51B show distortion, and FIGS. 44C to 51C show lateral chromatic aberration. In all of these aberration diagrams, the object distance is assumed to be 3 m. In these aberration diagrams, aberration for light of different wavelengths (design wavelengths: e-lines, c-lines, and g-lines) is plotted with different types of line. For astigmatism, the dioptric power (in diopters) is taken along the vertical axis; for distortion, the percentage of distortion is taken along the vertical axis; for lateral chromatic aberration, the angle with respect to the optical axis (in radians) is taken along the vertical axis. For all types of aberration, the angle of incidence (in radians) on the entrance pupil plane is taken along the horizontal axis.

For the twelfth to fifteenth embodiments, as seen from their construction data, the aberration occurring on the diffracting optical surfaces is evaluated by the use of the Sweatt model. The Sweatt model refers to a method of performing optical calculations on diffracting optical surfaces in a simplified way. According to the Sweatt model, calculations on diffracting optical surfaces can be performed in a similar way as ordinary calculations in geometrical optics, simply by using an extremely large index of refraction in relation to a given wavelength. Here, each type of aberration is calculated on the assumption that the index of refraction for e-lines is 1001.00000.

From these aberration diagrams, it would be understood that, in all of the twelfth to fifteenth embodiments, well-balanced correction of chromatic aberration is achieved over the entire range from the wide-angle end to the telephoto end. In particular, it should be noted that, in the fifteenth embodiment where both the first and third lens units g1 and g3 are provided with a diffracting optical surface [DOE], lateral chromatic aberration is corrected to an exceptional degree.

In the twelfth embodiment, a three-unit zoom lens system is used as the objective lens tg, and its third lens unit, which is moved to achieve zooming, is composed of a single lens. Accordingly, the objective lens tg greatly contributes to the reduction of the size and weight of the zoom viewfinder optical system. In the thirteenth and fifteenth embodiments, a fourth lens unit g4 having positive power is additionally provided. This increases the number of lens surfaces, and thus contributes to the improvement of aberration characteristics. In the fourteenth embodiment, a fourth lens unit g4 having negative power is additionally provided. The negative power of the fourth lens unit g4 contributes to the improvement of the imaging performance.

FIGS. 52A to 52D are enlarged cross-sectional views of examples of diffracting optical surfaces as used in the embodiments of the present invention. In the example in FIG. 52A, a diffracting optical surface is composed by forming a resin layer 2 having a saw-toothed cross section on a glass substrate 1 having a predetermined curvature. In the example in FIG. 52B, which is a modified type of the example in FIG. 52A, a diffracting optical surface is composed by forming a resin layer 2' having a step-like cross section on a glass substrate 1 having a predetermined curvature. Of course, the pitch of the pattern formed by these resin layers is determined in accordance with the optical power of diffraction required on those surfaces.

Figure 52A:
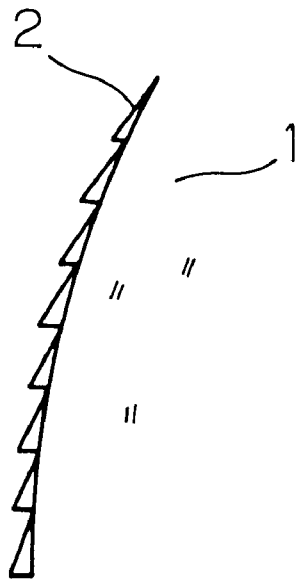
FIGS. 52A to 52D are enlarged cross-sectional views of examples of diffracting optical surfaces as used in the embodiments of the present invention.
Figure 52B:
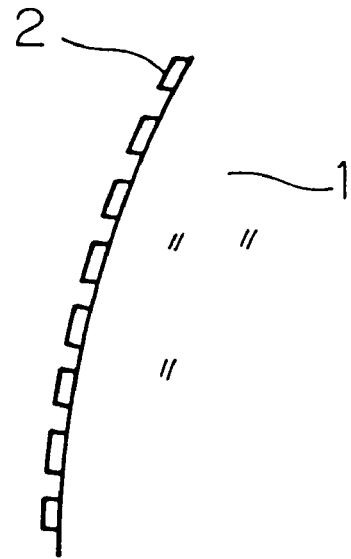

In the examples in FIGS. 52A and 52B, there exists a border surface between the resin layer 2 or 2' and the glass substrate 1. However, by making the index of refraction of the resin layer 2 or 2' substantially the same as that of the glass substrate 1, the existence of the border surface can be ignored from the optical viewpoint. Even then, although the border surface between the resin layer 2 or 2' and the glass substrate 1 is optically non-existent, a light ray incident on this optically functioning surface is affected both by the optical power of diffraction resulting from the saw-toothed shape of the resin layer and by the optical power of refraction resulting from the curvature that the surface as a whole has. Accordingly, even if this optically functioning surface has only one surface physically, this surface is regarded, from the optical viewpoint, as having optical power of both diffraction and refraction.

In the diffracting optical surfaces in FIGS. 52A and 52B, the resin layer 2 or 2' can be produced by first applying optical resin to the surface of the glass substrate 1, and then either molding it with a mold prepared beforehand or cutting the optical resin layer directly with a laser beam or the like.

Figure 52C:
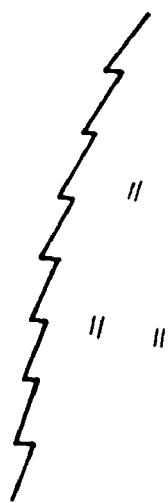
Figure 52D:
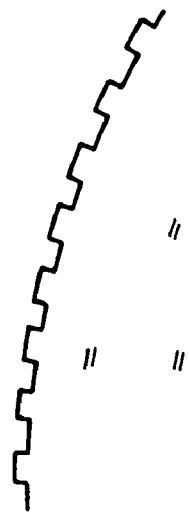

FIGS. 52C and 52D show further examples of diffracting optical surfaces, corresponding to the examples in FIGS.

52A and 52B, respectively. In the examples in FIGS. 52C and 52D, the saw-toothed or step-like portion that exerts optical power of diffraction and the portion corresponding to the glass substrate of the first two examples are formed as one seamless optical element offering an optically functioning surface.

The examples in FIGS. 52C and 52D, unlike those in FIGS. 52A and 52B, do not have any smooth surface as is found in normal lenses exerting optical power of refraction. However, also here, even if this optically functioning surface has only one surface physically, this surface is regarded, from the optical viewpoint, as having optical power of both diffraction and refraction.

The diffracting optical surfaces in FIGS. 52C and 52D can be produced, for example, by molding resin or the like with a mold prepared beforehand.

TABLE 1

|      | h1 | h2 | h3 | h1Σ | h2Σ | h3Σ |
|------|----|----|----|-----|-----|-----|
| Sign | Positive | 0 | Negative | Positive | Positive | 0 |

TABLE 2

<< Embodiment 1 >>

| Surface | Curvature of Radius | Axial Distance | Index of Refraction | Abbe Number |
|---------|---------------------|----------------|---------------------|-------------|
| S0 | r0 = ∞ | | | (Focal Plane) |
| | | d0 = 47.128 | | |
| S1 | r1 = 6.406 | | | |
| | | d1 = 2.715 | N1 = 1.71300 | ν1 = 53.93 ... G1 |
| S2[DOE] | r2 = −31.982 | | | |
| | | d2 = 0.635 | | |
| S3 | r3 = −12.377 | | | |
| | | d3 = 1.000 | N2 = 1.5834 | ν2 = 30.23 ... G2 |
| S4 | r4 = 5.041 | | | |
| | | d4 = 5.034 | | |
| S5 | r5 = 16.969 | | | |
| | | d5 = 2.500 | N3 = 1.70055 | ν3 = 27.58 ... G3 |
| S6 | r6 = −20.130 | | | |
| | | d6 = 20.619 | | |
| S7 | r7 = 1625.620 | | | |
| | | d7 = 5.670 | N4 = 1.5834 | ν4 = 30.23 ... G4 |
| S8* | r8 = −12.649 | | | |
| | | d8 = 10.883 | | |
| S9 | r9 = 485.576 | | | |
| | | d9 = 1.000 | N5 = 1.83350 | ν5 = 21.00 ... G5 |
| S10 | r10 = 34.583 | | | |
| | | d10 = 3.243 | | |
| S11 | r11 = 25.757 | | | |
| | | d11 = 3.700 | N6 = 1.71300 | ν6 = 53.93 ... G6 |
| S12 | r12 = −40.361 | | | |
| | | d12 = 15.000 | | |
| S13 | r13 = ∞ | | | (Pupil E) |

<Aspherical Coefficients>

| [Surface] | [K] | [A4] | [A6] | [A8] | [A10] |
|-----------|-----|------|------|------|-------|
| S8 | −6.39 × 10$^{-1}$ | 3.26 × 10$^{-5}$ | −8.54 × 10$^{-7}$ | 7.50 × 10$^{-9}$ | −2.19 × 10$^{-11}$ |

<Phase Function Coefficients of the Diffracting Optical Surface>

| [Surface] | [C1] | [C2] | [C3] | [C4] |
|-----------|------|------|------|------|
| S2 | −3.86 × 10$^{-3}$ | 2.21 × 10$^{-4}$ | −1.27 × 10$^{-5}$ | 4.12 × 10$^{-7}$ |

TABLE 2

<< Embodiment 1 >>

| Surface | Curvature of Radius | Axial Distance | Index of Refraction | Abbe Number |
|---------|---------------------|----------------|---------------------|-------------|
| S0 | r0 = ∞ | | | (Focal Plane) |
| | | d0 = 47.128 | | |
| S1 | r1 = 6.406 | | | |
| | | d1 = 2.715 | N1 = 1.71300 | ν1 = 53.93 ... G1 |
| S2 [DOE] | r2 = −31.982 | | | |
| | | d2 = 0.635 | | |
| S3 | r3 = −12.377 | | | |
| | | d3 = 1.000 | N2 = 1.5834 | ν2 = 30.23 ... G2 |
| S4 | r4 = 5.041 | | | |
| | | d4 = 5.034 | | |
| S5 | r5 = 16.969 | | | |
| | | d5 = 2.500 | N3 = 1.70055 | ν3 = 27.58 ... G3 |

TABLE 2-continued

| | | | | | |
|---|---|---|---|---|---|
| S6 | r6 = −20.130 | | | | |
| | | d6 = 20.619 | | | |
| S7 | r7 = 1625.620 | | | | |
| | | d7 = 5.670 | N4 = 1.5834 | ν4 = 30.23 | . . . G4 |
| S8* | r8 = −12.649 | | | | |
| | | d8 = 10.883 | | | |
| S9 | r9 = 485.576 | | | | |
| | | d9 = 1.000 | N5 = 1.83350 | ν5 = 21.00 | . . . G5 |
| S10 | r10 = 34.583 | | | | |
| | | d10 = 3.243 | | | |
| S11 | r11 = 25.757 | | | | |
| | | d11 = 3.700 | N6 = 1.71300 | ν6 = 53.93 | . . . G6 |
| S12 | r12 = −40.361 | | | | |
| | | d12 = 15.000 | | | |
| S13 | r13 = ∞ | | | (Pupil E) | |

<Aspherical Coefficients>

| [Surface] | [K] | [A4] | [A6] | [A8] | [A10] |
|---|---|---|---|---|---|
| S8 | $-6.39 \times 10^{-1}$ | $3.26 \times 10^{-5}$ | $-8.54 \times 10^{-7}$ | $7.50 \times 10^{-9}$ | $-2.19 \times 10^{-11}$ |

<Phase Function Coefficients of the Diffracting Optical Surface>

| [Surface] | [C1] | [C2] | [C3] | [C4] |
|---|---|---|---|---|
| S2 | $-3.86 \times 10^{-3}$ | $2.21 \times 10^{-4}$ | $-1.27 \times 10^{-5}$ | $4.12 \times 10^{-7}$ |

TABLE 4

| | Embodiment 1 | Embodiment 2 |
|---|---|---|
| φd | 0.00773 | 0.00819 |
| φt | 0.0635 | 0.0645 |
| φd/φt | 0.122 | 0.127 |

TABLE 5

<< Embodiment 3 (Objective Optical System + Eyepiece Optical System) >>
β = 0.44~1.04

| Surface | Curvature of Radius | Axial Distance | Index of Refraction | Abbe Number |
|---|---|---|---|---|
| S1* | r1 = −23.205 | | | |
| | | d1 = 1.000 | N1 = 1.49329 | ν1 = 57.82 |
| S2* [DOE:−] | r2 = 15.33486 | | | |
| | | d2 = 12.12~0.48 | | |
| S3* [DOE:+] | r3 = 22.23492 | | | |
| | | d3 = 2.800 | N2 = 1.49329 | ν2 = 57.82 |
| S4 | r4 = −7.75600 | | | |
| | | d4 = 0.00~8.57 | | |
| S5 | r5 = 40.000 | | | |
| | | d5 = 16.000 | N3 = 1.58752 | ν3 = 30.36 |

TABLE 5-continued

| | | | | |
|---|---|---|---|---|
| S6 | r6 = ∞ | | | |
| | | d6 = 3.000 | | |
| S7 | r7 = 17.489 | | | |
| | | d7 = 12.300 | N4 = 1.58752 | ν4 = 30.36 |
| S8* | r8 = ∞ | | | |
| | | d8 = 8.980 | | |
| S9 | r9 = 28.573 | | | |
| | | d9 = 3.000 | N5 = 1.49329 | ν5 = 57.82 |
| S10 | r10 = −12.619 | | | |

<Aspherical Coefficients>

S1: $\epsilon = 1.00$, $A4 = -6.23 \times 10^{-4}$, $A6 = -2.41 \times 10^{-6}$
S2: $\epsilon = 1.00$, $A4 = -7.00 \times 10^{-4}$, $A6 = 2.80 \times 10^{-6}$
S3: $\epsilon = 1.00$, $A4 = -5.13 \times 10^{-4}$, $A6 = 1.00 \times 10^{-6}$
S8: $\epsilon = 1.00$, $A4 = -1.05 \times 10^{-4}$, $A6 = 2.00 \times 10^{-7}$ <Phase Function Coefficients of the Diffracting Optical Surfaces>

S2: $C1 = 3.90 \times 10^{-3}$
S3: $C1 = -1.54 \times 10^{-3}$

<Values Corresponding to Condition (1) and Related Data>

Eφk = −0.0047, φo = 0.125~0.053
Eφk/φo = −0.038~−0.089

TABLE 6

<< Embodiment 4 (Eyepiece Optical System) >>
fe = 70.4
Dioptric Power = −3.1~−1.0~+1.1 (diopter)

| Surface | Curvature of Radius | Axial Distance | Index of Refraction | Abbe Number |
|---|---|---|---|---|
|  | r0 = ∞ |  |  | {Pupil he} |
|  |  | d0 = 22.550 |  |  |
| S1 | r1 = ∞ |  |  |  |
|  |  | d1 = 0.850 | N1 = 1.51680 | ν1 = 64.12 |
| S2 | r2 = ∞ |  |  |  |
|  |  | d2 = 5.5~3.2~0.9 |  |  |
| S3 | r3 = 35.965 |  |  |  |
|  |  | d3 = 5.600 | N2 = 1.49329 | ν2 = 57.82 |
| S4*[DOE:+] | r4 = −3469.450 |  |  |  |
|  |  | d4 = 0.4~2.7~5.0 |  |  |
| S5[DOE:−] | r5 = ∞ |  |  |  |
|  |  | d5 = 81.627 | N3 = 1.51680 | ν3 = 64.12 |
| S6 | r6 = ∞ |  |  |  |
|  |  | d6 = 2.568 |  |  |
|  | r7 = ∞ |  |  | {Object Plane ob} |

<Aspherical Coefficients>

S4: ε = 1.00, A4 = 6.13 × $10^{-6}$

<Phase Function Coefficients of the Diffracting Optical Surfaces>

S4: C1 = −8.60 × $10^{-3}$
S5: C1 = 9.20 × $10^{-3}$

<Values Corresponding to Condition (2) and Related Data>

Σφk = −0.0012, φe = 0.013~0.016
Σφk/e = −0.093~−0.078

TABLE 7

<< Example for Comparison (Eyepiece Optical System >>
fe = 70.4
Dioptric Power = −2.51~−1.0~+0.47 (diopter)

| Surface | Curvature of Radius | Axial Distance | Index of Refraction | Abbe Number |
|---|---|---|---|---|
|  | r0 = ∞ |  |  | {Pupil he} |
|  |  | d0 = 22.550 |  |  |
| S1 | r1 = ∞ |  |  |  |
|  |  | d1 = 0.850 | N1 = 1.51680 | ν1 = 64.12 |
| S2 | r2 = ∞ |  |  |  |
|  |  | d2 = 3.4~1.9~0.4 |  |  |
| S3 | r3 = 51.855 |  |  |  |
|  |  | d3 = 5.600 | N2 = 1.49329 | ν2 = 57.82 |
| S4* | r4 = −21.614 |  |  |  |
|  |  | d4 = 0.4~1.9~3.4 |  |  |
| S5 | r5 = −40 |  |  |  |
|  |  | d5 = 1 | N3 = i.70605 | ν3 = 30.ii |
| S6 | r6 = 467.312 |  |  |  |
|  |  | d6 = 0.7 |  |  |
| S7 | r7 = ∞ |  |  |  |
|  |  | d7 = 81.627 | N4 = 1.51680 | ν4 = 64.12 |
| S8 | r8 = ∞ |  |  |  |
|  |  | d8 = 3.0 |  |  |
|  | r9 = ∞ |  |  | {Object Plane ob} |

<Aspherical Coefficients>

S4: E = −0.4, Ai = 0

TABLE 8

<< Embodiment 5 >>
β = 0.5~1.0

| Surface | Curvature of Radius | Axial Distance | Index of Refraction | Abbe Number |
|---|---|---|---|---|
| S1 | r1 = −12.684 | | | |
| | | d1 = 1.500 | N1 = 1.49329 | ν1 = 57.82 . . . g1 |
| S2 | r2 = 45.187 | | | |
| | | d2 = 11.86#1.88 | | |
| S3 | r3 = 18.140 | | | |
| | | d3 = 3.500 | N2 = 1.49329 | ν2 = 57.82 . . . g2 |
| S4* | r4 = −11.01818 | | | |
| | | d4 = 0.000 | N3 = 10001.00000 | ν3 = −3.45 |
| S5[DOE]* | r5 = −11.0181494 | | | |
| | | d5 = 20.8~30.63 | | |
| S6 | r6 = 15.391 | | | |
| | | d6 = 3.000 | N4 = 1.49329 | ν4 = 57.82 . . . co |
| S7 | r7 = ∞ | | | |
| | | d7 = 2.200 | | |
| S8 | r8 = ∞ | | | |
| | | d8 = 40.640 | N5 = 1.81264 | ν5 = 25.5 . . . p |
| S9 | r9 = ∞ | | | |
| | | d9 = 1.000 | | |
| S10* | r10 = 29.153 | | | |
| | | d10 = 2.300 | N6 = 1.49329 | ν6 = 57.82 . . . se |
| S11 | r11 = −24.209 | | | |

<Aspherical Coefficients>

S4: $\epsilon = 1.00$, $A4 = 1.65 \times 10^{-4}$, $A6 = 1.46 \times 10^{-6}$, $A8 = 5.76 \times 10^{-9}$
S5: $\epsilon = 1.00$, $A4 = 1.65 \times 10^{-4}$, $A6 = 1.46 \times 10^{-6}$, $A8 = 5.76 \times 10^{-9}$
S10: $\epsilon = -6.2$ <Values Corresponding to Condition (1) and Related Data>

$\phi N = -0.0502$, $\phi P = 0.0714$, $\phi PD = 0.0025$,
$\phi N \cdot \phi PD / \phi P = -0.0018$

TABLE 9

<< Embodiment 6 >>
β = 0.36~0.64

| Surface | Curvature of Radius | Axial Distance | Index of Refraction | Abbe Number |
|---|---|---|---|---|
| S1 | r1 = −42.640 | | | |
| | | d1 = 1.000 | N1 = 1.58752 | ν1 = 30.36 . . . g1 |
| S2* | r2 = 4.346 | | | |
| | | d2 = 7.69~3.79 | | |
| S3* | r3 = 6.561 | | | |
| | | d3 = 3.000 | N2 = 1.49329 | ν2 = 57.82 . . . g2 |
| S4 | r4 = −5.71190 | | | |
| | | d4 = 0.000 | N3 = 10001.00000 | ν3 = −3.45 |
| S5[DOE] | r5 = −5.7118961 | | | |
| | | d5 = 1.0~4.86 | | |
| S6 | r6 = 20.707 | | | |
| | | d6 = 1.000 | N4 = 1.58752 | ν4 = 30.36 . . . g3 |
| S7* | r7 = 6.649 | | | |
| | | d7 = 13.620 | | |
| S8 | r8 = 12.487 | | | |
| | | d8 = 3.000 | N5 = 1.49329 | ν5 = 57.82 . . . co |
| S9 | r9 = −18.732 | | | |
| | | d9 = 1.000 | | |
| S10 | r10 = ∞ | | | |
| | | d10 = 32.500 | N6 = 1.49329 | ν6 = 57.82 . . . p |
| S11 | r11 = ∞ | | | |
| | | d11 = 1.500 | | |
| S12* | r12 = 17.239 | | | |
| | | d12 = 2.000 | N7 = 1.49329 | ν7 = 57.82 . . . se |
| S13 | r13 = −35.124 | | | |

<Aspherical Coefficients>

S2: $\epsilon = 1.00$, $A4 = -1.41 \times 10^{-3}$, $A6 = 1.66 \times 10^{-4}$
S3: $\epsilon = 1.00$, $A4 = -2.01 \times 10^{-3}$, $A6 = 1.13 \times 10^{-5}$
S7: $\epsilon = 1.00$, $A4 = 9.13 \times 10^{-4}$, $A6 = 2.55 \times 10^{-5}$
S12: $\epsilon = 1.00$, $A4 = -9.01 \times 10^{-5}$, $A6 = 3.38 \times 10^{-6}$ TABLE 9-continued <Values Corresponding to Condition (1) and Related Data>

φN = −0.1501, φP = 0.1503, φPD = 0.0021,
φN · φPD/φP = −0.0021

TABLE 10

<< Embodiment 7 >>
β = 0.44~1.00

| Surface | Curvature of Radius | Axial Distance | Index of Refraction | Abbe Number |
|---|---|---|---|---|
| S1* | r1 = −19.349 | | | |
| | | d1 = 1.000 | N1 = 1.58752 | ν1 = 30.36 . . . g1 |
| S2* | r2 = 18.574 | | | |
| | | d2 = 12.12~1.92 | | |
| S3* | r3 = 11.358 | | | |
| | | d3 = 2.800 | N2 = 1.49329 | ν2 = 57.82 . . . g2 |
| S4 | r4 = −10.24746 | | | |
| | | d4 = 0.000 | N3 = 10001.00000 | ν3 = −3.45 |
| S5[DOE] | r5 = −10.2474392 | | | |
| | | d5 = 0.78~9.34 | | |
| S6 | r6 = 40.000 | | | |
| | | d6 = 16.000 | N4 = 1.58752 | ν4 = 30.36 . . . g3 |
| S7 | r7 = ∞ | | | |
| | | d7 = 3.000 | | |
| S8 | r8 = 17.489 | | | |
| | | d8 = 12.300 | N5 = 1.58752 | ν5 = 30.36 . . . p |
| S9 | r9 = ∞ | | | |
| | | d9 = 8.980 | | |
| S10* | r10 = 19.205 | | | |
| | | d10 = 3.000 | N6 = 1.49329 | ν6 = 57.82 . . . se |
| S11 | r11 = −15.959 | | | |

<Aspherical Coefficients>

S1: $\epsilon = 1.00$, $A4 = -6.23 \times 10^{-4}$, $A6 = -2.40 \times 10^{-6}$
S2: $\epsilon = 1.00$, $A4 = -7.00 \times 10^{-4}$, $A6 = 2.80 \times 10^{-6}$
S3: $\epsilon = 1.00$, $A4 = -5.13 \times 10^{-4}$, $A6 = 1.00 \times 10^{-6}$
S10: $\epsilon = 1.00$, $A4 = -1.05 \times 10^{-4}$, $A6 = 2.00 \times 10^{-7}$ <Values Corresponding to Condition (1) and Related Data>

φN = −0.0626, φP = 0.09, φPD = 0.0026,
φN · φPD/φP = −0.0018

TABLE 11

<< Embodiment 8 >>
β = 0.46~1.10

| Surface | Curvature of Radius | Axial Distance | Index of Refraction | Abbe Number |
|---|---|---|---|---|
| S1* | r1 = 2680.750 | | | |
| | | d1 = 1.000 | N1 = 1.49329 | ν1 = 57.82 . . . g4 |
| S2* | r2 = 10.665 | | | |
| | | d2 = 12.12~0.47 | | |
| S3[DOE]* | r3 = 10.1832442 | | | |
| | | d3 = 0.000 | N2 = 10001.00000 | ν2 = −3.45 |
| 54* | r4 = 10.18327 | | | |
| | | d4 = 2.800 | N3 = 1.49329 | ν3 = 57.82 . . . g2 |
| S5 | r5 = −1i.376 | | | |
| | | d5 = 0.00~8.57 | | |
| S6 | r6 = 40.000 | | | |
| | | d6 = 16.000 | N4 = 1.58752 | ν4 = 30.36 . . . g3 |
| S7 | r7 = ∞ | | | |
| | | d7 = 3.000 | | |
| S8 | r8 = 17.489 | | | |
| | | d8 = 12.300 | N5 = 1.58752 | ν5 = 30.36 . . . p |
| S9 | r9 = ∞ | | | |
| | | d9 = 8.980 | | |
| S10* | r10 = 19.598 | | | |
| | | d10 = 3.000 | N6 = 1.49329 | ν6 = 57.82 . . . se |
| S11 | r11 = −15.701 | | | |

TABLE 11-continued

<Aspherical Coefficients>

S1: $\epsilon = 1.00$, A4 = $-6.23 \times 10^{-4}$, A6 = $-2.41 \times 10^{-6}$
S2: $\epsilon = 1.00$, A4 = $-7.00 \times 10^{-4}$, A6 = $2.80 \times 10^{-6}$
S3: $\epsilon = 1.00$, A4 = $-5.13 \times 10^{-4}$, A6 = $1.00 \times 10^{-6}$
S4: $\epsilon = 1.00$, A4 = $-1.05 \times 10^{-4}$, A6 = $2.00 \times 10^{-7}$
S10: $\epsilon = 1.00$, A4 = $-1.05 \times 10^{-4}$, A6 = $2.00 \times 10^{-7}$
<Values Corresponding to Condition (1) and Related Data>

$\phi N = -0.0549$, $\phi P = 0.09$, $\phi PD = 0.0023$,
$\phi N \cdot \phi PD/\phi P = -0.0014$

TABLE 12

<< Embodiment 9 >>
$\beta = 0.44\sim1.04$

| Surface | Curvature of Radius | Axial Distance | Index of Refraction | Abbe Number |
|---|---|---|---|---|
| S1* | r1 = −23.205 | | | |
| | | d1 = 1.000 | N1 = 1.49329 | ν1 = 57.82 . . . g1 |
| S2* | r2 = 15.33486 | | | |
| | | d2 = 0.000 | N2 = 10001.00000 | ν2 = −3.45 |
| S3[DOE]* | r3 = 15.3346764 | | | |
| | | d3 = 12.12~0.48 | | |
| S4[DOE]* | r4 = 22.2347675 | | | |
| | | d4 = 0.000 | N3 = 10001.00000 | ν3 = −3.45 |
| S5* | r5 = 22.23492 | | | |
| | | d5 = 2.800 | N4 = 1.49329 | ν4 = 57.82 . . . g2 |
| S6 | r6 = −7.75600 | | | |
| | | d6 = 0.00~8.57 | | |
| S7 | r7 = 40.000 | | | |
| | | d7 = 16.000 | N5 = 1.58752 | ν5 = 30.36 . . . g3 |
| S8 | r8 = ∞ | | | |
| | | d8 = 3.000 | | |
| S9 | r9 = 17.489 | | | |
| | | d9 = 12.300 | N6 = 1.58752 | ν6 = 30.36 . . . p |
| S10* | r10 = ∞ | | | |
| | | d10 = 8.980 | | |
| S11 | r11 = 28.573 | | | |
| | | d11 = 3.000 | N7 = 1.49329 | ν7 = 57.82 . . . se |
| S12 | r12 = −12.619 | | | |

<Aspherical Coefficients>

S1: $\epsilon = 1.00$, A4 = $-6.23 \times 10^{-4}$, A6 = $-2.41 \times 10^{-6}$
S2: $\epsilon = 1.00$, A4 = $-7.00 \times 10^{-4}$, A6 = $2.80 \times 10^{-6}$
S3: $\epsilon = 1.00$, A4 = $-7.00 \times 10^{-4}$, A6 = $2.80 \times 10^{-6}$
S4: $\epsilon = 1.00$, A4 = $-5.13 \times 10^{-4}$, A6 = $1.00 \times 10^{-6}$
S5: $\epsilon = 1.00$, A4 = $-5.13 \times 10^{-4}$, A6 = $1.00 \times 10^{-6}$
S10: $\epsilon = 1.00$, A4 = $-1.05 \times 10^{-4}$, A6 = $2.00 \times 10^{-7}$
<Values Corresponding to Condition (1) and Related Data>

$\phi N = -0.057$, $\phi P = 0.09$, $\phi PD = 0.0078$,
$\phi N \cdot \phi PD/\phi P = -0.0049$

TABLE 13

<< Embodiment 10 >>
$\beta = 0.4\sim1.3$

| Surface | Curvature of Radius | Axial Distance | Index of Refraction | Abbe Number |
|---|---|---|---|---|
| S1 | r1 = 17.945 | | | |
| | | d1 = 3.404 | N1 = 1.49329 | ν1 = 57.82 . . . g1 |
| S2* | r2 = −17.88834 | | | |
| | | d2 = 2.827~6.690~9.400 | | |
| S3 | r3 = −6.27090 | | | |
| | | d3 = 1.000 | N2 = 1.49329 | ν2 = 57.82 . . . g2 |
| S4*[DOE] | r4 = 3.67162 | | | |
| | | d4 = 8.105~0.988~0.466 | | |
| S5 | r5 = −35.0306 | | | |
| | | d5 = 1.000 | N3 = 1.58752 | ν3 = 30.36 . . . g3 |

TABLE 13-continued

| | | | | |
|---|---|---|---|---|
| S6 | r6 = 211.792 | | | |
| | | d6 = 0.100~3.354~1.165 | | |
| S7* | r7 = 6.869 | | | |
| | | d7 = 3.400 | N4 = 1.49329 | ν4 = 57.82 . . . g4 |
| S8* | r8 = −6.737 | | | |
| | | d8 = 0.778 | | |
| S9 | r9 = ∞ | | | |
| | | d9 = 15.500 | N5 = 1.57822 | ν5 = 33 . . . p1 |
| S10 | r10 = −25.034 | | | |
| | | d10 = 3.150 | | |
| S11 | r11 = ∞ | | | |
| | | d11 = 26.126 | N6 = 1.58752 | ν6 = 30.36 . . . p2 |
| S12 | r12 = ∞ | | | |
| | | d12 = 0.500 | | |
| S13 | r13 = 21.005 | | | |
| | | d13 = 2.000 | N7 = 1.49329 | ν7 = 57.82 . . . se |
| S14* | r14 = −15.010 | | | |

<Aspherical Coefficients>

S2: $\epsilon = -9.09$
S4: $\epsilon = -1.83$
S7: $\epsilon = -2.22$, $A6 = -8.92 \times 10^{-7}$
S8: $\epsilon = -0.44$
S14: $\epsilon = -2.00$, $A4 = -1.05 \times 10^{-4}$, $A6 = 2.00 \times 10^{-7}$ <Phase Function Coefficients of the Diffracting Optical Surfaces>

S4: $C1 = -8.50 \times 10^{-3}$

<Values Corresponding to Condition (1) and Related Data>

$\phi 2D = 0.017$, $\phi 2 = -0.2022$
$\phi 2D/\phi 2 = -0.08408$

TABLE 14

<< Embodiment 11 >>
$\beta = 0.4 \sim 1.3$

| Surface | Curvature of Radius | Axial Distance | Index of Refraction | Abbe Number |
|---|---|---|---|---|
| S1 | r1 = 30.338 | | | |
| | | d1 = 2.400 | N1 = 1.49329 | ν1 = 57.82 . . . g1 |
| S2* | r2 = −15.59587 | | | |
| | | d2 = 1.864~6.951~10.239 | | |
| S3 | r3 = −8.48433 | | | |
| | | d3 = 1.000 | N2 = 1.49329 | ν2 = 57.82 . . . g2 |
| S4* | r4 = 5.50995 | | | |
| | | d4 = 8.617~0.933~0.693 | | |
| S5 | r5 = −54.93613 | | | |
| | | d5 = 1.000 | N3 = 1.58752 | ν3 = 30.36 . . . g3 |
| S6[DOE] | r6 = 66.631 | | | |
| | | d6 = 0.551~3.348~0.100 | | |
| S7* | r7 = 8.078 | | | |
| | | d7 = 3.400 | N4 = 1.49329 | ν4 = 57.82 . . . g4 |
| S8* | r8 = −6.887 | | | |
| | | d8 = 0.778 | | |
| S9 | r9 = ∞ | | | |
| | | d9 = 15.500 | N5 = 1.57822 | ν5 = 33 . . . p1 |
| S10 | r10 = −25.034 | | | |
| | | d10 = 3.150 | | |
| S11 | r11 = ∞ | | | |
| | | d11 = 26.126 | N6 = 1.58752 | ν6 = 30.36 . . . p2 |
| S12 | r12 = ∞ | | | |
| | | d12 = 0.500 | | |
| S13 | r13 = 21.005 | | | |
| | | d13 = 2.000 | N7 = 1.49329 | ν7 = 57.82 . . . se |
| S14* | r14 = −15.010 | | | |

<Aspherical Coefficients>

S2: $\epsilon = -4.90$
S4: $\epsilon = -2.90$
S7: $\epsilon = -3.92$, $A6 = -9.14 \times 10^{-7}$
S8: $\epsilon = 0.17$
S14: $\epsilon = -2.00$, $A4 = -1.05 \times 10^{-4}$, $A6 = 2.00 \times 10^{-7}$ TABLE 14-continued <Phase Function Coefficients of the Diffracting Optical Surface>

S6: C1 = −1.35 × 10$^{-3}$
<Values Corresponding to Condition (2) and Related Data>

$\phi$3D = 0.00269, $\phi$3 = −0.01688
$\phi$3D/$\phi$3 = −0.15939

TABLE 15

<< Embodiment 12 >>
$\beta$ = 0.41~1.05

| Surface | Curvature of Radius | Axial Distance | Index of Refraction | Abbe Number |
|---|---|---|---|---|
| S1* | r1 = 22.596 | | | |
| | | d1 = 5.800 | N1 = 1.49329 | v1 = 57.82 . . . g1 |
| S2* | r2 = −20.037 | | | |
| | | d2 = 0.85~5.69 | | |
| S3 | r3 = −11.489 | | | |
| | | d3 = 1.500 | N2 = 1.49329 | v2 = 57.82 . . . g21 |
| S4* | r4 = 2.801 | | | |
| | | d4 = 1.120 | | |
| S5 | r5 = 4.439 | | | |
| | | d5 = 2.050 | N3 = 1.49329 | v3 = 57.82 . . . g22 |
| S6 | r6 = 11.813 | | | |
| | | d6 = 8.69~0.51 | | |
| S7 | r7 = 19.854 | | | |
| | | d7 = 3.880 | N4 = 1.49329 | v4 = 57.82 . . . g3 |
| S8* | r8 = −6.2141135 | | | |
| | | d8 = 0.000 | N5 = 10001.00000 | v5 = −3.45 |
| S9*[DOE] | r9 = −6.2140863 | | | |
| | | d9 = 14.54~17.88 | | |
| S10 | r10 = 10.246 | | | |
| | | d10 = 28.030 | N6 = 1.49329 | v6 = 57.82 . . . p |
| S11 | r11 = ∞ | | | |
| | | d11 = 0.200 | | |
| S12* | r12 = 20.983 | | | |
| | | d12 = 2.550 | N7 = 1.49329 | v7 = 57.82 . . . se |
| S13 | r13 = −18.172 | | | |

<Aspherical Coefficients>

S1: $\epsilon$ = −5.68, A4 = 6.95 × 10$^{-9}$, A6 = 1.96 × 10$^{-11}$, A8 = 9.13 × 10$^{-14}$
S2: $\epsilon$ = −0.11, A6 = 5.86 × 10$^{-7}$
S4: $\epsilon$ = 0.12, A6 = −3.01 × 10$^{-5}$
S8: $\epsilon$ = −0.14, A6 = 2.09 × 10$^{-5}$
S9: $\epsilon$ = −0.14, A6 = 2.09 × 10$^{-5}$
S12: $\epsilon$ = −5.63, A6 = −2.41 × 10$^{-6}$
<Values Corresponding to Condition (1) and Related Data>

$\phi$3D = 0.007, $\phi$3 = 0.1056
$\phi$3D/$\phi$3 = 0.066

TABLE 16

<< Embodiment 13 >>
$\beta$ = 0.41~1.06

| Surface | Curvature of Radius | Axial Distance | Index of Refraction | Abbe Number |
|---|---|---|---|---|
| S1* | r1 = 21.014 | | | |
| | | d1 = 5.800 | N1 = 1.49329 | v1 = 57.82 . . . g1 |
| S2* | r2 = −21.462 | | | |
| | | d2 = 0.92~5.76 | | |
| S3 | r3 = −9.559 | | | |
| | | d3 = 1.500 | N2 = 1.49329 | v2 = 57.82 . . . g21 |
| S4* | r4 = 2.993 | | | |
| | | d4 = 1.120 | | |
| SS | r5 = 4.967 | | | |
| | | d5 = 2.050 | N3 = 1.49329 | v3 = 57.82 . . . g22 |
| S6 | r6 = 15.406 | | | |
| | | d6 = 8.69~0.51 | | |

TABLE 16-continued

| Surface | Curvature of Radius | Axial Distance | Index of Refraction | Abbe Number |
|---|---|---|---|---|
| S7 | r7 = 12.789 | | | |
| | | d7 = 3.880 | N4 = 1.49329 | ν4 = 57.82 . . . g3 |
| S8* | r8 = −7.2988971 | | | |
| | | d8 = 0.000 | N5 = 10001.00000 | ν5 = −3.45 |
| S9*[DOE] | r9 = −7.2988598 | | | |
| | | d9 = 0.5~3.84 | | |
| S10 | r10 = −10.852 | | | |
| | | d10 = 4.000 | N6 = 1.49329 | ν6 = 57.82 . . . g4 |
| S11 | r11 = −10.039 | | | |
| | | d11 = 12.167 | | |
| S12 | r12 = 10.154 | | | |
| | | d12 = 28.030 | N7 = 1.49329 | ν7 = 57.82 . . . p |
| S13 | r13 = ∞ | | | |
| | | d13 = 0.200 | | |
| S14* | r14 = 20.983 | | | |
| | | d14 = 2.550 | N8 = 1.49329 | ν8 = 57.82 . . . se |
| S15 | r15 = −17.287 | | | |

<Aspherical Coefficients>

S1: $\epsilon = -5.68$
S2: $\epsilon = -0.11$, $A6 = 5.86 \times 10^{-7}$
S4: $\epsilon = 0.12$, $A6 = -3.01 \times 10^{-5}$
S8: $\epsilon = -0.14$, $A6 = 2.09 \times 10^{-5}$
S9: $\epsilon = -0.14$, $A6 = 2.09 \times 10^{-5}$
S14: $\epsilon = -5.63$, $A6 = -2.41 \times 10^{-6}$ <Values Corresponding to Condition (1) and Related Data>

$\phi 3D = 0.007$, $\phi 3 = 0.1056$
$\phi 3D/\phi 3 = 0.066$

TABLE 17

<< Embodiment 14 >>
$\beta = 0.46~1.17$

| Surface | Curvature of Radius | Axial Distance | Index of Refraction | Abbe Number |
|---|---|---|---|---|
| S1* | r1 = 21.562 | | | |
| | | d1 = 5.800 | N1 = 1.49329 | ν1 = 57.82 . . . g1 |
| S2* | r2 = −20.920 | | | |
| | | d2 = 1.005.84 | | |
| S3 | r3 = −8.350 | | | |
| | | d3 = 1.500 | N2 = 1.58752 | ν2 = 30.36 . . . g21 |
| S4* | r4 = 3.054 | | | |
| | | d4 = 1.120 | | |
| S5 | r5 = 4.115 | | | |
| | | d5 = 2.050 | N3 = 1.49329 | ν3 = 57.82 . . . g22 |
| S6 | r6 = 24.543 | | | |
| | | d6 = 8.69~0.51 | | |
| S7 | r7 = 11.599 | | | |
| | | d7 = 3.880 | N4 = 1.49329 | ν4 = 57.82 . . . g3 |
| S8* | r8 = −7.1613744 | | | |
| | | d8 = 0.000 | N5 = 10001.00000 | ν5 = −3.45 |
| S9*[DOE] | r9 = −7.1613635 | | | |
| | | d9 = 0.96~4.30 | | |
| S10 | r10 = −24.080 | | | |
| | | d10 = 4.000 | N6 = 1.49329 | ν6 = 57.82 . . . g4 |
| S11 | r11 = −49.625 | | | |
| | | d11 = 12.633 | | |
| S12 | r12 = 10.154 | | | |
| | | d12 = 28.030 | N7 = 1.49329 | ν7 = 57.82 . . . p |
| S13 | r13 = ∞ | | | |
| | | d13 = 0.200 | | |
| S14* | r14 = 20.983 | | | |
| | | d14 = 2.550 | N8 = 1.49329 | ν8 = 57.82 . . . se |
| S15 | r15 = −17.287 | | | |

<Aspherical Coefficients>

S1: $\epsilon = -5.68$, $A6 = 2.69 \times 10^{-13}$, $A8 = 1.38 \times 10^{-14}$
S2: $\epsilon = -0.11$, $A6 = 5.86 \times 10^{-7}$
S4: $\epsilon = 0.12$, $A6 = -3.01 \times 10^{-5}$, $A8 = 2.68 \times 10^{-15}$
S8: $\epsilon = -0.14$, $A6 = 2.09 \times 10^{-5}$
S9: $\epsilon = -0.14$, $A6 = 2.09 \times 10^{-5}$
S14: $\epsilon = -5.63$, $A6 = -2.41 \times 10^{-6}$ TABLE 17-continued <Values Corresponding to Condition (1) and Related Data>

$\phi 3D = 0.0021, \phi 3 = 0.1056$
$\phi 3D/\phi 3 = 0.02$

TABLE 18

<< Embodiment 15 >>
$\beta = 0.46\sim1.19$

| Surface | Curvature of Radius | Axial Distance | Index of Refraction | Abbe Number |
|---|---|---|---|---|
| S1* | r1 = 20.820 | | | |
| | | d1 = 5.800 | N1 = 1.49329 | ν1 = 57.82 . . . g1 |
| S2* | r2 = −24.6299959 | | | |
| | | d2 = 0.000 | N2 = 10001.00000 | ν2 = −3.45 |
| S3*[DOE] | r3 = −24.6298299 | | | |
| | | d3 = 0.92~5.78 | | |
| S4 | r4 = −10.815 | | | |
| | | d4 = 1.500 | N3 = 1.58752 | ν3 = 30.36 . . . g21 |
| S5* | r5 = 2.967 | | | |
| | | d5 = 1.120 | | |
| S6 | r6 = 4.944 | | | |
| | | d6 = 2.050 | N4 = 1.49329 | ν4 = 57.82 . . . g22 |
| S7 | r7 = 13.755 | | | |
| | | d7 = 8.69~0.51 | | |
| S8 | r8 = 12.466 | | | |
| | | d8 = 3.880 | N5 = 1.49329 | ν5 = 57.82 . . . g3 |
| S9* | r9 = −7.4103166 | | | |
| | | d9 = 0.000 | N6 = 10001.00000 | ν6 = −3.45 |
| S10*[DOE] | r10 = −7.4102775 | | | |
| | | d10 = 0.5~3.84 | | |
| S11 | r11 = −11.616 | | | |
| | | d11 = 7.500 | N7 = 1.49329 | ν7 = 57.82 . . . g4 |
| S12 | r12 = −11.481 | | | |
| | | d12 = 12.200 | | |
| S13 | r13 = 10.154 | | | |
| | | d13 = 28.030 | N8 = 1.49329 | ν8 = 57.82 . . . p |
| S14 | r14 = ∞ | | | |
| | | d14 = 0.200 | | |
| S15* | r15 = 20.983 | | | |
| | | d14 = 2.550 | N9 = 1.49329 | ν9 = 57.82 . . . se |
| S16 | r16 = −17.287 | | | |

<Aspherical Coefficients>

S1: $\epsilon = -5.68$
S2: $\epsilon = -0.11, A6 = 5.86 \times 10^{-7}$
S3: $\epsilon = -0.11, A6 = 5.86 \times 10^{-7}$
S5: $\epsilon = 0.12, A6 = -3.01 \times 10^{-5}, A8 = 2.68 \times 10^{-15}$
S9: $\epsilon = -0.14, A6 = 2.09 \times 10^{-5}$
S10: $\epsilon = -0.14, A6 = 2.09 \times 10^{-5}$
S15: $\epsilon = -5.63, A6 = -2.41 \times 10^{-6}$ <Values Corresponding to Condition (1) and Related Data>

$\phi 3D = 0.0071, \phi 3 = 0.1056$
$\phi 3D/\phi 3 = 0.067$

What is claimed is:

1. A viewfinder optical system comprising:
a relay lens system for focusing a primary image as a secondary image; and
an eyepiece lens system for transmitting said secondary image to a pupil, said eyepiece lens system being provided so that said relay lens system is provided approximately at an optical conjugate point with respect to said pupil,
wherein said relay lens system includes a surface having an optical power of diffraction, said surface being provided between the primary image and the optical conjugate point.

2. A viewfinder optical system as claimed in claim 1, wherein said surface has an optical power of refraction.

3. A viewfinder optical system as claimed in claim 2, wherein the optical power of said surface is equivalent to that of an aspherical surface.

4. A viewfinder optical system as claimed in claim 1, wherein said surface has an optical power of refraction and fulfills the following condition:

$$0.05 < \frac{\phi d}{\phi t} < 0 \qquad (1)$$

where $\phi d$ represents the optical power of diffraction of the surface included in the relay lens system, and φt represents a composite optical power of both diffraction and refraction of all surfaces included in the relay lens system.

5. A viewfinder optical system as claimed in claim 1, wherein the eyepiece lens system comprises surfaces having optical powers of refraction.

6. An objective optical system comprising:
   a first lens element having a positive optical power and including at least one surface having a positive optical power of diffraction; and
   a second lens element having a negative optical power and including at least one surface having a negative optical power of diffraction,
   wherein said objective optical lens system is capable of focusing a real image.

7. An objective optical system as claimed in claim 6, wherein the following condition is fulfilled:

$$-0.12 < \frac{\sum \phi k}{\phi o} < 0.12$$

where
   Σφk represents a composite optical power of diffraction of all surfaces included therein, and
   φo represents a total optical power of both diffraction and refraction of said all surfaces included therein.

8. A Kepler-type viewfinder optical system comprising:
   an objective lens system for focusing rays from an object as an intermediate image, said objective lens system including a first lens element having a positive optical power, including at least one surface having a positive optical power of diffraction, and a second lens element having a negative optical power, including at least one surface having a negative optical power of diffraction; and
   an eyepiece optical system for magnifying the intermediate image.

9. A Kepler-type viewfinder optical system as claimed in claim 8, wherein the following condition is fulfilled:

$$-0.12 < \frac{\sum \phi k}{\phi t} < 0.12$$

where
   Σφk represents a composite optical power of diffraction of all surfaces included in the objective lens system, and
   φt represents total optical power of both diffraction and refraction of said all surfaces included in the objective lens system.

10. A Kepler-type viewfinder optical system comprising:
    an objective lens system for focusing rays from an object as an intermediate image; and
    an eyepiece optical system for magnifying the intermediate image, said eyepiece optical system including a first lens element having a positive optical power, including at least one surface having a positive optical power of diffraction, and a second lens element having negative optical power, including at least one surface having a negative optical power of diffraction.

11. A Kepler-type viewfinder optical system as claimed in claim 10, wherein the following condition is fulfilled:

$$-0.12 < \frac{\sum \phi k}{\phi e} < 0.12$$

where
   Σφk represents a composite optical power of diffraction of all surfaces included in the eyepiece optical system, and
   φe represents a total optical power of both diffraction and refraction of said all surfaces included in the eyepiece optical system.

12. A Kepler-type viewfinder optical system comprising:
    an objective lens system for focusing rays from an object as an intermediate image and having a plurality of lens units, said objective lens system being a zoom lens system in which zooming is performed by moving any of the plurality of lens units along an optical axis;
    a surface included in the objective lens system having an optical power of diffraction; and
    an eyepiece optical system for magnifying the intermediate image.

13. A Kepler-type viewfinder optical system as claimed in claim 12, wherein the objective lens system includes, from an object side,
    a first lens unit having a negative refractive power; and
    a second lens unit having a positive refractive power and including said surface therein.

14. A Kepler-type viewfinder optical system as claimed in claim 13, wherein the following condition is fulfilled:

$$-0.007 < \frac{\phi N \cdot \phi PD}{\phi P} < -0.001$$

where
   φN represents an optical power of both diffraction and refraction of all surfaces included in the first lens unit,
   φP represents an optical power of both diffraction and refraction of said all surfaces included in the second lens unit, and
   φPD represents the optical power of diffraction of the surface having an optical power of diffraction included in the second lens unit.

15. A Kepler-type viewfinder optical system as claimed in claim 12, wherein the objective lens system comprises, from an object side,
    a first lens unit having a negative optical power;
    a second lens unit having a positive optical power and including said surface therein; and
    a third lens unit having a positive or negative optical power.

16. A Kepler-type viewfinder optical system as claimed in claim 12, wherein the eyepiece optical system comprises surfaces having optical powers of refraction.

17. A Kepler-type viewfinder optical system comprising:
    an objective lens system for focusing rays from an object as an intermediate image, and
    an eyepiece optical system for maanifying the intermediate image,
    wherein said objective lens system comprises, from the object side:
    a first lens unit having a positive optical power,
    a second lens unit having a negative optical power and including at least one surface having an optical power of diffraction, a third lens unit having a negative optical power, and
a fourth lens unit having a positive optical power.

18. A Kepler-type viewfinder optical system as claimed in claim 17, wherein said objective lens system comprises, from the object side, the first lens unit, the second lens unit, the third lens unit and the fourth lens unit.

19. A Kepler-type viewfinder optical system as claimed in claim 17, wherein the following condition is fulfilled:

$$-0.2 < \frac{\phi 2D}{\phi 2} < = -0.05$$

where $\phi 2D$ represents an optical power of both diffraction and refraction of all surfaces included in the second lens unit, and $\phi 2$ represents an optical power of diffraction of the surface having an optical power of diffraction included in the second lens unit.

20. A Kepler-type viewfinder optical system as claimed in claim 17, wherein zooming is performed by moving both the second lens unit and the third lens unit along an optical axis.

21. A Kepler-type viewfinder optical system as claimed in claim 17, wherein the eyepiece optical system comprises surfaces having optical powers of refraction.

22. A Kepler-type viewfinder optical system comprising:
an objective lens system for focusing rays from an object as an intermediate image, and
an eyepiece optical system for magnifying the intermediate image,
wherein said objective lens system comprises, from the object side:
a first lens unit having positive optical power,
a second lens unit having negative optical power,
a third lens unit having negative optical power and including at least one surface having optical power of diffraction, and
a fourth lens unit having positive optical power.

23. A Kepler-type viewfinder optical system as claimed in claim 22, wherein said objective lens system comprises, from the object side, the first lens unit, the second lens unit, the third lens unit and the fourth lens unit.

24. A Kepler-type viewfinder optical system as claimed in claim 22, wherein the following condition is fulfilled:

$$-0.2 < \frac{\phi 3D}{\phi 3} < = -0.05 \qquad (6)$$

where $\phi 3D$ represents an optical power of both diffraction and refraction of all surfaces included in the third lens unit, and $\phi 3$ represents an optical power of diffraction of the surface having an optical power of diffraction included in the third lens unit.

25. A Kepler-type viewfinder optical system as claimed in claim 22, wherein zooming is performed by moving both the second lens unit and the third lens unit along an optical axis.

26. A Kepler-type viewfinder optical system as claimed in claim 22, wherein the eyepiece optical system comprises surfaces having optical powers of refraction.

27. A Kepler-type viewfinder optical system comprising:
an objective lens system for focusing rays from an object as an intermediate image, and
an eyepiece optical system for magnifying the intermediate image,
wherein said objective lens system comprises, from the object side:
a first lens unit having a positive optical power,
a second lens unit having a negative optical power, and
a third lens unit having a positive optical power and including at least one surface having an optical power of diffraction.

28. A Kepler-type viewfinder optical system as claimed in claim 27, wherein said objective lens system comprises, from the object side, the first lens unit, the second lens unit, the third lens unit and a fourth lens unit having positive or negative optical power.

29. A Kepler-type viewfinder optical system as claimed in claim 27, wherein the following condition is fulfilled:

$$0.01 < \frac{\phi 3D}{\phi 3} < = 0.1$$

where $\phi 3D$ represents an optical power of both diffraction and refraction of all surfaces included in the third lens unit, and $\phi 3$ represents the optical power of diffraction of the surface having an optical power of diffraction included in the third lens unit.

30. A Kepler-type viewfinder optical system as claimed in claim 27, wherein zooming is performed by moving both the second lens unit and the third lens unit along an optical axis.

31. A Kepler-type viewfinder optical system as claimed in claim 27, wherein the eyepiece optical system comprises surfaces having optical powers of refraction.

32. A Kepler-type viewfinder optical system as claimed in claim 27, wherein the first lens unit includes at least one surface having an optical power of diffraction.

33. An eyepiece optical lens system comprising:
a first lens element having a positive optical power and including at least one surface having a positive optical power of diffraction; and
a second lens element having a negative optical power and including at least one surface having a negative optical power of diffraction,
wherein said eyepiece optical lens system is capable of magnifying a real image.

34. An eyepiece optical lens system as claimed in claim 33, wherein the following condition is fulfilled:

$$-0.12 < \frac{\sum \phi k}{\phi o} < 0.12$$

where $\Sigma \phi k$ represents a composite optical power of diffraction of all surfaces included therein, and $\phi o$ represents a total optical power of both diffraction and refraction of said all surfaces included therein.

* * * * *